United States Patent
Kuno et al.

(10) Patent No.: US 6,707,437 B1
(45) Date of Patent: Mar. 16, 2004

(54) IMAGE DISPLAY APPARATUS AND CONTROL METHOD THEREOF

(75) Inventors: Mitsutoshi Kuno, Sagamihara (JP); Osamu Sagano, Sagamihara (JP); Akira Fujii, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/299,878

(22) Filed: Apr. 27, 1999

(30) Foreign Application Priority Data

| May 1, 1998 | (JP) | 10-122525 |
| Jan. 18, 1999 | (JP) | 11-009916 |
| Jan. 29, 1999 | (JP) | 11-022622 |
| Feb. 26, 1999 | (JP) | 11-049921 |
| Apr. 23, 1999 | (JP) | 11-116337 |

(51) Int. Cl.$^7$ .............................................. G09G 3/22
(52) U.S. Cl. ....................... 345/74.1; 345/75.1; 345/77; 313/292; 313/310; 313/495; 315/169.3; 315/169.4; 315/168; 315/150
(58) Field of Search ........................ 345/74, 74.1, 75.1, 345/55; 313/495, 292, 310; 315/169.3, 169.4, 168, 150

(56) References Cited

U.S. PATENT DOCUMENTS

| 3,946,381 A | 3/1976 | Johnson et al. .......... 340/173 R |
| 4,816,819 A | 3/1989 | Enari et al. ................. 340/811 |
| 4,904,895 A | 2/1990 | Tsukamoto et al. ......... 313/336 |
| 5,066,833 A | 11/1991 | Zalenski ...................... 178/19 |

(List continued on next page.)

FOREIGN PATENT DOCUMENTS

| EP | 0 604 930 | 7/1994 |
| EP | 0 655 722 | 5/1995 |
| EP | 0 661 726 | 7/1995 |
| EP | 0 688 035 | 12/1995 |
| EP | 0 690 472 | 1/1996 |
| EP | 0 725 420 | 8/1996 |
| EP | 0 878 788 | 11/1998 |
| FR | 2 747 505 | 10/1997 |
| JP | 60-93741 | 5/1985 |
| JP | 64-31332 | 2/1989 |

(List continued on next page.)

OTHER PUBLICATIONS

W.P. Dyke, et al., "Field Emission", Advances in Electronics and Electron Physics, vol. VIII, pp. 89–185 (1956).

C.A. Spindt, et al., "Physical Properties of Thin–Film Field Emission Cathodes with Molybdenum Cones", Journal of Applied Physics, vol. 47, No. 12, pp. 5248–5263 (Dec. 1976).

M.I. Elinson, et al., "The Emission of Hot Electrons and the Field Emission of Electrons From Tin Oxide", Radio Engineering and Electronic Physics, No. 7, pp. 1290–1296 (Jul. 1965).

G. Dittmer, "Electrical Conduction and Electron Emission of Discontinuous Thin Films", Thin Solid Films, vol. 9, pp. 317–328 (1972).

M. Hartwell, et al., Strong Electron Emission From Patterned Tin–Indium Oxide Thin Films, International Electron Devices Meeting, pp. 519–521 (1975).

(List continued on next page.)

*Primary Examiner*—Richard Hjerpe
*Assistant Examiner*—Ali Zamani
(74) *Attorney, Agent, or Firm*—Fitzpatrick, Cella, Harper & Scinto

(57) ABSTRACT

An image display apparatus includes a display panel having an electron source, an acceleration electrode for accelerating electrons emitted from the electron source and phosphors for emitting light by collision of electrons accelerated by the acceleration electrode, and a detector for detecting a current flowing through the acceleration electrode during a non-display period. In addition, a controller is provided to decrease the luminance level, stop display driving or transmit warning information when the current detected becomes more than a predetermined value.

54 Claims, 38 Drawing Sheets

U.S. PATENT DOCUMENTS

| | | | |
|---|---|---|---|
| 5,136,397 A | | 8/1992 | Miyashita .................. 358/236 |
| 5,347,292 A | * | 9/1994 | Ge et al. ..................... 345/74 |
| 5,428,370 A | | 6/1995 | Knapp et al. ............... 345/205 |
| 5,760,538 A | * | 6/1998 | Mitsutake et al. .......... 313/422 |
| 5,834,900 A | | 11/1998 | Tanaka et al. ........... 315/169.1 |
| 6,005,540 A | * | 12/1999 | Shinjo et al. .............. 345/74.1 |
| 6,121,942 A | * | 9/2000 | Sanou et al. .................. 345/75 |
| 6,144,154 A | * | 11/2000 | Yamazaki et al. .......... 313/495 |
| 6,278,421 B1 | * | 8/2001 | Ishida et al. .................. 345/63 |
| 6,441,544 B1 | * | 8/2002 | Ando et al. ................. 313/310 |
| 6,506,087 B1 | * | 1/2003 | Fushimi et al. ............... 445/24 |
| 6,512,329 B1 | * | 1/2003 | Mitsutake et al. .......... 313/495 |

FOREIGN PATENT DOCUMENTS

| | | |
|---|---|---|
| JP | 2-39678 | 2/1990 |
| JP | 2-257551 | 10/1990 |
| JP | 3-55738 | 3/1991 |
| JP | 3-207181 | 9/1991 |
| JP | 4-28137 | 1/1992 |
| JP | 8-22022 | 1/1996 |
| JP | 8-30220 | 2/1996 |
| JP | 9-9181 | 1/1997 |
| JP | 9-190160 | 7/1997 |
| JP | 9-199006 | 7/1997 |
| JP | 11-288248 | 10/1999 |
| JP | 11-288249 | 10/1999 |
| KR | 10-0220216 | 6/1999 |
| WO | WO 99/24961 | 5/1999 |

OTHER PUBLICATIONS

H. Araki, et al., "Electroforming and Electron Emission of Carbon Thin Films", Journal of the Vacuum Society of Japan, vol. 26, No. 1, pp. 22–29 (Jan. 26, 1983).

C.A. Mead, "Operation of Tunnel–Emission Devices", Journal of Applied Physics, vol. 32, No. 4, pp. 646–652 (Apr. 1961).

R. Meyer, "Recent Development of "Microtips" Display at LETI", Technical Digest of IVMC 91, pp. 7–9 (1991).

* cited by examiner

1010 : BLACK CONDUCTIVE MEMBER

R : RED FLUORESCENT SUBSTANCE
G : GREEN FLUORESCENT SUBSTANCE
B : BLUE FLUORESCENT SUBSTANCE

1010 : BLACK CONDUCTIVE MEMBER

R : RED FLUORESCENT SUBSTANCE
G : GREEN FLUORESCENT SUBSTANCE
B : BLUE FLUORESCENT SUBSTANCE

IMAGE DISPLAY APPARATUS AND CONTROL METHOD THEREOF

BACKGROUND OF THE INVENTION

1. Field of the Invention

The present invention relates to an image display apparatus which displays an image by the emitted electrons, and control method of the apparatuses.

2. Description of the Related Art

Conventionally, two types of devices, namely hot and cold cathode devices, are known as electron-emitting devices. Known examples of the cold cathode devices are surface-conduction type emission devices, field emission type electron-emitting devices (to be referred to as FE type electron-emitting devices hereinafter), and metal/insulator/metal type electron-emitting devices (to be referred to as MIM type electron-emitting devices hereinafter).

Known examples of the FE type electron-emitting devices are described in W. P. Dyke and W. W. Dolan, "Field emission", Advance in Electron Physics, 8, 89 (1956) and C. A. Spindt, "Physical properties of thin-film field emission cathodes with molybdenium cones", J. Appl. Phys., 47, 5248 (1976).

A known example of the surface-conduction type emission devices is described in, e.g., M. I. Elinson, "Radio Eng. Electron Phys., 10, 1290 (1965) and other examples will be described later.

The surface-conduction type emission device utilizes the phenomenon that electrons are emitted by a small-area thin film formed on a substrate by flowing a current parallel through the film surface. The surface-conduction type emission device includes electron-emitting devices using an Au thin film [G. Dittmer, "Thin Solid Films", 9,317 (1972)], an $In_2O_3/SnO_2$ thin film [M. Hartwell and C. G. Fonstad, "IEEE Trans. ED Conf.", 519 (1975)], a carbon thin film [Hisashi Araki et al., "Vacuum", Vol. 26, No. 1, p. 22 (1983)], and the like, in addition to an $SnO_2$ thin film according to Elinson mentioned above.

FIG. 27 is a plan view showing the device by M. Hartwell et al. described above as a typical example of the device structures of these surface-conduction type emission devices. Referring to FIG. 27, reference numeral 3001 denotes a substrate; and 3004, a conductive thin film made of a metal oxide formed by sputtering. This conductive thin film 3004 has an H-shaped pattern, as shown in FIG. 27. An electron-emitting portion 3005 is formed by performing electrification processing (referred to as forming processing to be described later) with respect to the conductive thin film 3004. An interval L in FIG. 27 is set to 0.5 to 1 mm, and a width W is set to 0.1 mm.

In the conventional electron-emitting devices, the electron-emitting portion 3005 is generally formed by performing electrification processing called forming processing for the conductive thin film 3004. In the forming processing, for example, a DC voltage or a voltage which increases at a very low rate of, e.g., 1 V/min is applied across the conductive thin film 3004 to partially destroy or deform the conductive thin film 3004, thereby forming the electron-emitting portion 3005 with an electrically high resistance. Note that the electron-emitting portion 3005 is a fissure formed in part of the conductive thin film 3004. Electrons are emitted near the fissure by applying a predetermined voltage across the electron-emitting portion 3005.

FIG. 28 is a sectional view showing the device by C. A. Spindt et al. described above as a typical example of the FE type device structure. In FIG. 28, reference numeral 3010 denotes a substrate; 3011, emitter wiring made of a conductive material; 3012, an emitter cone; 3013, an insulating layer; and 3014, a gate electrode. In this device, a voltage is applied between the emitter cone 3012 and gate electrode 3014 to emit electrons from the distal end portion of the emitter cone 3012.

As another FE type device structure, there is an example in which an emitter and gate electrode are arranged on a substrate to be almost parallel to the surface of the substrate, in addition to the multilayered structure of FIG. 28.

A known example of the MIM type electron-emitting devices is described in C. A. Mead, "Operation of Tunnel-Emission Devices", J. Appl. Phys., 32,646 (1961). FIG. 29 shows a typical example of the MIM type device structure. FIG. 29 is a sectional view of the MIM type electron-emitting device. In FIG. 29, reference numeral 3020 denotes a substrate; 3021, a lower electrode made of a metal; 3022, a thin insulating layer having a thickness of about 100 Å; and 3023, an upper electrode made of a metal and having a thickness of about 80 to 300 Å. In the MIM type electron-emitting device, an appropriate voltage is applied between the upper and lower electrodes 3023 and 3021 to emit electrons from the surface of the upper electrode 3023.

Since the above-described cold cathode devices can emit electrons at a temperature lower than that for hot cathode devices, they do not require any heater. The cold cathode device has a structure simpler than that of the hot cathode device and can shrink in feature size. Even if a large number of devices are arranged on a substrate at a high density, problems such as heat fusion of the substrate hardly arise. In addition, the response speed of the cold cathode device is high, while the response speed of the hot cathode device is low because it operates upon heating by a heater. For this reason, applications of the cold cathode devices have enthusiastically been studied.

Of cold cathode devices, the above surface-conduction type emission devices have a simple structure and can be easily manufactured, and thus many devices can be formed on a wide area. As disclosed in Japanese Patent Laid-Open No. 64-31332 filed by the present applicant, a method of arranging and driving a lot of devices has been studied.

Regarding applications of the surface-conduction type emission devices to, e.g., image forming apparatuses such as an image display apparatus and an image recording apparatus, charge beam sources, and the like have been studied.

Particularly as an application to image display apparatuses, as disclosed in the U.S. Pat. No. 5,066,833 and Japanese Patent Laid-Open Nos. 2-257551 and 4-28137 filed by the present applicant, an image display apparatus using the combination of a surface-conduction type emission device and a fluorescent substance emits light upon reception of an electron beam has been studied. This type of image display apparatus using the combination of the surface-conduction type emission device and the fluorescent substance is expected to exhibit better characteristics than other conventional image display apparatuses. For example, compared with recent popular liquid crystal display apparatuses, the above display apparatus is superior in that it does not require any backlight because it is a self-emission type and that it has a wide view angle.

A method of driving a plurality of FE type electron-emitting devices arranged side by side is disclosed in, e.g., U.S. Pat. No. 4,904,895 filed by the present applicant. As a known example of an application of FE type electron-emitting devices to an image display apparatus is a flat display apparatus reported by R. Meyer et al. [R. Meyer: "Recent Development on Microtips Display at LETI", Tech. Digest of 4th Int. Vacuum Microelectronics Conf., Nagahama, pp. 6–9 (1991)].

An example of an application of a larger number of MIM type electron-emitting devices arranged side by side to an image display apparatus is disclosed in Japanese Patent Laid-Open No. 3-55738 filed by the present applicant.

SUMMARY OF THE INVENTION

The present inventors have examined cold cathode devices of various materials, various manufacturing methods, and various structures, in addition to the above-mentioned conventional cold cathode devices. Further, the present inventors have made extensive studies on a multi electron source having a large number of cold cathode devices, and an image display apparatus using this multi electron source. The present inventors have examined a multi electron source having an electrical wiring method shown in, e.g., FIG. 30. That is, a large number of cold cathode devices are two-dimensionally arranged in a matrix to obtain a multi electron source, as shown in FIG. 30.

Referring to FIG. 30, reference numeral 4001 denotes a cold cathode device; 4002, a row wiring; and 4003, a column wiring. The row and column wirings 4002 and 4003 actually have finite electrical resistances, which are represented as wiring resistances 4004 and 4005 in FIG. 30. This wiring method is called a simple matrix wiring method. For the illustrative convenience, the multi electron source is illustrated in a 6×6 matrix, but the size of the matrix is not limited to this. For example, in a multi electron source for an image display apparatus, a number of devices enough to perform desired image display are arranged and wired.

In a multi electron source constituted by arranging cold cathode devices in a simple matrix, appropriate electrical signals are applied to the row and column wirings 4002 and 4003 to output a desired electron beam. For example, to drive the cold cathode devices on an arbitrary row in the matrix, a selection voltage Vs is applied to the column wiring 4002 on the row to be selected, and at the same time a non-selection voltage Vns is applied to the row wirings 4002 on an unselected row. In synchronism with this, a driving voltage Ve for outputting an electron beam is applied to the column wiring 4003. According to this method, when voltage drops across the wiring resistances 4004 and 4005 are neglected, a voltage (Ve−Vs) is applied to the cold cathode devices on the selected row, while a voltage (Ve−Vns) is applied to the cold cathode devices on the unselected row. When the voltages Ve, Vs, and Vns are set to appropriate magnitudes, an electron beam having a desired intensity must be output from only the cold cathode device on the selected row. When different driving voltages Ve are applied to respective column wirings, electron beams having different intensities must be output from the respective devices of the selected row. A change in length of time for which the driving voltage Ve is applied necessarily causes a change in length of time for which an electron beam is output.

The multi electron source constituted by arranging cold cathode devices in a simple matrix has a variety of applications. For example, when an electrical signal corresponding to image information is appropriately applied, the multi electron source can be suitably used as an electron source for an image display apparatus.

FIG. 31 is a perspective view of an example of a display panel for a flat image display apparatus using the multi electron source where part of the panel is removed for showing the internal structure of the panel.

In FIG. 31, reference numeral 3115 denotes a rear plate; 3116, a side wall; and 3117, a face plate. The rear plate 3115, side wall 3116, and face plate 3117 form an envelope (airtight container) for keeping the interior of the display panel vacuum.

The rear plate 3115 is fixed to a substrate 3111. N×M cold cathode devices 3112 are formed on the substrate 3111. Note that N and M are positive integers equal to 2 or more, and properly set in accordance with a target number of display pixels. The N×M cold cathode devices 3112 are wired by M row wirings 3113 and N column wirings 3114, as shown in FIG. 31. The portion constituted by the substrate 3111, cold cathode devices 3112, and row and column wirings 3113 and 3114 will be referred to as a multi electron source. At an intersection of the row and column wirings 3113 and 3114, an insulating layer (not shown) is formed between them to maintain electrical insulation.

A fluorescent film 3118 is formed from a fluorescent substance under the face plate 3117, and colored in three, red (R), green (G), and blue (B) primary colors (see FIGS. 18A and 18B). A black conductive material (1010 in FIGS. 18A and 18B) is provided between fluorescent substances of respective colors forming the fluorescent film 3118. A metal back 3119 is formed from made of Al (aluminum) or the like on the surface of the fluorescent film 3118 on the rear plate 3115 side.

Terminals $D_{x1}$ to $D_{xM}$, $D_{y1}$ to $D_{yN}$, and Hv are connection terminals for the airtight structure provided to electrically connect the display panel to a driving circuit (to be described later). The terminals $D_{x1}$ to $D_{xM}$ are electrically connected to the row wirings 3113 of the multi electron source; $D_{y1}$ to $D_{yN}$, to the column wirings 3114 of the multi electron source; and Hv, to the metal back 3119.

The interior of the airtight container is kept at a vacuum of about $10^{-6}$ Torr. As the display area of the image display apparatus increases, demand is arising for any means for preventing deformation or destruction of the rear and face plates 3115 and 3117 caused by the difference between inner and outer pressures of the airtight container. If destruction is prevented by making the rear and facing plates 3115 and 3117 thick, this increases the weight of the image display apparatus, and generates distortion and parallax of an image when viewed diagonally. For this reason, the display panel in FIG. 31 adopts a structure support (to be referred to as a spacer or rib) 3120 which is made of a relatively thin glass plate and supports the airtight container against the atmospheric pressure. This spacer generally keeps the interval between the substrate 3111 having the multi electron source and the face plate 3117 having the fluorescent film 3118 at sub-mm to several mm, thereby keeping the interior of the airtight container in a high-vacuum state, as described above.

When a voltage is applied to respective cold cathode devices 3112 via the external terminals $D_{x1}$ to $D_{xM}$ and $D_{y1}$, to $D_{yN}$, the image display apparatus using the above display panel emits electrons from the cold cathode devices 3112. At the same time, a high voltage of several hundred V to several kV is applied to the metal back 3119 via the external terminal Hv to accelerate the emitted electrons and collide them against the face plate 3117. Then, fluorescent substances of respective colors in the fluorescent film 3118 are excited to emit light, thereby displaying a color image.

One side (upper surface) of the structure support (spacer) 3120 is joined to the metal back 3119 for applying a high voltage, and the lower surface is mounted on the row wiring. In driving the display panel, the upper surface of the spacer 3120 receives a high voltage, and its lower surface receives a scanning voltage.

In FIG. 31, a conductive film material (e.g., NiO) or the like is deposited on the entire surface of the spacer 3120. This conductive film is formed to make the electric field inside the display panel uniform upon application of a high voltage. The film resistance is set to a resistance value of about $1 \times 10^8$ to $1 \times 10^9$.

Accordingly, a current (to be referred to as a spacer current) from the high-voltage source flows from the metal back 3119 to the row wiring via the spacer 3120.

FIG. 32 is a sectional view showing a display panel for an image display apparatus using a multi electron source manufactured by the present inventors.

For the illustrative convenience, FIG. 32 does not show any row and column wirings and the like on the substrate 3111 and shows only one cold cathode device 3112 (surface-conduction emission type device in FIG. 32) in a matrix layout. The metal back 3119 having an anode electrode, fluorescent substance, and the like is formed at a position where the metal back 3119 faces the substrate 3111. The substrate 311, face plate, and support frame (not shown) form a vacuum container. The cold cathode device 3112 is incorporated in the high-vacuum container. Reference numeral 4104 denotes a signal source for driving the cold cathode device 3112; and 4105, a high-voltage source for applying a high voltage between the substrate 3111 and metal back 3119. As shown in FIG. 32, electrons emitted by the cold cathode device 3112 are attracted upward by the metal back 3119 receiving a high voltage from the high-voltage source 4105, and collide against the fluorescent substance facing the cold cathode device 3112.

In some cases, unexpected discharge occurs in the container in which electron-emitting devices are arranged. The unexpected discharge may damage electron-emitting devices and wirings such as row and column wirings to a non-negligible degree. If unexpected discharge frequently occurs, problems arise.

When the above image display apparatus is used in a very severe environment or used abnormally, faults abruptly occur in the image display apparatus. For example, static electricity influences the driving circuit in a very dry environment, or heat, which is difficult to dissipate at a very high ambient temperature, influences operation of the driving circuit system.

One aspect according to the present invention has the following arrangement.

An image display apparatus comprises a display panel, and detection means for detecting a state of the display panel, wherein the image display apparatus is controlled in accordance with the state of the display panel.

Since the arrangement of this aspect adopts the detection means, the state of the display panel can be detected to control the image display apparatus at good timing. In particular, the present invention can preferably prolong the service life of the display panel under this control and suppress deterioration of characteristics to allow using the display panel for a long time. From this viewpoint, a desirable detection device is performed in a non-destructive condition in order to detect the state of the display panel.

The state of the display panel is preferably electrically detected.

For example, the state of the display panel can be detected by detecting a current flowing through the display panel, and especially a current flowing through an electrode arranged on the display panel.

When the display panel comprises an electron source and an acceleration electrode for accelerating an electron output from the electron source, the detection means detects a current flowing through the acceleration electrode.

The state of the display panel is preferably detected at a plurality of portions on the display panel, e.g., by measuring currents flowing through a plurality of portions on the display panel. Detection at the plurality of portions enables detecting the state of the display panel in units of the plurality of portions.

For example, when the display panel comprises an electron source and a plurality of acceleration electrodes for accelerating electrons output from the electron source, the detection means individually detects currents flowing through the plurality of acceleration electrodes.

The display panel may comprise an electron source and an acceleration electrode for accelerating an electron output from the electron source, and the detection means may detect a current flowing through a current path between the electron source and the acceleration electrode. The current path is set by a structure arranged between the electron source and the acceleration electrode. For example, the structure is a spacer for maintaining the interval between the electron source and the front plate on which the acceleration electrode, fluorescent substance, or the like is arranged. If a current flowing through the current path is not directly detected, this current can be indirectly detected by detecting a current flowing through the acceleration electrode or the potential of the acceleration electrode. This current path is preferably arranged outside the image formation area within the display panel.

The display panel may comprise an electron source, and the electron source may comprise an electron-emitting device for emitting an electron for displaying an image, and an electron-emitting device arranged to detect the state of the display panel. In this case, the electron-emitting device arranged to detect the state of the display panel is preferably set outside the image display area.

The display panel may comprise an electron source, an acceleration electrode for accelerating an electron output from the electron source, and an electron capture electrode arranged to detect the state of the display panel. In particular, a potential applied to the electron capture electrode is preferably closer to the potential of the electron source than the potential of the acceleration electrode for accelerating an electron for displaying an image. An electron-emitting device for outputting an electron to the electron capture electrode may be arranged separately from the electron-emitting device for emitting an electron for forming an image.

The detection means may detect the state of the display panel by detecting a potential of the display panel.

The detection means detects the state of the display panel by detecting a potential of an electrode arranged in the display panel.

The display panel may comprise an electron-emitting device, and the detection means may detect the state of the display panel by detecting a potential of an electrode electrically isolated from the electron-emitting device.

The display panel may comprise an electron source for outputting electrons, and the detection means may detect the state of the display panel by detecting a potential of an electrode arranged on the electron source.

When the display panel may comprise an electron source for outputting electrons, the state of the display panel may be detected while no electron is emitted by the electron source. Consequently, the state of the display panel can be detected while reducing the influence of output of electrons from the electron source. For example, when the display panel comprises an electron source having a plurality of electron-emitting devices and the electron source outputs electrons from respective electron-emitting devices while sequentially switching electron-emitting devices selected from the plurality of electron-emitting devices, the state of the display panel is detected when electron-emitting devices to be selected are switched.

The detection means detects discharge in the display panel, or even if discharge is not directly detected, detects a state about discharge. The detection means may detect a state about power consumption in the display panel such that the detection means detects a current flowing through the spacer.

The detection means may detect a change in state of the display panel.

If the image display apparatus comprises memory means for storing information detected by the detection means, the state of the panel can be preferably recorded.

The memory means stores information about the number of abnormalities in the display panel, information about a generation location of an abnormality in the display panel, or information about either one or both of a generation time and/or date and an end time and/or date of an abnormality in the display panel.

Control of the image display apparatus in accordance with the state of the display panel is transfer of information by information transfer means. As the information transfer means, means using visual display or means for generating voice can be preferably used.

Control of the image display apparatus in accordance with the state of the display panel is control of transferring information for prompting an information receiving person to control the image display apparatus. The information receiving person, e.g., the user of the image display apparatus or the maintenance personnel of the image display apparatus can control to suppress the progress of the abnormality in accordance with the transferred information.

Control of the image display apparatus in accordance with the state of the display panel may be control of a driving voltage of the display panel. If the state of the display panel becomes abnormal, the progress of the abnormality can be suppressed by decreasing the driving voltage of the display panel. More specifically, when the display panel comprises an electron source and an acceleration electrode for accelerating an electron output from the electron source, the voltage to be controlled is a voltage between the electron source and the acceleration electrode. When the display panel comprises an electron source for emitting an electron upon application of a voltage, the voltage to be controlled is the voltage for emitting an electron.

When the display panel comprises an airtight container for keeping an internal pressure lower than an ambient pressure, control of the image display apparatus in accordance with the state of the display panel may be control of increasing a vacuum degree in the airtight container. For example, the vacuum degree can be increased by containing a getter set in the airtight container in an atmosphere substance by heating or the like.

Control of the image display apparatus in accordance with the state of the display panel is selected preferably from a plurality of control operations, and more preferably from a plurality of control operations in accordance with the state of the display panel.

The display panel may comprise an electron source, and the electron source may have a plurality of electron-emitting devices connected in a matrix by a plurality of first wirings and a plurality of second wirings extending in a direction intersecting to the first wirings.

The display panel may comprise an electron source, and the electron source may comprise a cold cathode device.

The above aspects are particularly effective when the display panel is kept at a vacuum degree higher than an internal pressure of $10^{-4}$ Torr when no abnormality occurs.

The present invention includes a television and computer display to which the above aspects are applied.

A method of controlling an image display apparatus according to the present invention has the following steps.

A method of controlling an image display apparatus having a display panel comprises steps of detecting a state of the display panel, and controlling the image display apparatus in accordance with the detected state.

The electron source can be one having a ladder-like layout in which a plurality of rows (to be referred to as a row direction hereinafter) of a plurality of cold cathode devices arranged parallel and each having two electrodes connected are arranged, and electrons emitted by the cold cathode devices are controlled by a control electrode (to be referred to as a grid hereinafter) arranged above the cold cathode devices along the direction (to be referred to as a column direction hereinafter) intersecting to this wiring.

According to the concepts of the present invention, the image display apparatus is not limited to an image forming apparatus suitable for display, and can also be used as a light-emitting source instead of a light-emitting diode for an optical printer made up of a photosensitive drum, light-emitting diode, and the like. At this time, by properly selecting M row wirings and N column wirings, the image display apparatus can be applied as not only a linear light-emitting source but also a two-dimensional light-emitting source. In this case, the image forming member is not limited to a substance which directly emits light, such as a fluorescent substance used in the following embodiments, but may be a member on which a latent image is formed by charging of electrons.

According to the concept of the present invention, the present invention can be applied to an electron-beam apparatus such as an electron microscope in which the target member to be irradiated with electrons emitted by the electron source is not an image forming member such as a fluorescent substance. Hence, the present invention can be adopted as a general electron-beam apparatus which does not specify any target member to be irradiated.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute part of the specification, illustrate embodiments of the invention and, together with the descriptions, serve to explain the principle of the invention.

DETAILED DESCRIPTION OF THE PREFERRED EMBODIMENTS

Preferred embodiments of the present invention will be described in detail below with reference to the accompanying drawings.

[First Embodiment]

Figure 31:
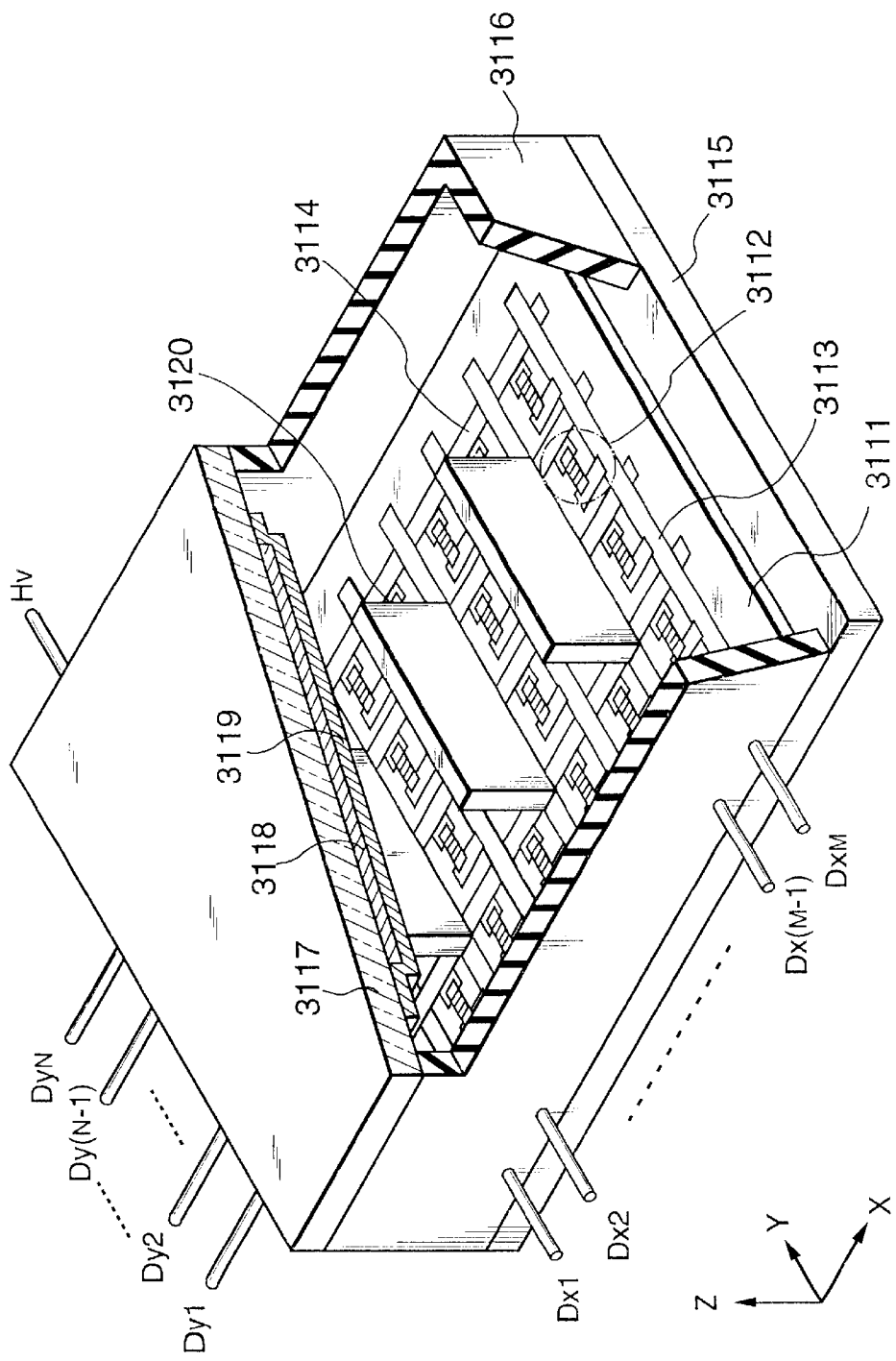
FIG. 31 is a perspective view for explaining the structure of the display panel of a conventional image display apparatus.
Figure 32:
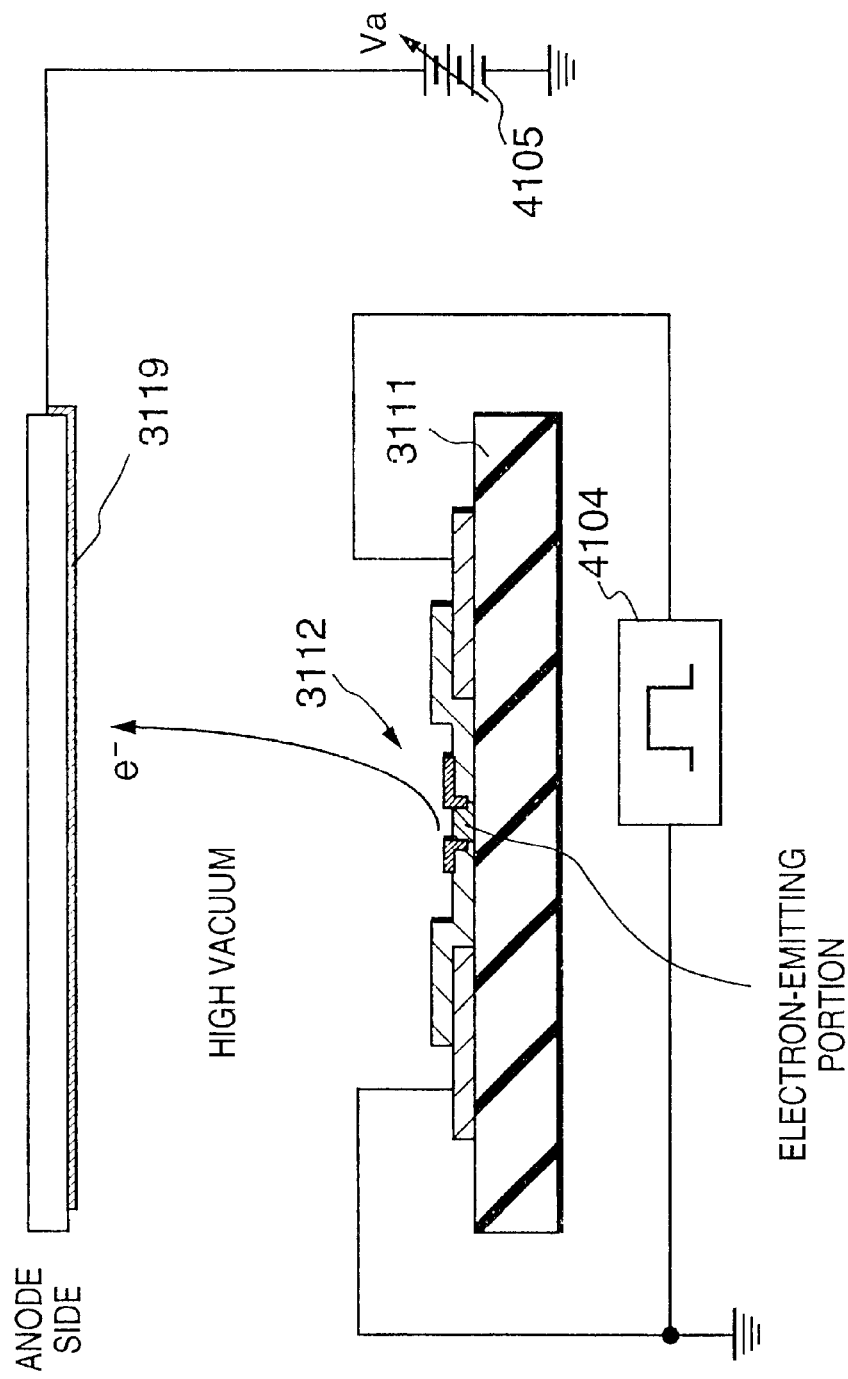
FIG. 32 is a sectional view for explaining the structure of an image display apparatus posing problems which has been examined by the present inventors.

As the first embodiment of the present invention, a display panel using an electron-emitting device and a driving circuit for the display panel will be described in detail. The display panel of the first embodiment has the same structure as shown in FIG. 31, and a detailed description thereof will be omitted.

Figure 1:
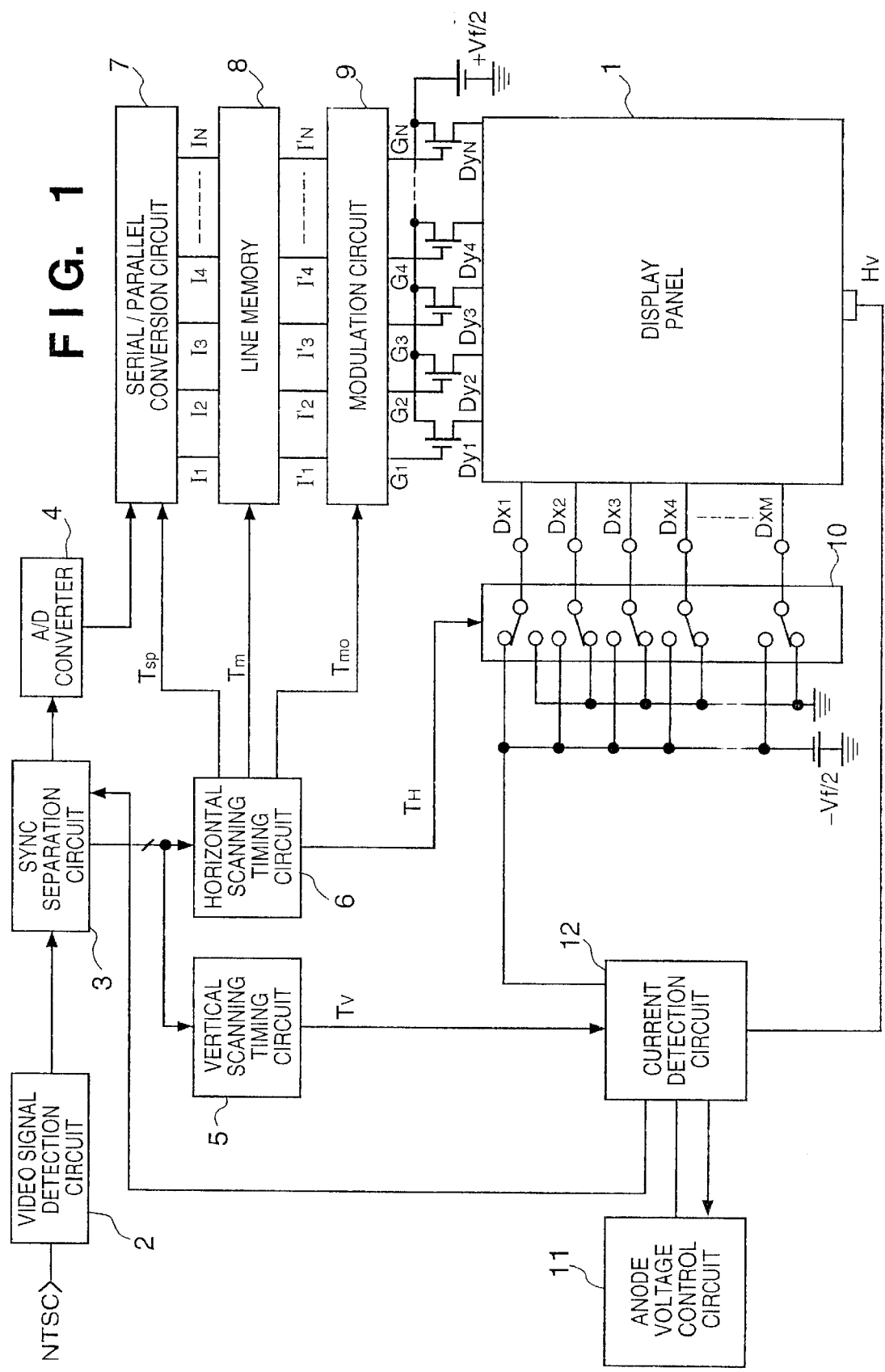
FIG. 1 is a block diagram showing the arrangement of a driving circuit for driving the display panel of an image display apparatus according to the first embodiment of the present invention.

FIG. 1 is a block diagram showing the arrangement of a driving circuit for the display panel of an image display apparatus according to the first embodiment.

In FIG. 1, reference numeral 1 denotes a display panel using a cold cathode device (electron-emitting device: to be described in detail later). An external video signal (e.g., an NTSC signal) is input to a video signal detection circuit 2 for detecting a video signal, and an output from the video signal detection circuit 2 is input to a sync separation circuit 3 for separating and outputting a video signal and horizontal and vertical sync signals.

The video signal separated by the sync separation circuit 3 is input to an A/D converter 4. The sync separation circuit 3 outputs the vertical and horizontal sync signals to vertical and horizontal scanning timing circuits 5 and 6, respectively.

Outputs from the A/D converter 4 are digital data corresponding to the luminances of R, G, and B color components, which are output in accordance with the layout of color pixels of the display panel 1 and sequentially input to a serial/parallel conversion circuit 7. The horizontal scanning timing circuit 6 outputs a signal $T_{sp}$ for shifting and inputting serial digital signals to the serial/parallel conversion circuit 7. The signal $T_{sp}$ is a serial clock in synchronism with the video signal, and N signals $I_1$ to $I_N$ are stored in the serial/parallel conversion circuit 7 in synchronism with the signal $T_{sp}$. Note that the serial/parallel conversion circuit 7 can be formed from, e.g., a shift register.

The horizontal scanning timing circuit 6 outputs a signal $T_m$ when 1-line data of an input image is serial/parallel-converted. Then, outputs from the serial/parallel conversion circuit 7 are latched by a line memory 8. The line memory 8 latches the N signals $I_1$ to $I_N$ until a next signal $T_m$ is input.

A modulation circuit 9 outputs a signal to the bases of transistors $G_1$ to $G_N$ respectively connected to wiring electrodes $D_{y1}$ to $D_{yN}$ of the display panel 1 on the basis of the luminance values of the 1-line image data input to the line memory 8. The modulation circuit 9 outputs a phase-modulated signal in accordance with a signal $T_{mo}$ synchronized with a scanning signal applied to the row wiring. While the signal $T_{mo}$ is output, the modulation circuit 9 outputs a modulated signal corresponding to the luminance value of image data. The first embodiment employs a phase-modulated signal of a pulse width modulation scheme of changing the width of a voltage pulse in accordance with a luminance value. Therefore, a voltage +Vf/2 is applied to the column wiring of the display panel 1 with a pulse width corresponding to the luminance value of image data.

A scanning signal switching circuit 10 sequentially selects M row wirings of the display panel 1 in synchronism with an output from the modulation circuit 9 to apply the voltage to the selected row wiring. The switching timing is determined in synchronism with a horizontal sync signal $T_H$ output from the horizontal scanning timing circuit 6. A predetermined voltage (−Vf/2) is applied to a selected one of the wiring electrodes $D_{x1}$ to $D_{xM}$, and unselected electrodes are connected to GND.

The face plate (3117) side of the display panel 1 comprises a high-voltage terminal Hv which receives a high voltage for accelerating electrons emitted upon driving an electron-emitting device 3112 formed on a substrate 3111 in FIG. 31 and colliding the electrons against a fluorescent substance 3118. The high voltage is applied from an anode voltage control circuit 11 via a current detection circuit 12. The current detection circuit 12 detects a current value flowing from the anode voltage control circuit 11 to the high-voltage terminal Hv. The current detection circuit 12 realizes detection of a spacer current in the first embodiment.

A method of detecting the spacer current will be explained with reference to FIG. 2.

Figure 2:
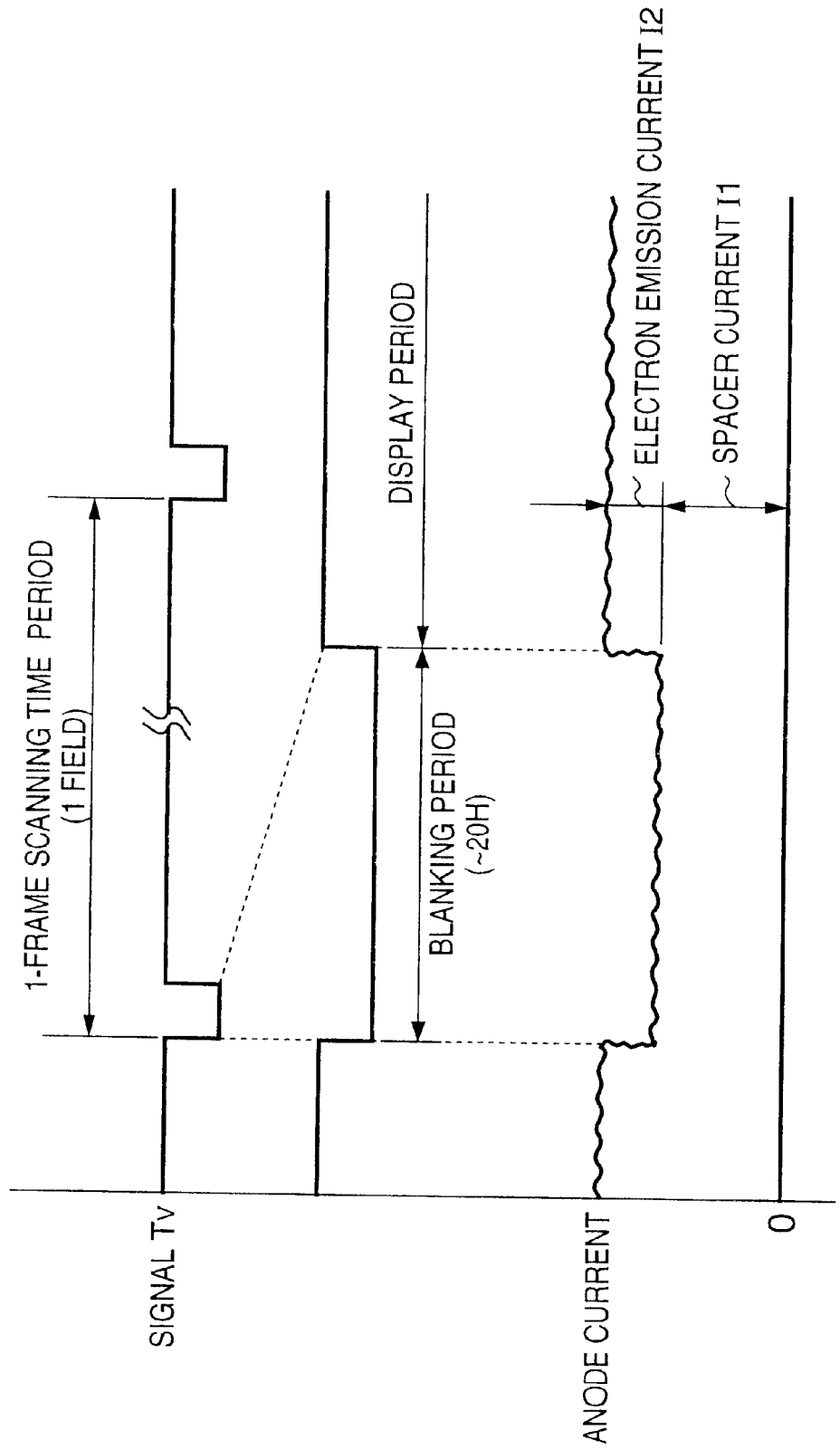
FIG. 2 is a timing chart for explaining a measurement timing according to the first embodiment.

FIG. 2 is a timing chart for explaining a method of detecting the spacer current within the blanking period of the scanning signal. In the display panel 1 of the first embodiment, a high DC voltage is applied to a face plate 3117 upon driving. At this time, the high voltage is also applied to a spacer 3120 interposed between the face plate 3117 and substrate 3111, and thus (spacer current+electron emission current ($I_1+I_2$)) flows as an anode current. For this reason, the period during which no electron emission current is generated, i.e., the blanking period between field signals as a non-display period during which no electron-emitting device 3112 is driven is suitable for detecting the spacer current with high precision.

During the blanking period, only the spacer current I1 flows. The current detection circuit 12 receives a signal Tv representing a vertical blanking period from the vertical scanning timing circuit 5, and detects the spacer current during the vertical blanking period.

The current detection circuit 12 detects the spacer current using an I/V conversion circuit or the like. The spacer 3120 used in the first embodiment has a resistance value of about $1 \times 10^8$ to $10^9 \Omega$. Spacers 3120 are uniformly arranged on the display panel 1 on the order of several ten to several hundred spacers depending on the size of the display panel 1.

For example, when the spacer resistance is $1 \times 10^9 \Omega$ and the number of spacers 3120 in use is 100, the spacer resistance when viewed from the anode (face plate 3117) side is ($1 \times 10^9/100$), i.e., about $10^7 \Omega$. If an anode voltage of 10 kV is applied, a current value flowing through the spacer 3120 owing to an anode current is about 1 mA, which can be detected by the current detection circuit 12.

As described above, according to the first embodiment, the spacer current can be detected on the anode-voltage application side to suppress the power consumption of the display panel 1 with respect to variations in spacer current.

For example, when a spacer current measured during the blanking period exceeds a predetermined value, the current detection circuit 12 can instruct the anode voltage control circuit 11 to decrease the anode voltage or can temporarily decrease the luminance level of a video signal output from the sync separation circuit 3, thereby decreasing the anode current of the whole display panel 1.

If any problem arises from heat generated from the display panel 1 by variations in spacer current, it can be solved by temporarily stopping display driving itself (e.g., increasing the voltage −Vf/2 applied to the row wiring or stopping driving itself).

The above control can suppress actual heat generation and power consumption of the display panel 1.

[Second Embodiment]

Figure 3:
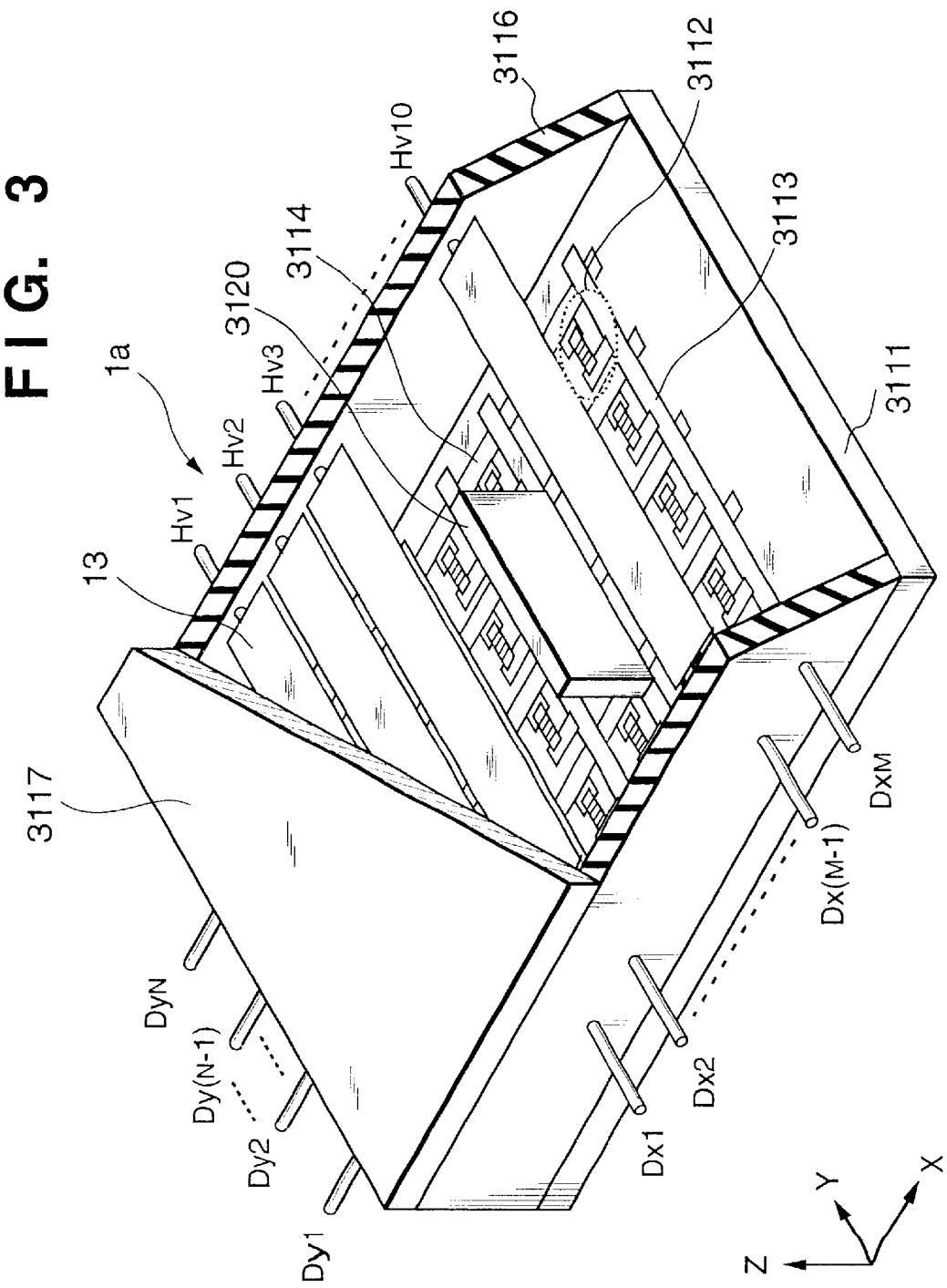
FIG. 3 is a partially cutaway perspective view showing the display panel of an image display apparatus according to the second embodiment of the present invention.

FIG. 3 is a perspective view of a display panel 1a according to the second embodiment of the present invention where part of the display panel 1a is removed for showing the internal structure of the panel.

The display panel of the second embodiment has almost the same structure as the display panel shown in FIG. 31 except that a fluorescent substance 3118 and a metal back 3119 are uniformly divided on a face plate 3117, as represented by fluorescent plates 13 in FIG. 3. In addition, the second embodiment uses a substrate 3111 as a rear plate without using any rear plate 3115. The same reference numerals as in FIG. 31 denote the same parts, and a description thereof will be omitted.

The fluorescent plates 13 are used to individually detect local variations in spacer current inside the display panel 1a, and enable detection of a partial anode current or the like, compared to the first embodiment. The second embodiment employs 10 divided fluorescent plates 13, and the respective fluorescent plates 13 comprise electrodes for applying anode voltages $H_{v1}$ to $H_{v10}$. Note that the division number of fluorescent plates 13 is not limited to the second embodiment and can be arbitrarily set.

Figure 4:
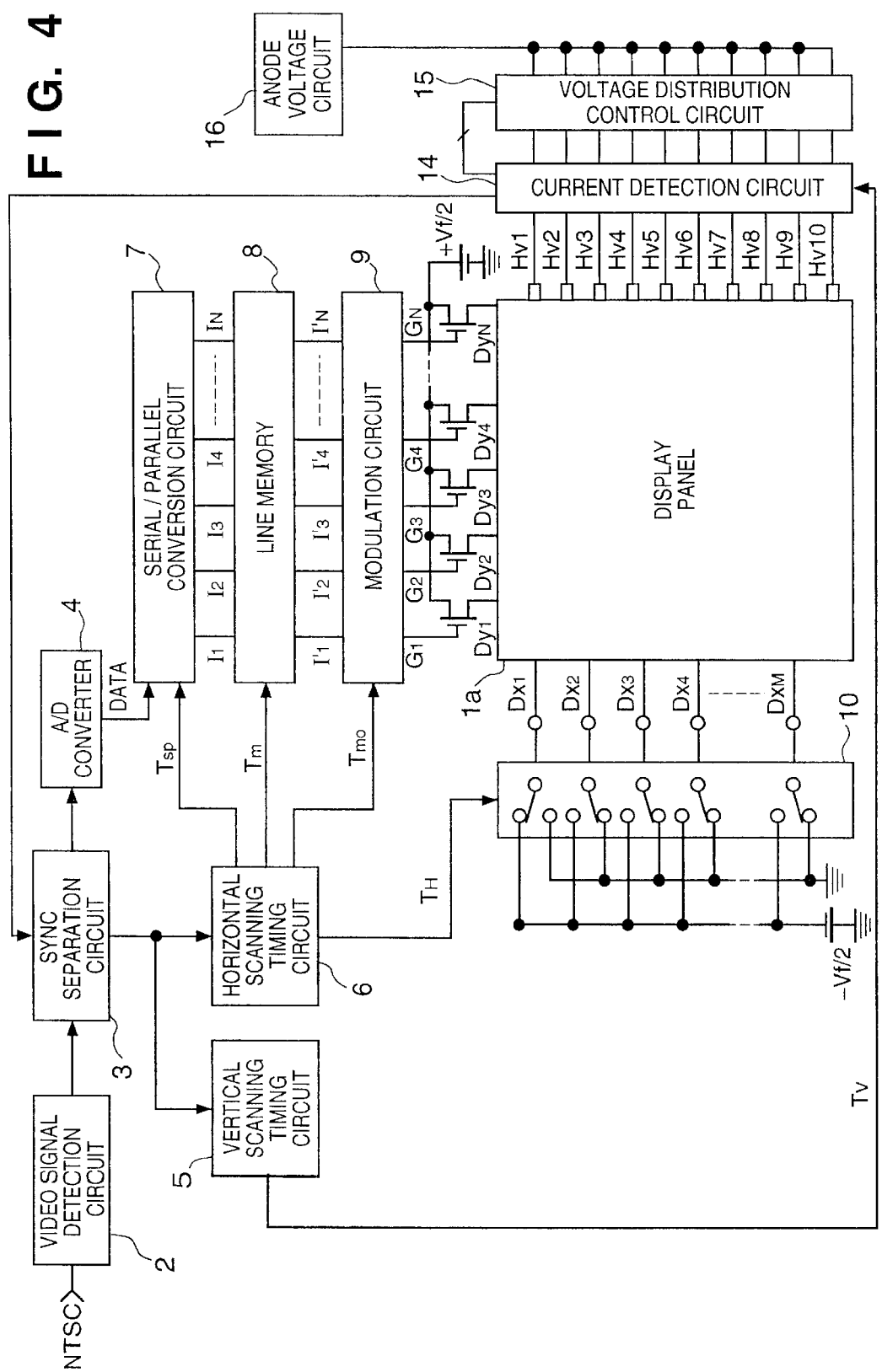
FIG. 4 is a block diagram showing the arrangement of a driving circuit for driving the display panel of the image display apparatus according to the second embodiment.

FIG. 4 is a block diagram showing the arrangement of a driving circuit for the display panel in FIG. 3. This circuit is different from the circuit in FIG. 1 in that a current detection circuit 14 is commonly connected to the high-voltage terminals $H_{v1}$ to $H_{v10}$ of the fluorescent plates 13 divided on the face plate 3117 side and that a voltage distribution control circuit 15 for applying high voltages to the respective high-voltage terminals is arranged. Since an anode voltage circuit 16 connected to the voltage distribution control circuit 15 and the remaining arrangement are the same as in FIG. 1, the same reference numerals as in FIG. 1 denote the same parts, and a description thereof will be omitted.

The second embodiment can detect the anode current of the display panel 1a along the row wiring direction because the fluorescent substance and metal back on the face plate 3117 are divided and provided with high-voltage extraction portions.

The current detection circuit 14 can detect a vertical blanking period from a signal Tv from a vertical scanning timing circuit 5 to individually detect anode currents flowing into the respective divided fluorescent plates 13, similarly to the first embodiment. The current values detected in this way can be fed back to the voltage distribution control circuit 15 to individually control voltage values applied to the terminals $H_{v1}$ to $H_{v10}$.

The current detection circuit 14 may use an I/V conversion circuit used in the first embodiment. I/V-converted outputs are individually output as analog voltage values to the voltage distribution control circuit 15.

When a detected anode current value is larger than a current value set for a predetermined high voltage, the voltage distribution control circuit 15 controls a high voltage corresponding to the area.

An output signal from the current detection circuit 14 is also output to the sync separation circuit 3. With this operation, when an anode current value is larger than a predetermined value, the luminance of a video signal output from the sync separation circuit 3 is decreased to reduce the anode current of the whole display panel, similarly to the first embodiment.

Further, the second embodiment adopts 10 fluorescent plates 13 for applying the anode voltage which are divided along the row direction, and thus can decrease only the display luminance of a desired area in synchronism with a row-direction scanning signal. This control performs both detection of the spacer current and current control in units of divided areas, so the display luminance of the display panel 1a may vary depending on the degree of control. If the luminance greatly varies and the anode current must be controlled, display driving may be stopped. In this case, application of all high voltages is stopped, or a voltage Vf for driving the device is decreased.

As described above, according to the second embodiment, the anode electrode on the face plate side is divided into a plurality of electrodes which are respectively provided with terminals for applying high voltages. This arrangement allows locally detecting variations in spacer current and individually controlling application of a high voltage with respect to each current. As a result, the display panel can be driven while suppressing heat generation and power consumption.

[Third Embodiment]

Figure 5:
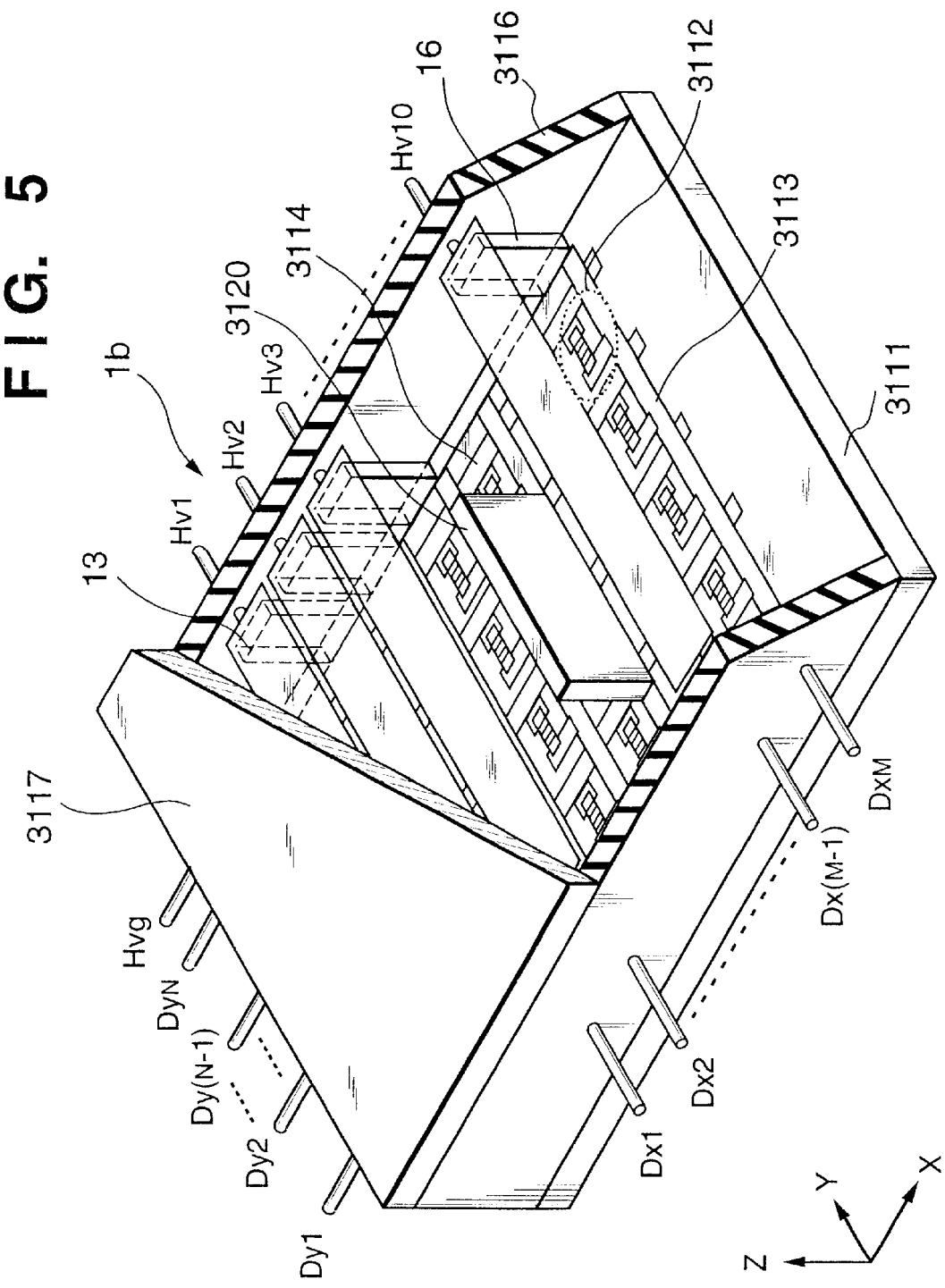
FIG. 5 is a partially cutaway perspective view showing the display panel of an image display apparatus according to the third embodiment of the present invention.

FIG. 5 is a perspective view of a display panel 1b according to the third embodiment of the present invention. In FIG. 5, part of the panel is removed for showing the internal structure of the panel.

In the third embodiment, dummy spacers 16 are formed from the same material by the same manufacturing method as spacers 3120 on a dummy wiring 17 formed along the column wiring in the display panel of the second embodiment shown in FIG. 3. Similar to the second embodiment, the dummy spacers 16 respectively correspond to a plurality of fluorescent plates 13 each including a fluorescent substance and metal back. The dummy spacers 16 are equal in number to 10 divided fluorescent plates 13.

The dummy wiring 17 is formed at a position independently of row and column wirings connecting electron-emitting devices 3112 laid out in a matrix.

The first and second embodiments detect a current value flowing through the spacer itself in the display panel, whereas the third embodiment detects a current value flowing through the dummy spacer 16.

As described above, the dummy spacer 16 is formed from the same material by the same method as the spacer 3120, but is manufactured with a resistance value lower by about one or two orders of magnitudes, which can widen the dynamic range of a current value to be actually detected.

Figure 6:
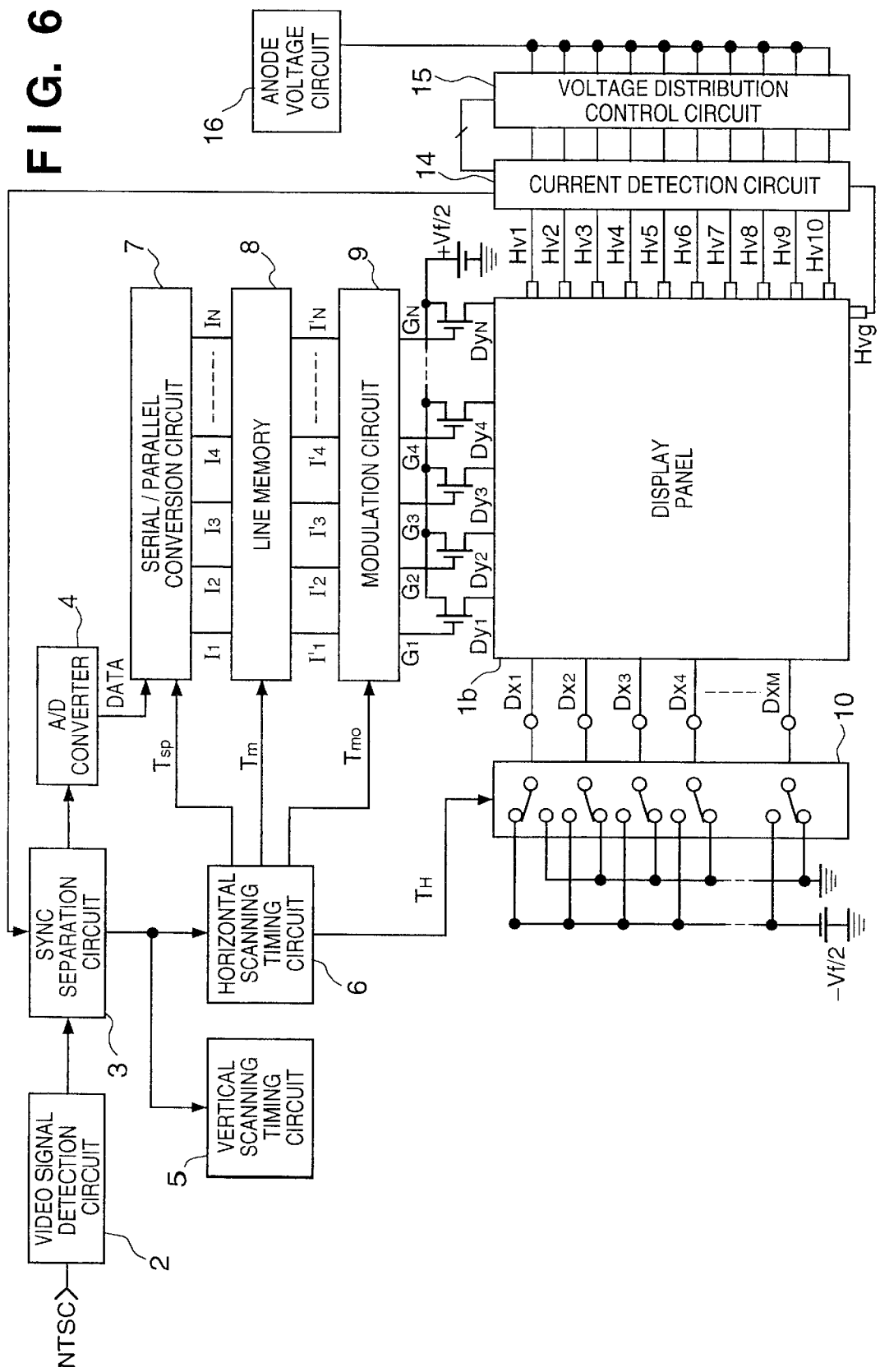
FIG. 6 is a block diagram showing the arrangement of a driving circuit for driving the display panel of the image display apparatus according to the third embodiment.

FIG. 6 is a block diagram showing the arrangement of a driving circuit for the display panel 1b of the third embodiment. This arrangement is almost the same as the circuit of the second embodiment shown in FIG. 4 except that a current detection circuit 14 measures a current value flowing through the dummy spacer 16. Similar to the second embodiment, this driving circuit comprises a voltage distribution control circuit 15 and an anode voltage circuit 16. The 10 divided fluorescent plates 13 are respectively provided with high-voltage application electrodes $H_{v1}$ to $H_{v10}$, and high voltages are also applied to the dummy spacers 16.

A current flowing through each dummy spacer 16 outputs to a terminal $H_{vg}$ through the dummy wiring 17 (FIG. 5) formed along the column direction. The terminal $H_{vg}$ is connected to the current detection circuit 14 where a current value flowing through the terminal $H_{vg}$ is measured to measure a current value flowing through each dummy spacer 16. The current may be detected by I/V conversion as in the second embodiment.

As an advantage of the third embodiment, the spacer current can always be detected regardless of the video signal because the dummy spacers 16 which receive high voltages are commonly connected to the dummy wiring 17 to monitor currents flowing into the terminal $H_{vg}$.

Note that the third embodiment adopts the divided fluorescent plates 13. However, the above detection method detects the total of currents flowing through the dummy spacers 16, so the anode electrode on the face plate side may not be divided.

As described above, the current value of each dummy spacer 16 formed on the display panel can be detected and used for application control of a high voltage and control of the luminance signal level, thereby suppressing heat generation and power consumption of the display panel, similar to the first and second embodiments.

[Fourth Embodiment]

The driving circuit of an image display apparatus according to the fourth embodiment of the present invention will be explained in detail with reference to the accompanying drawings. In the following description, similar to the above-described embodiments, the display scanning method in the display panel is non-interlace line-sequential scanning. To display an image with gradation, the electron-emitting period within one horizontal scanning period (1H) is controlled by the time width of a modulated signal to control the total light-emitting quantity of the fluorescent substance and realize gradation expression.

Figure 7:
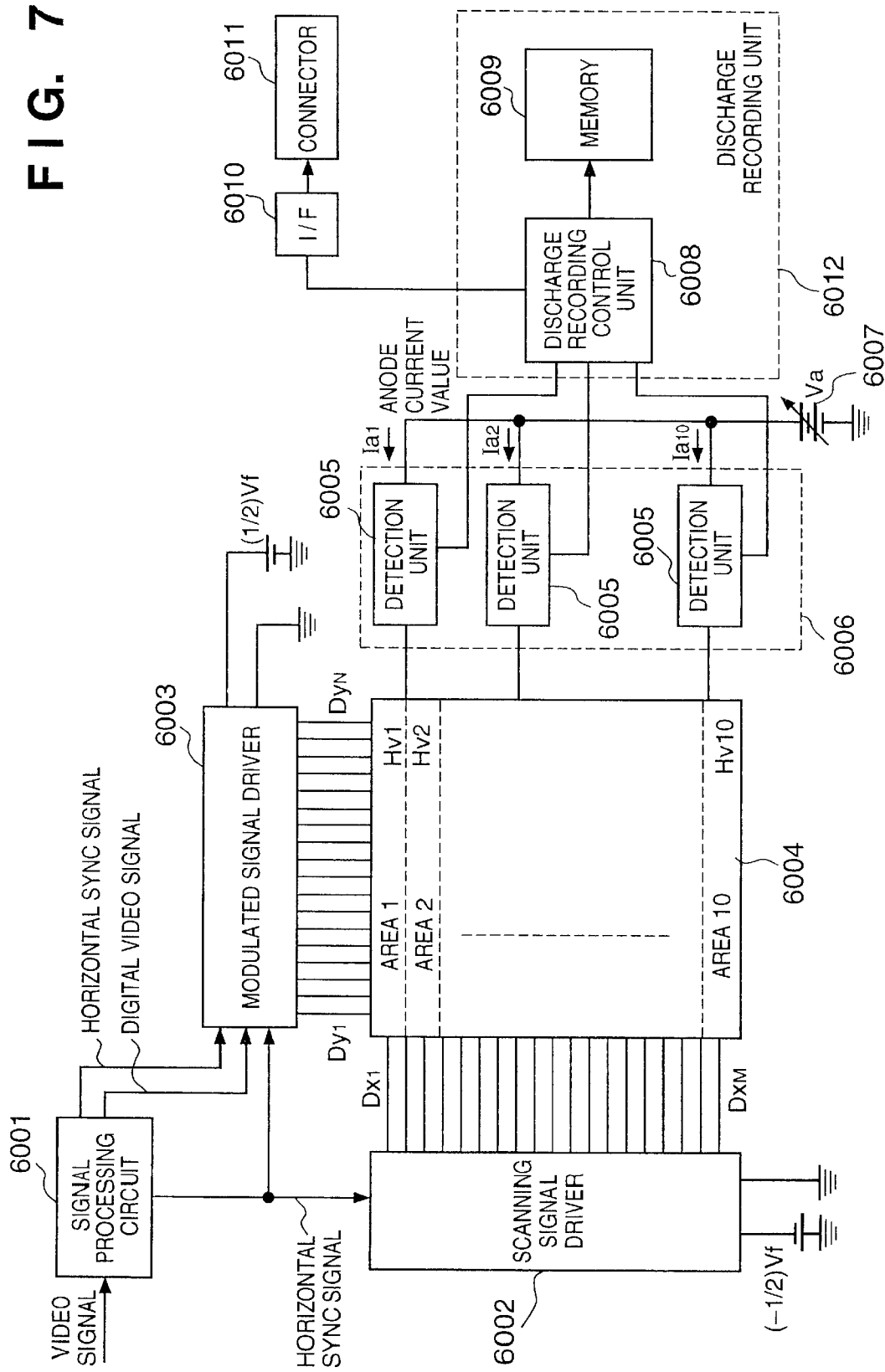
FIG. 7 is a block diagram showing the arrangement of an image display apparatus according to the fourth embodiment of the present invention.

FIG. 7 is a block diagram showing the arrangement of the driving circuit and connection between respective units in the image display apparatus according to the fourth embodiment of the present invention.

In FIG. 7, reference numeral 6001 denotes a signal processing circuit which receives a video signal such as an NTSC signal to generate a horizontal sync signal, vertical sync signal, digital video signal, and the like. The signal processing circuit 6001 includes a video intermediate frequency circuit, video signal detection circuit, sync separation circuit, low-pass filter, A/D conversion circuit, timing control circuit, and the like. Reference numeral 6004 denotes an image display unit which has the same arrangement as the display panel 1a (FIG. 3) of the second embodiment except that no spacer 3120 is arranged, as will be described below with reference to FIG. 9. Reference numeral 6002 denotes a scanning signal driver for sequentially selecting and driving the row wirings of the image display unit 6004, That is, the scanning signal driver 6002 outputs a scanning signal (to be described later) for line-sequential scanning on the basis of a horizontal sync signal separated by the signal processing circuit 6001. Reference numeral 6003 denotes a modulated signal driver for driving the column wirings of the image display unit 6004 in accordance with a video signal and outputting a modulated signal (to be described later) based on a horizontal sync signal, vertical sync signal, digital video signal, and the like separated by the signal processing circuit 6001.

Reference numeral 6006 denotes a discharge detection unit which has a plurality of anode current detection units 6005 for detecting discharge generated in the image display unit 6004. Discharge detected by the discharge detection unit 6006 is sent to a discharge recording control unit 6008 of a discharge recording unit 6012 and stored in a memory 6009. Information stored in the memory 6009 may be sent to and processed by an external computer device or the like via an interface 6010 and a connector 6011. The discharge detection unit 6006 and discharge recording unit 6012 will be described in detail later.

Figure 8:
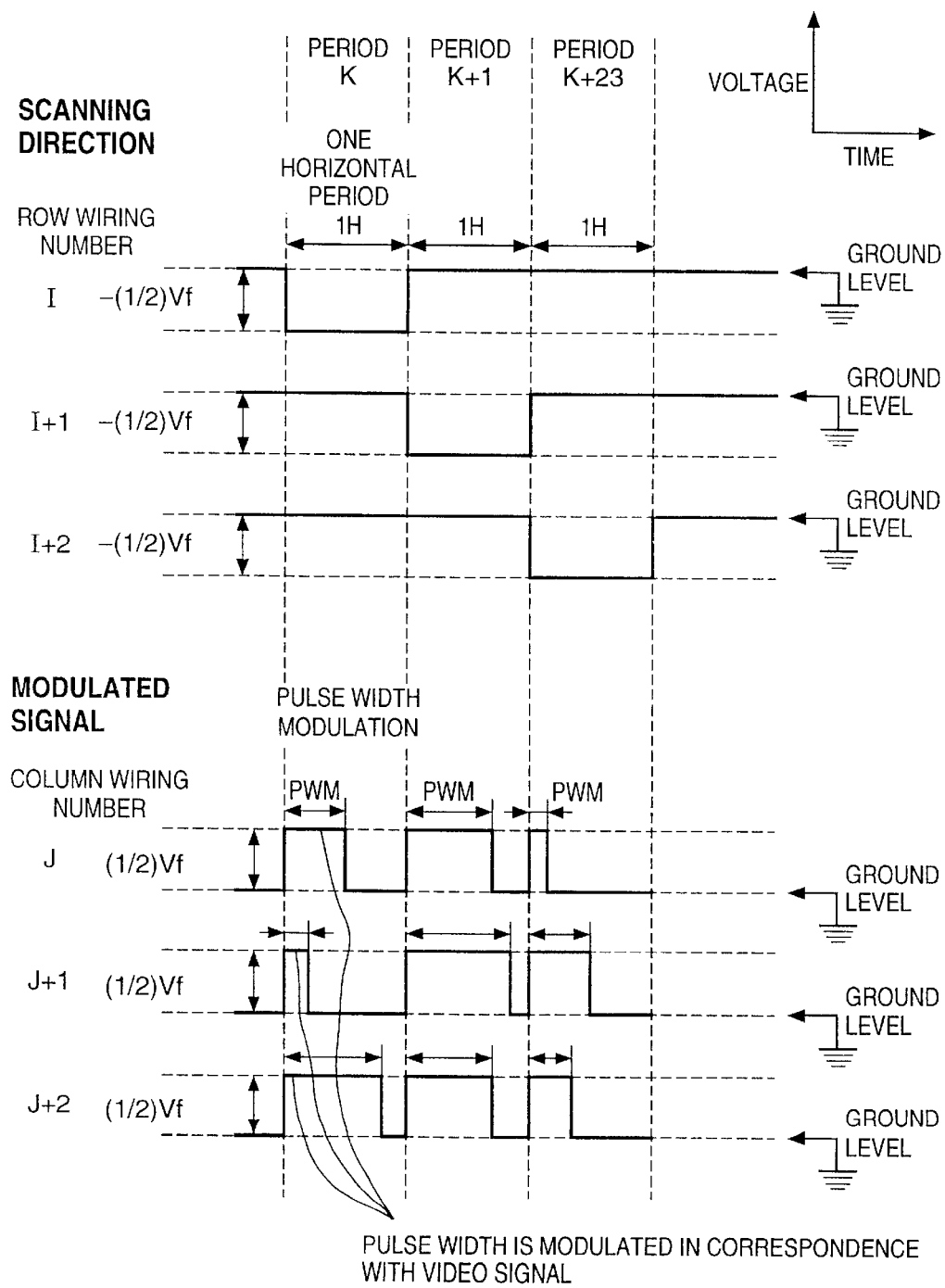
FIG. 8 is a timing chart showing the driving timing of the image display apparatus according to the fourth embodiment.

FIG. 8 is a timing chart showing an example of the voltage applied to the terminals of the row wiring (i.e., wiring to which the scanning signal is supplied) and the column wiring (i.e., wiring to which the modulated signal is supplied) in driving the image display unit 6004 of the image display apparatus according to the fourth embodiment of the present invention.

The timing chart in FIG. 8 shows voltages applied to row wirings on rows I, I+1, and I+2 and column wirings on columns J, J+1, and J+2 on the modulated signal side while sequentially driving the row wirings I, I+1, and I+2 of the image display unit 6004. In FIG. 8, $1<I<M-2$ and $1<J<N-2$ inevitably hold. M and N represent the total numbers row and column wirings, respectively.

In FIG. 8, an image of the $I_{th}$ row is displayed during one horizontal scanning period K, an image of the $(I+1)_{th}$ row is displayed during the period (K+1), and an image of the $(I+2)_{th}$ row is displayed during the period (K+2).

Row wirings serving as the scanning side in non-interlace line-sequential scanning are sequentially selected every horizontal scanning period (to be referred to as 1H hereinafter). Row wirings on selected rows sequentially receive scanning signal having a pulse width corresponding to 1H and a peak value $-Vf/2$ (Vf is a driving voltage; Vf=about $2V_{th}$ ($V_{th}$=threshold voltage)). After the non-interlace line-sequential scanning is done for all row wirings, it is repeated from the first row.

At this time, a modulated signal having a peak value Vf/2 is applied to all column wirings in synchronism with the scanning signal applied to the row wiring for a time (pulse width) corresponding to a video signal (luminance) displayed on a selected row.

This modulated signal rises in synchronism with the trailing edge of the scanning signal, and falls after maintaining the peak value Vf/2 for a time width corresponding to the value (luminance) of the video signal. (The period between the leading and trailing edges of the modulated signal will be simply referred to as the pulse width of the modulated signal). The pulse width of the modulated signal corresponds to the luminance of each of three, R, G, and B colors obtained when a video signal displayed on a selected row is color-separated. In practice, the pulse width is not simply proportional to the luminance because various corrections are done to display a high-quality image.

By applying a voltage having a pulse width corresponding to an input video signal to each scanning row, the driving voltage Vf is applied to cold cathode devices on a selected row for a time corresponding to the pulse width of the modulated signal. Since the emission current Ie of the cold cathode device has definite threshold characteristics (to be described later) with respect to the driving voltage Vf, an image corresponding to a desired video signal is displayed on a selected row. Furthermore, an image is displayed by all cold cathode devices in the image display unit 6004 by sequentially scanning all row wirings.

(Structure of Anode Electrode of Display Panel)

The image display unit (display panel) 6004 of the fourth embodiment will be explained in detail with reference to FIG. 9.

Figure 9:
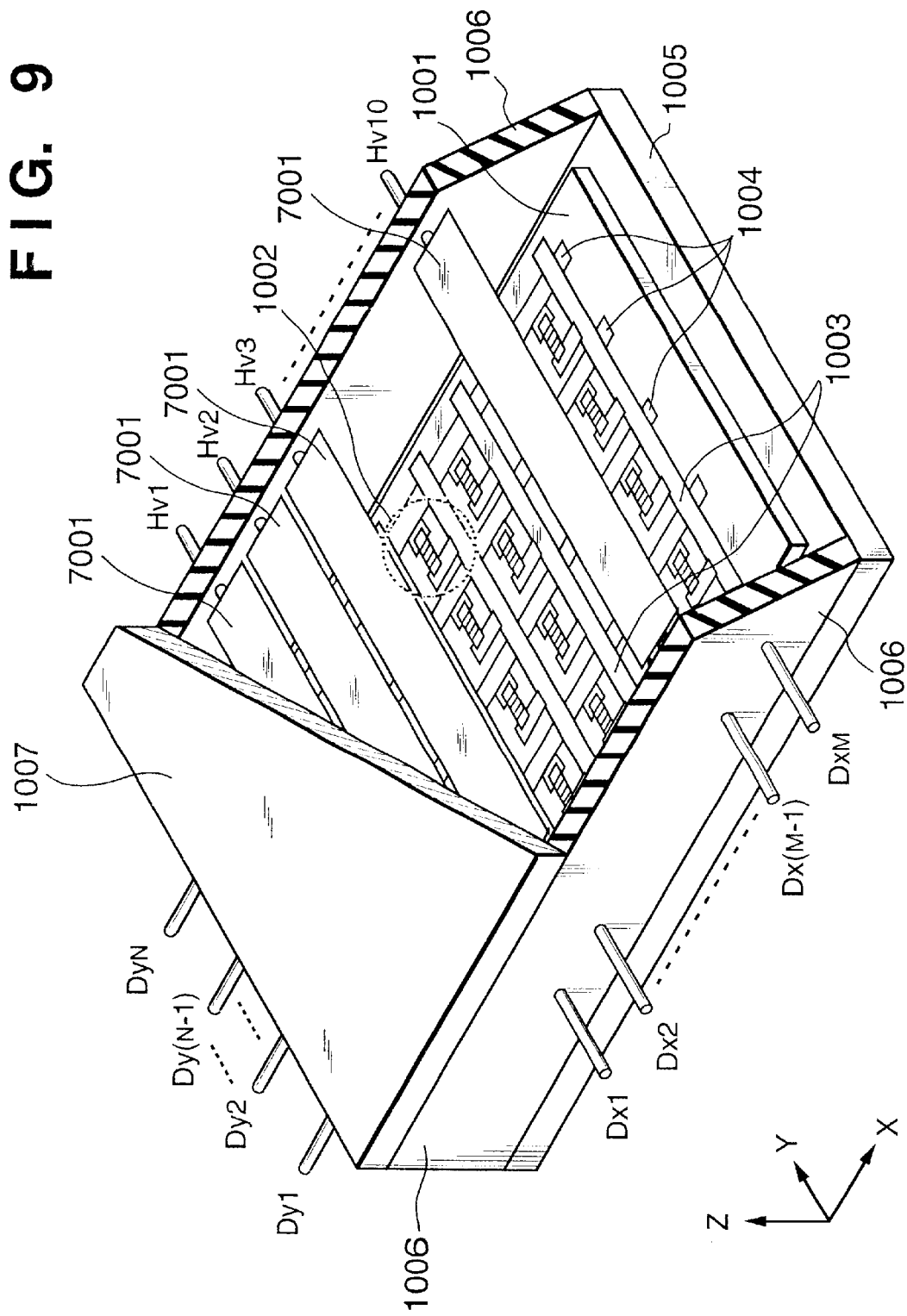
FIG. 9 is a partially cutaway perspective view showing the outer appearance of the image display unit of the image display apparatus according to the fourth embodiment of the present invention.

FIG. 9 is a perspective view for explaining an anode electrode 7001 and its terminal in the display panel used in the fourth embodiment where part of the panel side wall (frame) and face plate, fluorescent substance, and like are not illustrated for showing the internal structure of the display panel.

In FIG. 9, reference numeral 1001 denotes a device substrate; 1005, a rear plate; 1006, a side wall; 1007, a face plate; 1002, a cold cathode device; 1003, a row wiring; and 1004, a column wiring. Reference symbols $D_{x1}$ to $D_{xM}$ denote row terminals respectively connected to the row wirings 1003; and $D_{y1}$ to $D_{yN}$, column terminals respectively connected to the column wirings 1004. The remaining structure is the same as the structure of the above-mentioned display panel 1a, and a detailed description thereof will be omitted.

Reference numerals 7001 denote anode electrodes. As described above, the anode electrodes 7001 are electrodes for applying a high voltage on the anode side including the fluorescent substance, black conductive material, and metal back. In the fourth embodiment, as shown in FIG. 9, the anode electrodes 7001 are divided into a plurality of areas, and anode electrode terminals $H_{v1}$ to $H_{v10}$ respectively connected to the anode electrodes 7001 are arranged outside the vacuum container. For illustrative convenience, FIG. 9 does not illustrate the anode electrode terminals $H_{v4}$ to $H_{v9}$ and corresponding anode electrodes 7001 in order to explain the internal structure.

(Connection of Discharge Detection Unit and Discharge Recording Unit)

The arrangement and operation of these anode electrodes 7001 will be explained in detail with reference to FIG. 7. In the fourth embodiment, the discharge detection unit 6006 comprises the anode current detection units 6005 for detecting currents flowing through respective anode electrodes.

As shown in FIG. 9, a plurality of electrodes 7001 are arranged on the anode side of the multi electron source, and the terminals $H_{v1}$ to $H_{v10}$ connected to the anode electrodes are connected to a high-voltage source 6007 via the anode current detection units 6005. The fourth embodiment employs a plurality of anode current detection units 6005 in order to independently monitor changes in anode current in a plurality of divided areas, thereby detecting the presence/absence and size of discharge in the vacuum container and accurately detecting the area where the discharge has occurred.

Figure 10:
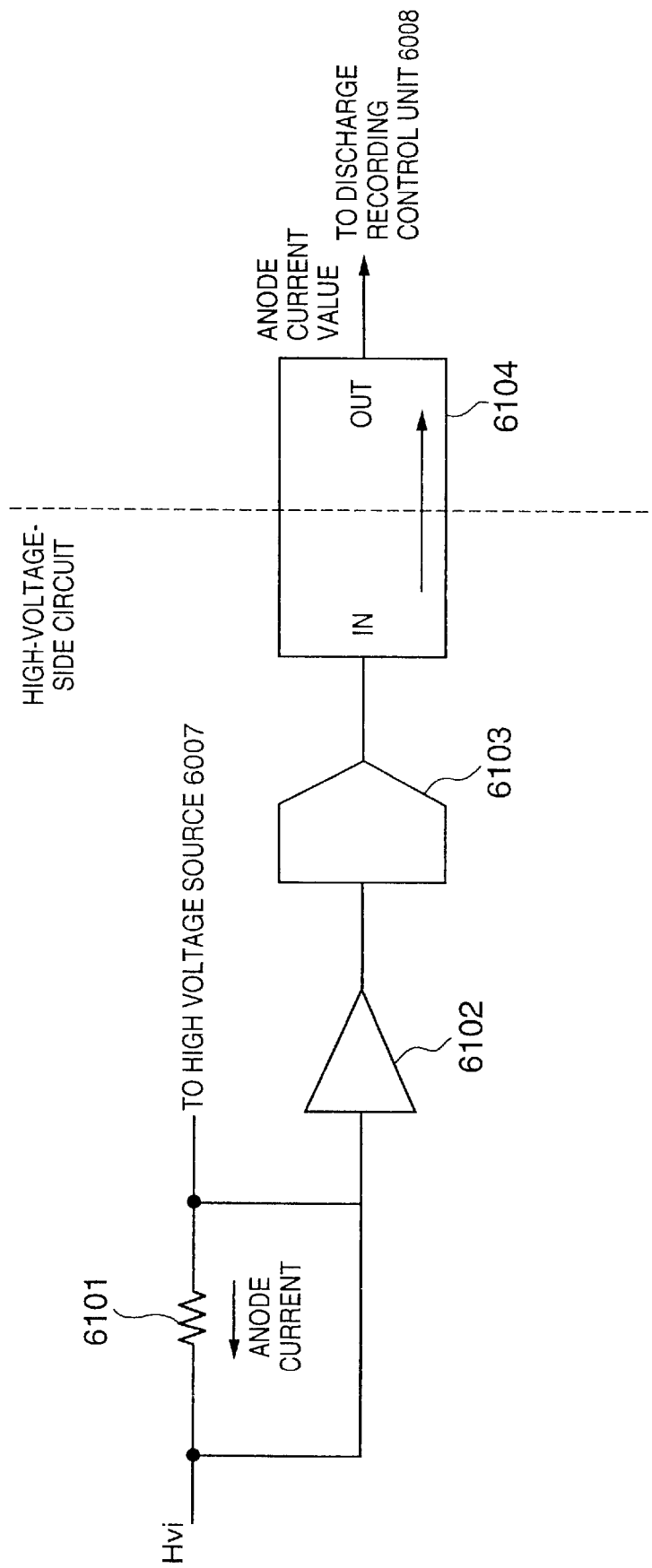
FIG. 10 is a circuit diagram showing the circuit arrangement of the anode current detection unit of the image display apparatus according to the fourth embodiment.

FIG. 10 is a circuit diagram showing the circuit arrangement of the anode current detection unit 6005 according to the fourth embodiment.

In FIG. 10, $H_{vi}$ represents an anode electrode terminal connected to the anode electrode 7001 of the display panel 6004. A resistor 6101 is a current monitoring resistor for generating a voltage corresponding to an anode current flowing from the high-voltage source 6007 to the anode electrode 7001. Reference numeral 6102 denotes a differential amplifier for amplifying the potential difference generated across the current monitoring resistor 6101; 6103, an A/D converter for converting a voltage value amplified by the differential amplifier 6102 into a digital signal; and 6104, a photocoupler for isolating the differential amplifier 6102 and A/D converter 6103 as high-voltage-side circuits from the discharge recording control unit 6008 in order to stand the breakdown voltage. The sampling period of the A/D converter 6103 is preferably short in terms of detecting very-high-frequency discharge, and is set to 5 $\mu$sec for practical use in the fourth embodiment.

With this arrangement, a voltage value corresponding to a current flowing from the high-voltage source 6007 to the anode electrode 7001 due to discharge is amplified by the differential amplifier 6102 and converted into a digital signal, and the digital signal is set to and recorded on the discharge recording control unit 6008 via the photocoupler 6104.

If a mechanism for switching the gain of the differential amplifier 6102 to several values is adopted to widen the measurement range of the anode current, the anode current can be detected with higher precision.

The discharge recording unit 6012 of the fourth embodiment will be described. The discharge recording unit 6012 comprises the discharge recording control unit 6008 and a memory 6009. The discharge recording control unit 6008 writes information (voltage value) sent from the anode current detection unit 6005 in the memory 6009, and when discharge information is to be read out in maintenance of the image display apparatus by the serviceman, can read out and output information stored in the memory 6009.

If an anode current equal to or larger than a predetermined value is determined to flow on the basis of a voltage value (anode current value) detected by the anode current detection unit 6005, the discharge recording control unit 6008 stores in the memory 6009 the generation time and date (times and dates at the start and end of discharge; the information can be obtained from an internal timer (not shown)), the magnitude of the anode current (voltage value/monitoring resistance value), and the area where discharge occurred (any one of areas 1 to 10 corresponding to the terminals $H_{v1}$ to $H_{v10}$). In this case, information is additionally stored as history information in the memory 6009 without any overwrite so long as the memory 6009 does not overflow.

In the fourth embodiment, the maximum value of an emission current from one cold cathode device is estimated as about 10 $\mu$A, and the predetermined value of the anode current is set to 30 mA. The predetermined value is determined in consideration of an emission current when all cold cathode devices (M=3,072) in the column direction simultaneously emit electrons owing to line-sequential driving. This predetermined value must be changed depending on the structures of the cold cathode device and image display unit and the magnitudes of the driving voltage, anode voltage Va, and the like.

If the memory 6009 has a sufficiently large capacity, it may be formed from a nonvolatile memory, battery-driven RAM, or the like. The fourth embodiment adopts a hard disk as the memory 6009. In reading out information from the memory 6009, the information is output from the external device connector 6011 via the interface 6010 in consideration of data consistency with an external device. The external device connected via the connector 6011 may be, e.g., a personal computer, display device for simply displaying data, or printer.

If discharge occurs in the display panel 6004, information about the discharge generation time and date, the size of the discharge (e.g., the change amount of the anode current), and a rough location (area) where the discharge occurred can be recorded as a history using the discharge detection unit 6006 and discharge recording unit 6012 with this arrangement.

To specify the location where discharge occurred is very effective for estimating the cause of the discharge. If the cause of the discharge can be estimated, a recovery operation can be appropriately performed.

For example, when discharge has concentratedly occurred in a given area and does not occur in the remaining areas, the cause can be estimated as the presence of an abnormal projection by a manufacturing error or abnormal characteristics of a cold cathode device at that position rather than a decrease in vacuum degree.

As another example, when discharge has randomly occurred in various areas, an abnormal operation can be confirmed on the whole image display unit 6004, and the cause can be estimated as a decrease in vacuum degree inside the vacuum container forming the image display unit 6004 under any influence.

Many image display apparatuses each having the discharge detection unit 6006, discharge recording unit 6012, memory 6009, and the like were manufactured to display an image. After a long-time durability test was conducted, some of these image display apparatuses suffered discharge upon long-time driving even with a very low probability, and the history of discharge was stored in the memory 6009.

One image display apparatus in which discharge occurred will be exemplified. The history information of discharge stored in the memory 6009 reveals that discharge occurred not in a DC manner but instantaneously, the generation frequency increased upon the lapse of long time after the long-time durability test was conducted, the magnitude of the anode current and the discharge generation location (area) changed, and discharge randomly occurred. From this, the cause of the discharge was estimated as a decrease in vacuum degree by any influence with the lapse of time.

As a measure against this, a getter material was additionally heated in order to increase the vacuum degree, and the vacuum degree was increased by the absorption operation of the getter film. As a result of this measure, generation of discharge in the image display apparatus was suppressed for a predetermined period, and a normal operation identical to that before the long-time durability test was confirmed.

The interior of the container including the cold cathode device 1002 is a low-pressure atmosphere at high vacuum degree, and a high voltage is applied to the container. For this reason, discharge readily occurs, and an unexpected discharge current rarely flows between the anode side and substrate 1001 side of the container. If a current by discharge is often generated, it may damage the cold cathode device or electrode such as row or column wiring.

The cause of discharge, which has not been cleared up yet, includes a decrease in vacuum degree, charge-up of the insulating layer of the substrate 1001, and projections and flashes erroneously formed in manufacturing the substrate 1001 and metal back 1009. However, the rare abnormal state such as discharge can be adjusted based on criterion for adjustment by recording the history of discharge and storing information for confirming whether the operation state of the image display apparatus has always been normal and information about the number of abnormal operations such as discharge. Adjustment for recovering a normal operation can therefore be done at good timing.

As described above, since history information about generation of discharge is stored in the memory in the image display apparatus of the fourth embodiment, whether the image display apparatus normally operates can be checked. As for an abnormal operation by discharge generated at a very low probability, the cause of the discharge can be estimated. Even if an abnormal operation occurs, the cause can be estimated. Accordingly, an appropriate measure for recovering a normal operation can be performed at a good timing.

Although the division number of areas is set to 10 for descriptive convenience in the fourth embodiment, it is preferably large in terms of detecting the discharge generation location. However, if the division number of anode electrodes on the face plate side actually increases, the manufacturing cost and the number of discharge detection units 6006 increase. Hence, the division number is set to a preferable value for practical use.

In the fourth embodiment, the anode electrode is divided in a direction parallel to the scanning line. The manner of division is not limited to this, and the anode electrode may be divided perpendicularly to the scanning line.

[Fifth Embodiment]

In the fifth embodiment, discharge is detected by monitoring the surface potential of a device substrate 1001 on which a plurality of cold cathode devices 1002 are arranged, using a plurality of surface potential measurement units (surface potential measurement systems) for the device substrate 1001, and the history of discharge is recorded using a discharge recording unit 6012 as a feature of the fifth embodiment.

(Structure of Surface Potential Measurement Electrode)

Figure 11:
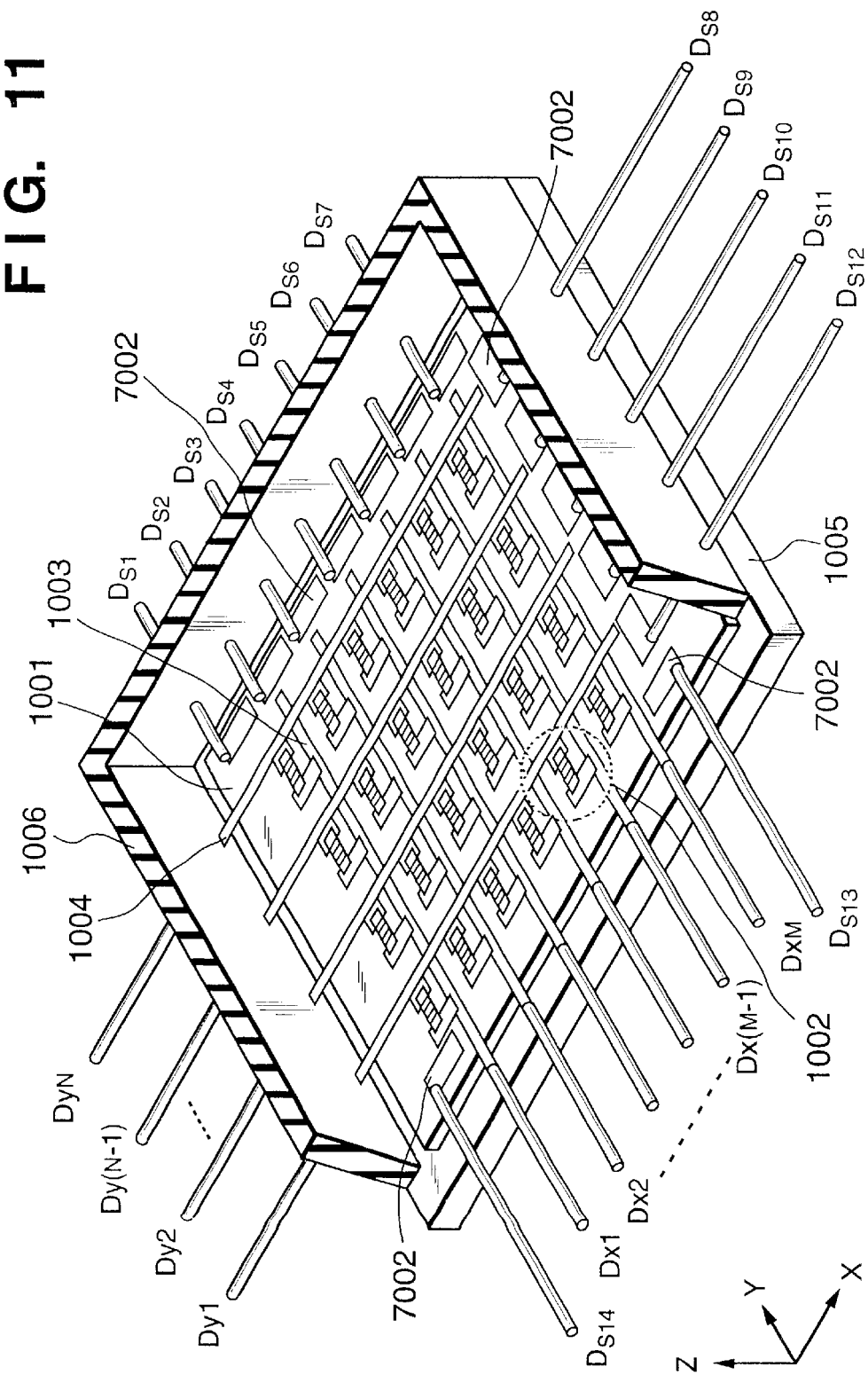
FIG. 11 is a partially cutaway perspective view showing the outer appearance of the image display unit of an image display apparatus according to the fifth embodiment.
Figure 12:
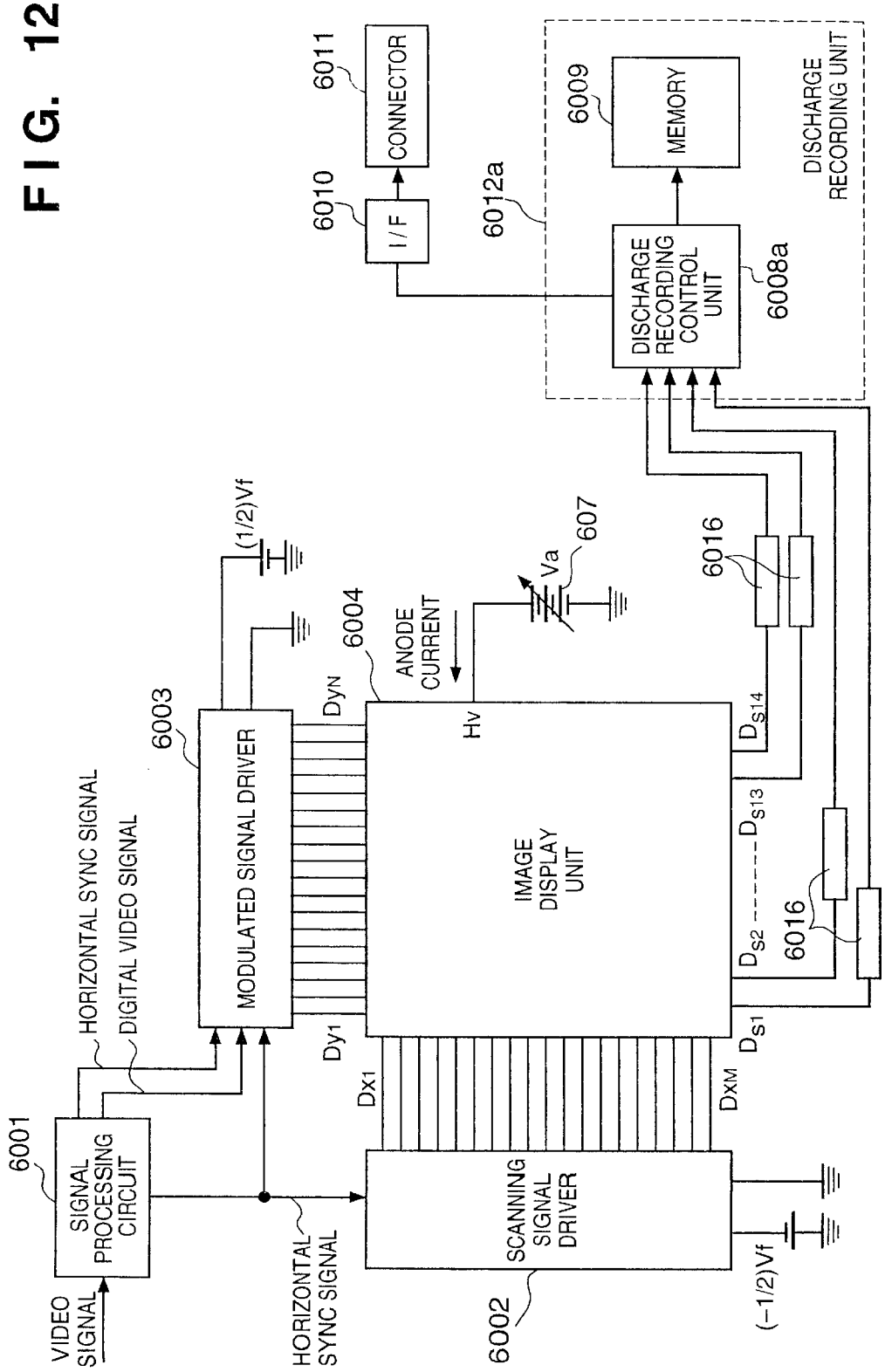
FIG. 12 is a block diagram showing the arrangement of the image display apparatus according to the fifth embodiment.

FIG. 11 is a partially cutaway perspective view of an image display unit 6004 for an image display apparatus according to the fifth embodiment. In FIG. 11, the face plate and part of the side wall (frame) are not illustrated in order to explain surface potential measurement electrodes 7002 as part of a discharge detection unit in the fifth embodiment. FIG. 12 is a block diagram showing the arrangement of a driving circuit for the image display apparatus of the fifth embodiment. In FIGS. 11 and 12, the same reference numerals as in the fourth embodiment denote the same parts, and a description thereof will be omitted.

In FIG. 11, reference numeral 7002 denote surface potential measurement electrodes.

The discharge detection unit of the fifth embodiment comprises the surface potential measurement electrodes 7002 and a surface potential measurement unit (to be described later). That is, the fifth embodiment newly employs the plurality of surface potential measurement electrodes 7002 on the device substrate 1001. Although the surface potential measurement electrodes 7002 can have various shapes, they have a pattern shown in FIG. 11 in the fifth embodiment.

The surface potential measurement electrodes 7002 are arranged on the device substrate 1001 while being electrically isolated from row and column wirings 1003 and 1004, cold cathode devices 1002, and the like. The surface potential measurement electrodes 7002 are connected to an external circuit via external terminals $D_{s1}$ to $D_{s14}$ of the vacuum container.

A plurality of surface potential measurement electrodes 7002 are arranged on the device substrate 1001 in order to independently monitor rises in surface potential of the device substrate 1001 in units of several areas, and when discharge occurs on the substrate 1001, to record area information where the discharge has occurred, thereby easily estimating the cause of the discharge. If the cause of discharge can be estimated, an appropriate recovery operation for recovering the image display apparatus to a normal operation can be performed. Note that the surface potential measurement electrodes 7002 suffice to be made of a conductive material, can be formed from the same material as the row and column wirings 1003 and 1004 or device electrodes, and can be manufactured at the same time as the wirings or device electrodes are manufactured on the substrate. In the fifth embodiment, the surface potential measurement electrodes 7002 are manufactured by the same method as the device electrodes (1102 and 1103 in FIG. 19A).

(Connection of Surface Potential Measurement Electrode 7002 to Surface Potential Measurement System, Discharge Recording Unit, and the Like)

FIG. 12 is a block diagram for explaining connection of the image display unit 6004 of the image display apparatus according to the fifth embodiment to drivers 6002 and 6003 for driving the image display unit 6004, surface potential measurement units 6016, a discharge recording control unit 6008a, and the like. The same reference numerals as in the above arrangement denote the same parts.

As shown in FIG. 12, the terminals $D_{s1}$ to $D_{s14}$ of the surface potential measurement electrodes 7002 of the image display unit 6004 are respectively connected to the surface potential measurement units 6016 having a high input impedance ($10^{13}\Omega$ or more) to independently monitor changes in potential. If discharge occurs on the substrate 1001, the potential at the location on the device substrate 1001 rises. The phenomenon such as surface discharge raises not only the potential at the discharge generation location but also the potential of a peripheral conductive member. When discharge occurs around a surface potential measurement electrode 7002, its potential rises. Thus, a surface potential measurement unit 6016 connected to this surface potential measurement electrode 7002 can detect generation of the discharge.

A discharge recording unit 6012a of the fifth embodiment comprises the discharge recording control unit 6008 and a memory 6009 which have almost the same arrangement as in FIG. 10. The discharge recording control unit 6008a is different from the above-described discharge recording control unit 6008 in that potentials generated at the external terminals $D_{s1}$ to $D_{s14}$ are input from the respective surface potential measurement units 6016, the voltage values are amplified by a differential amplifier 6102, and the amplified voltage values are converted into digital signals by an A/D converter 6103. In this fashion, changes in surface potential of each surface potential measurement electrode 7002 are monitored. If a change in surface potential exceeds a predetermined value, the discharge recording control unit 6008*a* determines that discharge occurred, and stores in the memory 6009 the discharge generation time and date (times and dates at the start and end of the discharge), the change amount of the surface potential, and the number of the electrode at which the change in surface potential exceeds the predetermined value.

Further, the discharge recording control unit 6008*a* is constituted to allow reading out discharge information stored in the memory 6009 in, e.g., maintenance of the image display apparatus by the serviceman. The information read out from the memory 6009 can be output to an external device via an interface 6010 and an external device connector 6011.

If discharge occurs, information about the discharge generation time and date, the size of the discharge (e.g., the change amount of the anode current), and a rough location (area) where the discharge occurred can be recorded as a history using the discharge detection unit and discharge recording unit with this arrangement.

The present inventors have confirmed that to specify the location where discharge occurred is very effective for estimating the cause of the discharge. If the cause of the discharge can be estimated, a recovery operation can be appropriately performed. For example, when discharge has randomly occurred in various areas, an abnormal operation can be confirmed on the whole image display unit. In this case, the cause can be estimated as a decrease in vacuum degree inside the vacuum container forming the image display unit under any influence.

Many image display apparatuses each having the discharge detection unit, discharge recording unit, memory, and the like were actually manufactured to display an image. After a long-time durability test was conducted, some of these image display apparatuses suffered discharge upon even with a very low probability, and the history of discharge was stored in the memory 6009.

One image display apparatus in which discharge occurred will be exemplified. The history information of discharge stored in the memory 6009 reveals that discharge occurred not in a DC manner but instantaneously, the generation frequency increased upon the lapse of long time after the long-time durability test was conducted, the generation location changed, and discharge randomly occurred. From this, the cause of the discharge was estimated as a decrease in vacuum degree with the lapse of time.

As a measure against this, a getter material was additionally heated in order to increase the vacuum degree, and the vacuum degree was increased by the absorption operation of the getter film. Consequently, generation of discharge in the image display apparatus was suppressed for a predetermined period, and a normal operation identical to that before the long-time durability test was confirmed.

As described above, since history information about discharge is stored in the image display apparatus of the fifth embodiment, whether the image display apparatus normally operates can be checked. As for an abnormal operation by discharge generated at a very low probability, the cause of the discharge can be estimated. Even if an abnormal operation occurs, the cause of the discharge can be estimated. Therefore, an appropriate measure for recovering a normal operation can be performed.

In the fifth embodiment, the surface potential measurement electrodes 7002 are arranged at 14 portions outside the image display area within the vacuum container, as shown in FIG. 11. However, the number and layout of surface potential measurement electrodes 7002, the size of the electrode, and the like are not limited. The surface potential measurement electrodes 7002 are preferably arranged on the device substrate 1001 within the vacuum container over an area as large as possible in order to detect discharge in an area as large as possible. However, the surface potential measurement electrodes 7002 are arranged outside the display area in order to avoid overlapping the image display area and manufacturing errors.

Although a larger number of surface potential measurement electrodes 7002 can detect discharge at higher resolution, the number of surface potential measurement electrodes 7002 is determined in consideration of the fact that the number of surface potential measurement circuits connected to them also increases, and the size of an area where discharge can be detected.

As described above, the image display apparatus of the fifth embodiment can provide information for estimating the cause of discharge for an abnormal operation such as generation of discharge.

Even if an abnormal operation occurs, the cause can be estimated whether the abnormal operation is based on generation of discharge, and information for performing proper adjustment can be provided to recover the image display apparatus to a normal operation.

[Sixth Embodiment]

Figure 13:
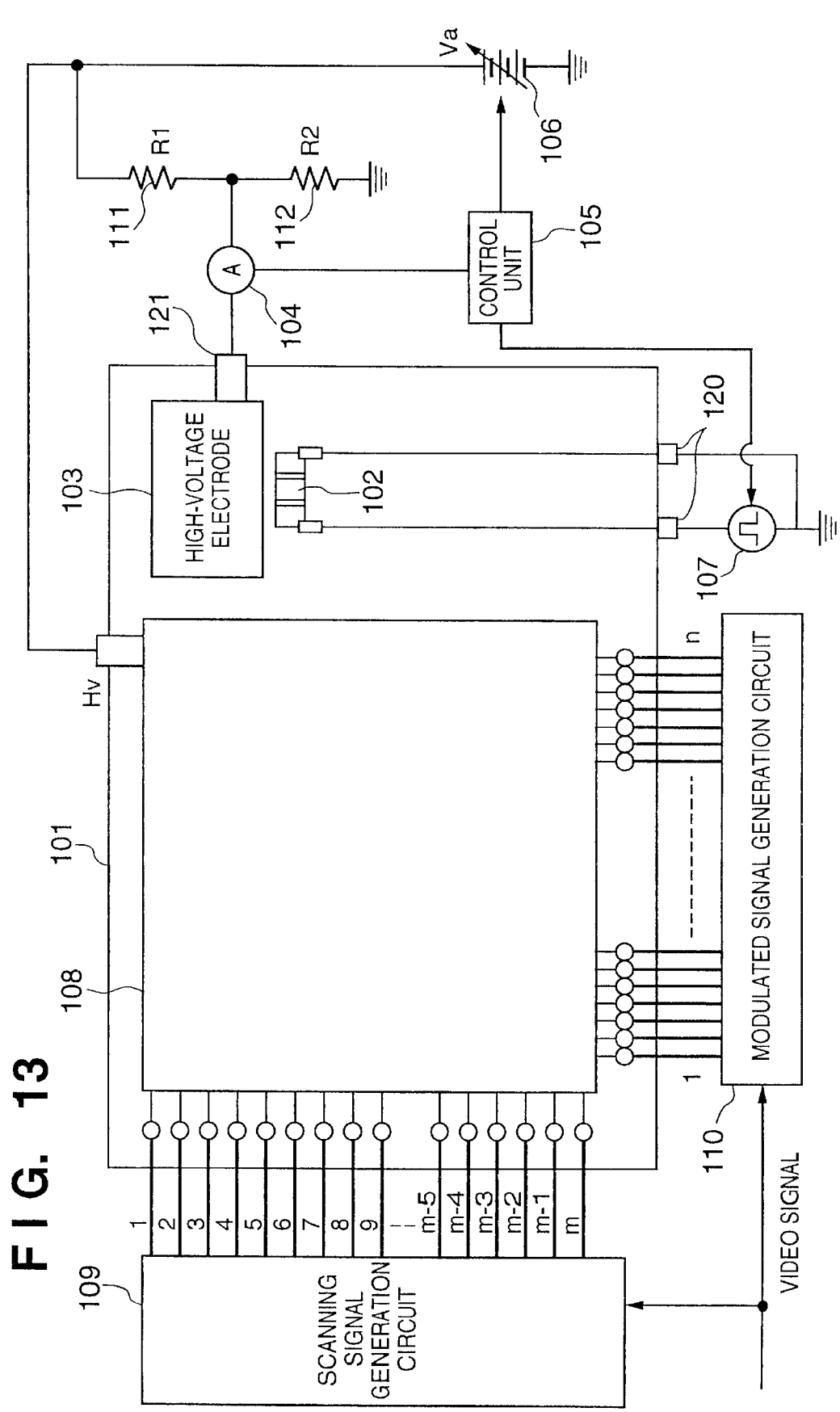
FIG. 13 is a block diagram for explaining connection between the display panel and peripheral circuit of an image display apparatus according to the sixth embodiment of the present invention.

FIG. 13 is a block diagram for explaining connection between the display panel and peripheral circuit of an image display apparatus according to the sixth embodiment of the present invention.

In FIG. 13, reference numeral 101 denotes a display panel having almost the same arrangement as in FIG. 31 except that the display panel 101 comprises a destruction detection high-voltage electrode 103 and detection device 102 (to be described later) and their terminals. A driving circuit for the display panel 101 includes a scanning signal generation circuit 109 for sequentially driving row wirings in accordance with an externally input video signal, a modulated signal generation circuit 110 for applying a modulated signal corresponding to the video signal to column wirings on a row selected by the video signal, and a high-voltage source 106 for inputting an acceleration voltage Hv. The scanning signal generation circuit 109 sequentially selects row terminals Dx1 to DxM of the display panel 101 and applies a predetermined voltage. The modulated signal generation circuit 110 applies a pulse width modulated signal corresponding to a video signal to column terminals $D_{y1}$ to $D_{yn}$.

In the sixth embodiment, at least one destruction detection cold cathode device 102 is formed at a location other than the image display area on the device substrate of the display panel 101. The destruction detection high-voltage electrode 103 is arranged above the destruction detection cold cathode device 102 (on the face plate side) to capture electrons emitted by the destruction detection cold cathode device 102. To prevent light emission unrelated to an image to be displayed, no fluorescent substance which emits light upon collision against electrons is desirably formed on the destruction detection high-voltage electrode 103. The destruction detection high-voltage electrode 103 receives, via a terminal 121, a voltage $\{Va \times R2/(R1+R2)\}$ obtained by dividing an output Va from the high-voltage source 106 by a resistor 111 (resistance value R1) and a resistor 112 (resistance value R2).

The sixth embodiment sets the resistance values R1 and R2 such that the voltage applied to the destruction detection high-voltage electrode 103 can capture an emission current and is set to a voltage (about 80 V) as low as possible. The voltage applied to the destruction detection high-voltage electrode 103 is set low in order to reduce the cost by omitting any high-voltage resistant measure (isolation) with respect to an ammeter 104 series-connected to the destruction detection high-voltage electrode 103.

A method of detecting destruction of the airtight container by the airtight container destruction detection means (destruction detection cold cathode device 102, destruction detection high-voltage electrode 103, and the like) will be explained below.

When power is supplied from a main power source (not shown) to the image display apparatus of the sixth embodiment, a pulse generator 107 applies a voltage pulse (voltage Vf) for emitting electrons to the destruction detection cold cathode device 102 via terminals 120. Note that the pulse generator 107 may start operating in response to a signal from a control unit 105 (to be described below). At the same time, the ammeter 104 series-connected between the destruction detection high-voltage electrode 103 and high-voltage source 106 detects the emission current Ie from the destruction detection cold cathode device 102. If the airtight container of the display panel 101 is destroyed, the interior of the airtight container is exposed to the atmospheric pressure, so electron emission from the destruction detection cold cathode device 102 is stopped not to detect any emission current Ie. Therefore, when no emission current Ie is detected even upon application of the driving voltage pulse for emitting electrons to the cold cathode device 102, the airtight container can be determined to be destroyed. Note that this control is done by the control unit 105. More specifically, when no current is detected by the ammeter 104 while applying the pulse signal from the pulse generator 107 to the cold cathode device 102 and the high voltage Va from the high-voltage source 106 to the high-voltage electrode 103, the control unit 105 determines that any abnormality occurs in the airtight container of the display panel 101, and stops applying the high voltage from the high-voltage source 106. At this time, the control unit 105 may stop operating the pulse generator 107.

Figure 14:
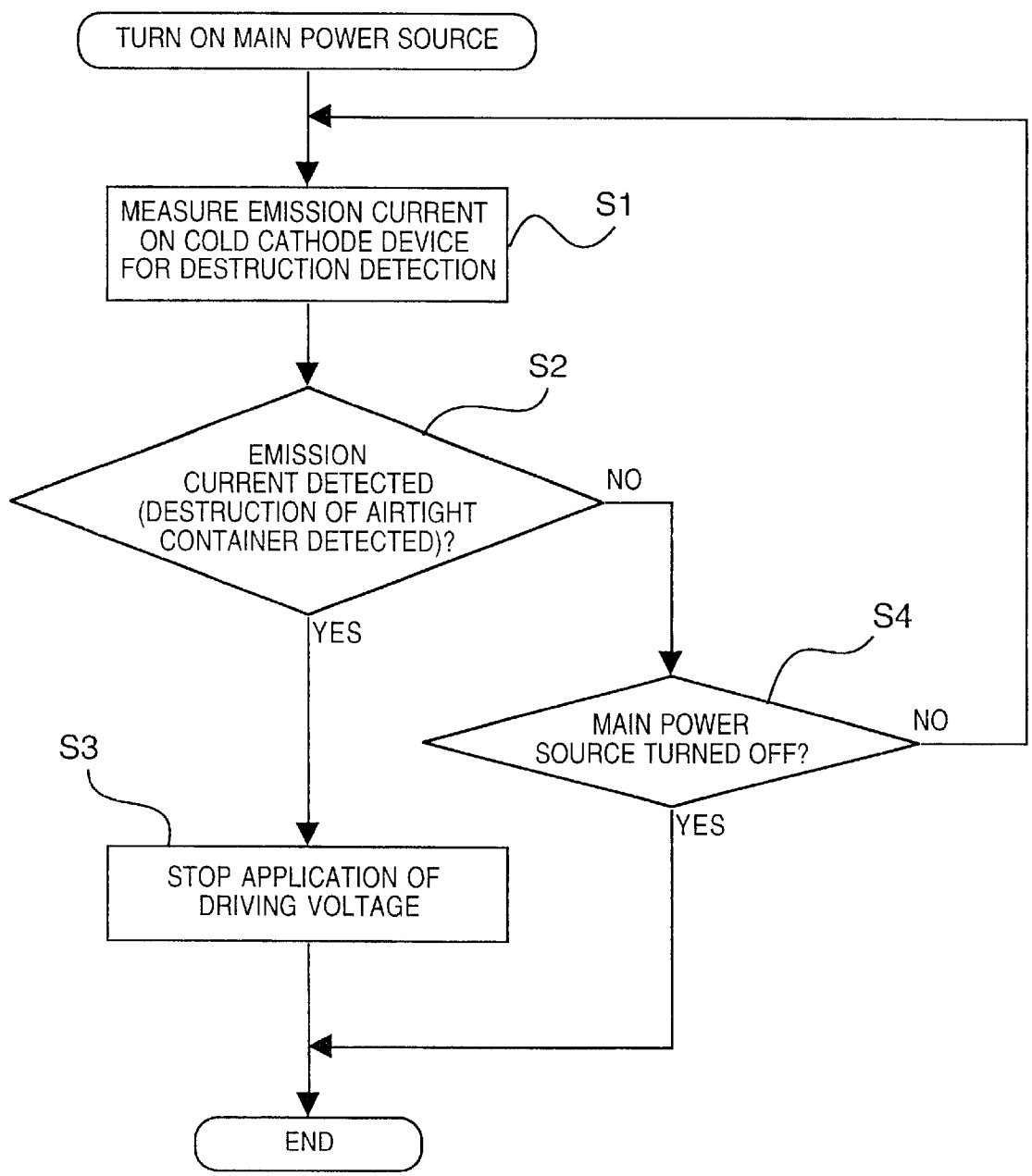
FIG. 14 is a flow chart showing processing of detecting destruction of the airtight container by the control unit according to the sixth embodiment.

Processing by the control unit 105 is shown in the flow chart of FIG. 14. According to the abnormality detection and control of the electron source in the sixth embodiment, processing of detecting destruction of the airtight container is always executed while the main power source of the image display apparatus is turned on, as shown in the flow chart of FIG. 14.

The processing shown in FIG. 14 starts when the power source of the apparatus is turned on. In step S1, the control unit 105 measures the emission current Ie from the destruction detection cold cathode device 102 based on a current value measured by the ammeter 104. The control unit 105 advances to step S2 to check whether the current value is detected. If NO in step S2, the control unit 105 shifts to step S3 to stop driving the high-voltage source 106.

If YES in step S2, the control unit 105 advances to step S4 to check whether the main power source is turned off. If NO in step S4, the control unit 105 returns to step S1 to execute the above processing; if YES in step S4, completes the processing.

If the control unit 105 detects a state in which no emission current is detected owing to destruction of the airtight container, it stops applying the driving voltage to the image display unit (including a high voltage applied to the high-voltage electrode 103). In this case, the control unit 105 may stop outputting the pulse from the pulse generator 107 in step S3.

The control method of the sixth embodiment can eliminate any danger such as an electric leakage or electric shock generated when the airtight container of the electron source is destroyed. In the sixth embodiment, the voltage pulse Vf applied to the destruction detection cold cathode device 102 is a rectangular wave having a peak value of 16.0 V, a pulse period of 1 ms, and a pulse width of 0.1 ms.

<General Description of Image Display Apparatus>

The structure and manufacturing method of the display panel 101 according to the sixth embodiment of the present invention will be described in detail.

Figure 15:
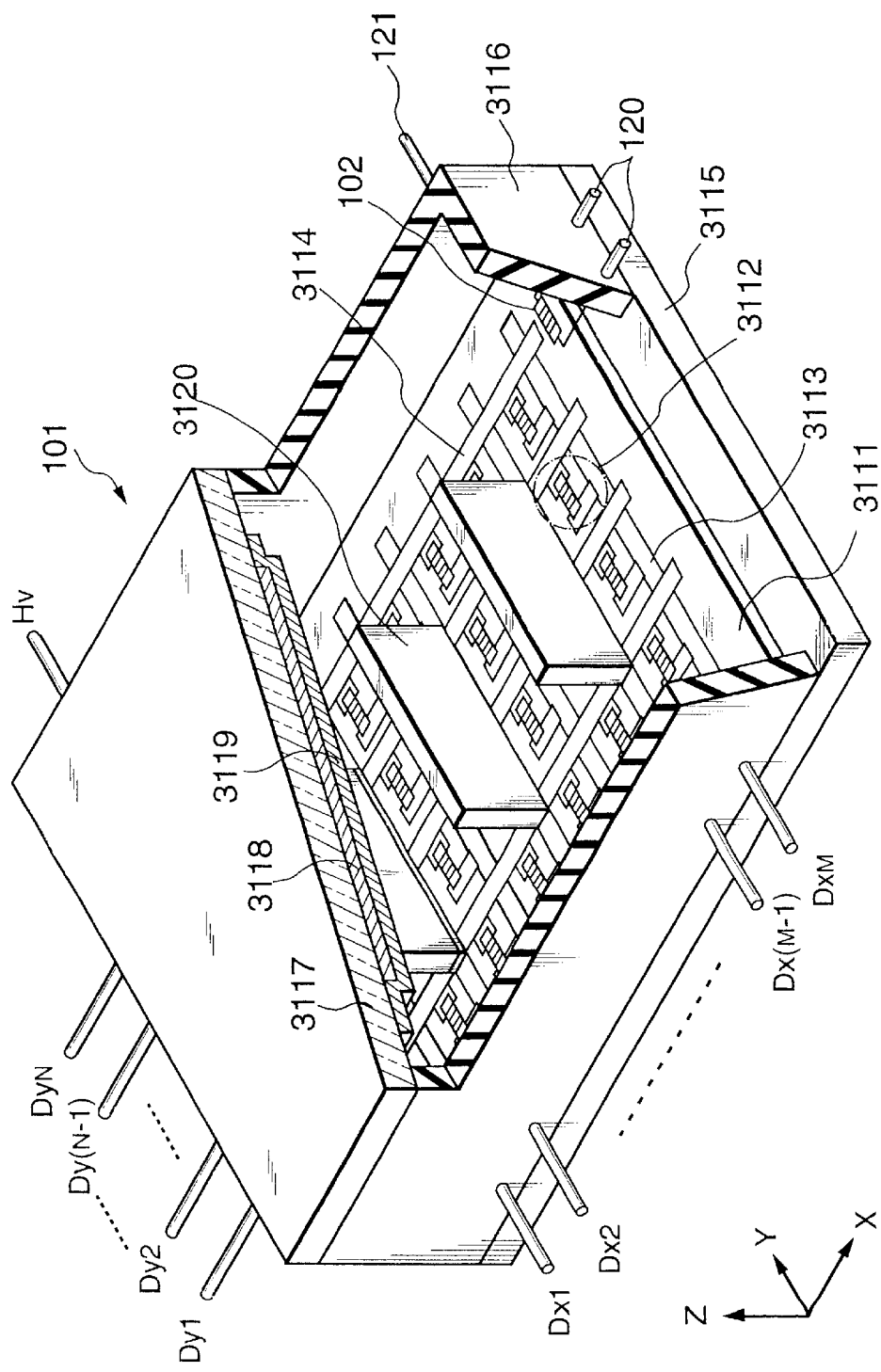
FIG. 15 is a partially cutaway perspective view showing the display panel of an image display apparatus according to the sixth embodiment of the present invention.

FIG. 15 is a perspective view of the display panel 101 according to the sixth embodiment where part of the display panel 101 is removed for showing its internal structure. In FIG. 15, the same reference numerals as in FIG. 31 denote the same parts, and a description thereof will be omitted.

In FIG. 15, reference numeral 120 denotes a terminal for applying a pulse voltage from the pulse generator 107 (FIG. 13) to the destruction detection cold cathode device 102; and 121, a terminal for applying a high voltage to the destruction detection high-voltage electrode 103. For illustrative convenience, no destruction detection high-voltage electrode 103 is illustrated in FIG. 15.

In the multi electron source used in the image display apparatus according to the sixth embodiment of the present invention, any material, shape, and manufacturing method for cold cathode device devices may be employed as long as an electron source is constituted by arranging cold cathode devices in a simple matrix. Therefore, cold cathode devices such as surface-conduction type emission devices, FE type devices, or MIM type devices can be used.

The following description concerns the structure of a multi electron source in which surface-conduction type emission devices (to be described below) are arranged as cold cathode devices in a simple matrix on the substrate.

Figure 16:
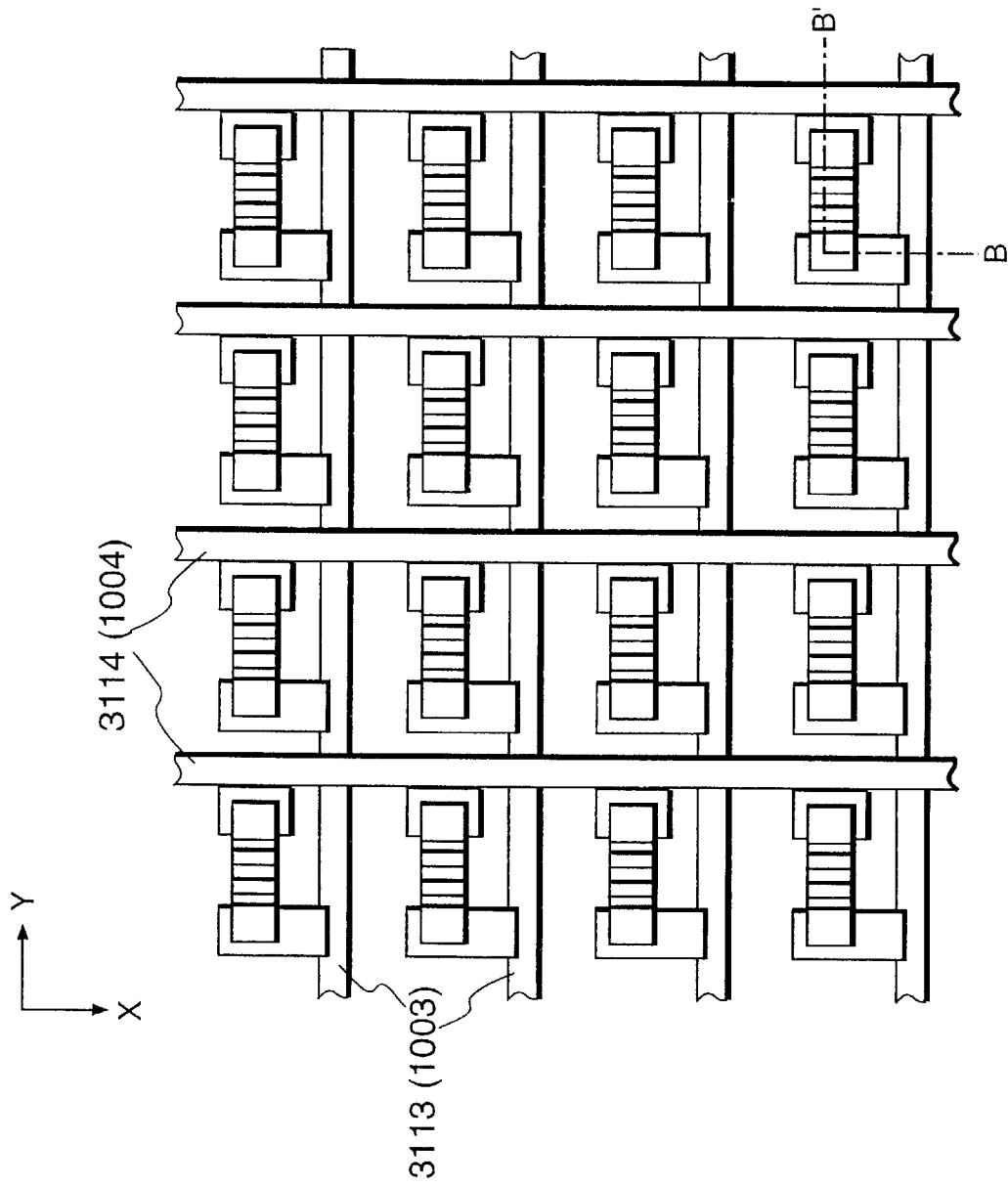
FIG. 16 is a plan view showing the substrate of a multi electron source used in the embodiment.

FIG. 16 is a plan view of the substrate 3111 (1001) of the multi electron source used in the display panel described above.

Figure 19A:
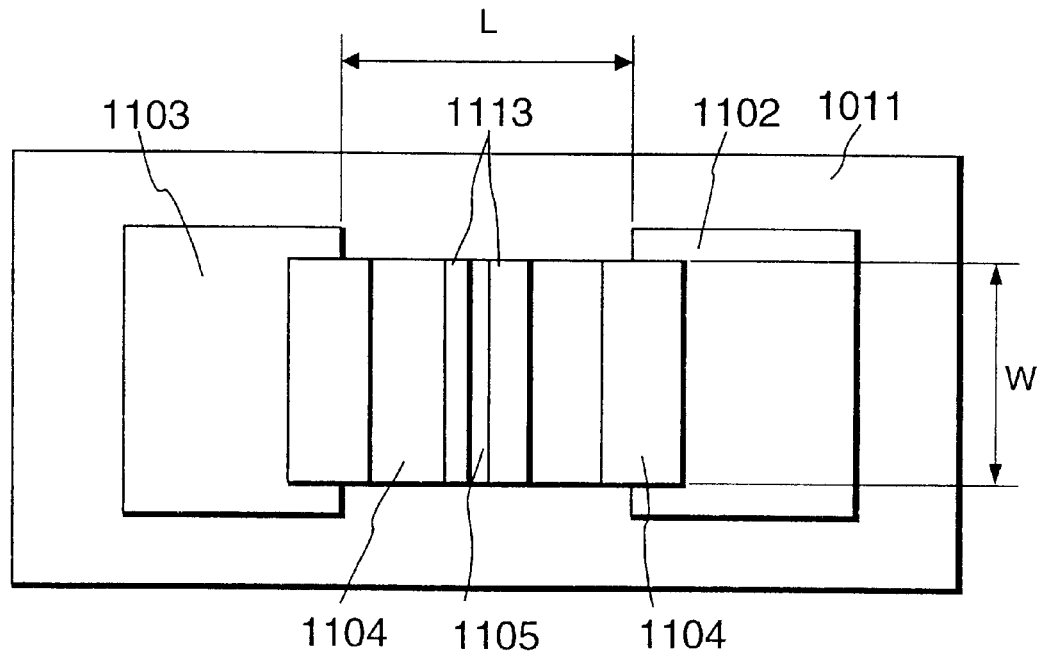
FIG. 19A is a plan view showing a flat surface-conduction type emission device used in the embodiment.
Figure 19B:
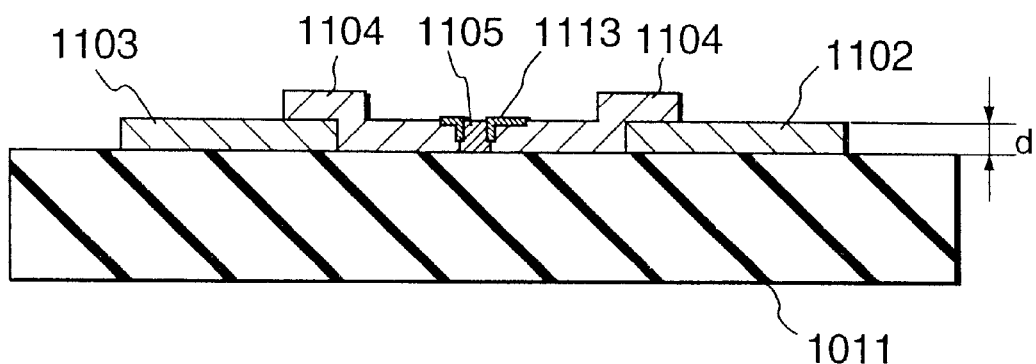
FIG. 19B is a sectional view showing the flat surface-conduction type emission device used in the embodiment.

Surface-conduction type emission devices like the one shown in FIGS. 19A and 19B are arranged on the substrate 3111. These devices are arranged in a simple matrix with the row and column wirings 3113 and 3114. At an intersection of the row and column wirings 3113 and 3114, an insulating layer (not shown) is formed between electrodes to maintain electrical insulation.

Figure 17:
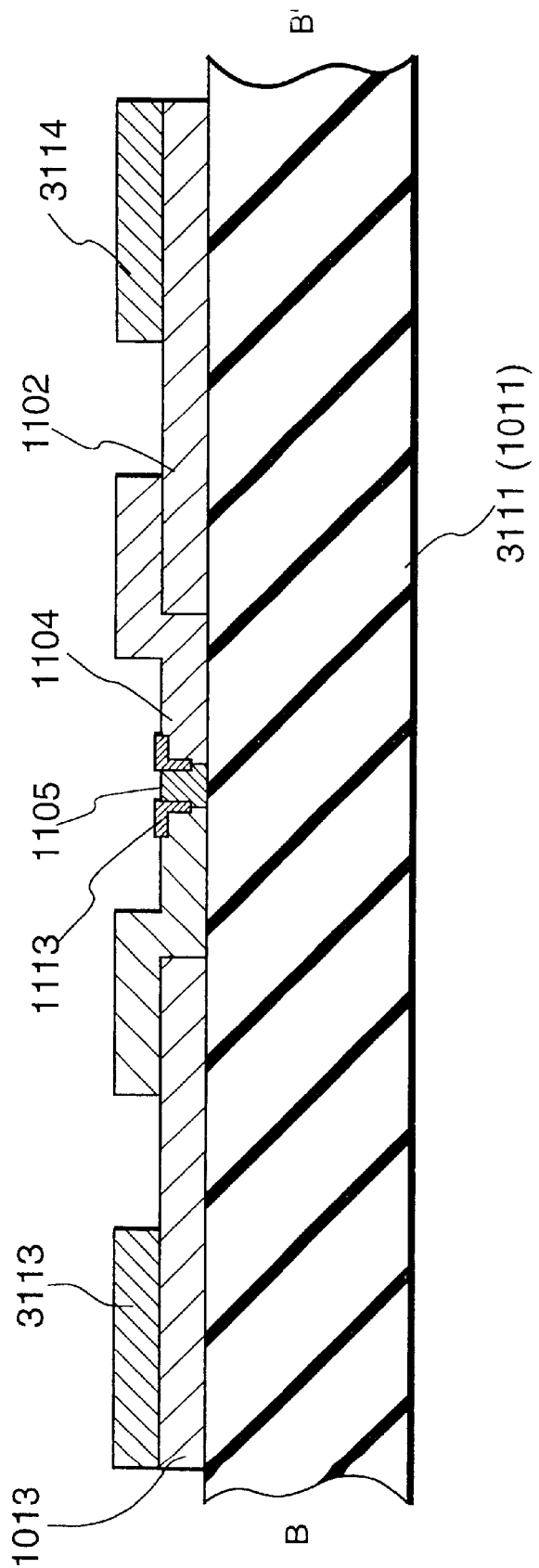
FIG. 17 is a sectional view showing part of the substrate of the multi electron source used in the embodiment.

FIG. 17 shows a cross-section cut out along the line B–B' in FIG. 16.

Note that a multi electron source having this structure is manufactured by forming the row and column wirings 3113 and 3114, the inter-electrode insulating layers (not shown), and the device electrodes and conductive thin films of the surface-conduction type emission devices 3112 on the substrate 3111, then supplying electricity to the respective devices via the row and column wirings 3113 and 3114, thus performing forming processing (to be described later) and activation processing (to be described later).

In the sixth embodiment, the substrate 3111 of the multi electron source is fixed to the rear plate 3115 of the airtight container. If, however, the substrate 3111 of the multi electron source has sufficient strength, the substrate 3111 of the multi electron source may be used as the rear plate of the airtight container.

Figure 18A:
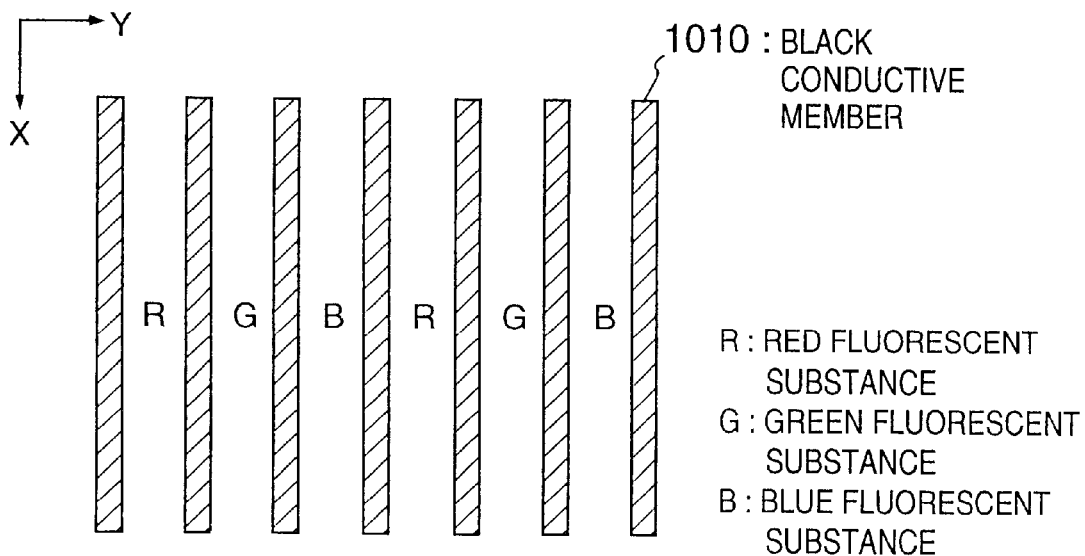
FIGS. 18A and 18B are plan views showing examples of the alignment of fluorescent substances on the face plate of the display panel.

A fluorescent film 3118 is formed on the lower surface of the face plate 3117. As the display panel 101 (1) of the sixth embodiment is a color display apparatus, the fluorescent film 3118 is colored with fluorescent substances of three, red, green, and blue primary colors used in the CRT field. As shown in FIG. 18A, the fluorescent substances of the respective colors are applied into stripes, and black conductive members 1010 are applied between the stripes of the fluorescent substances. The purpose of applying the black conductive members 1010 is to prevent misregistration of the display color even if the irradiation position of the electron beam is shifted to some extent, to prevent degradation of display contrast by shutting off reflection of external light, to prevent charge-up of the fluorescent film by the electron beam, and the like. As a material for the black conductive members 1010, graphite is used as a main component, but other materials may be used so long as the above purpose is attained.

Figure 18B:
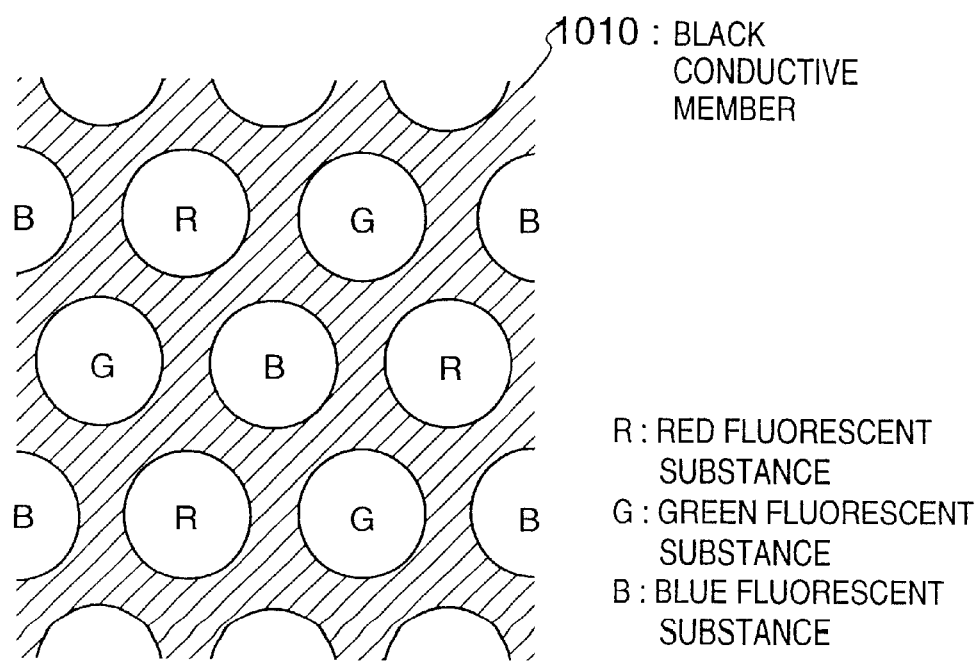

The layout of the fluorescent substances of the three primary colors is not limited to the stripe shown in FIG. 18A. For example, a delta layout as shown in FIG. 18B or any other layout may be employed. When a monochrome display panel is formed, a single-color fluorescent substance may be applied to the fluorescent film 3118, and the black conductive member may be omitted.

A metal back 3119, which is well-known in the CRT field, is formed on the fluorescent film 3118 on the rear plate side. The purpose of forming the metal back 3119 is to improve the light-utilization ratio by mirror-reflecting part of the light emitted by the fluorescent film 3118, to protect the fluorescent film 3118 from collision against negative ions, to use the metal back 3119 as an electrode for applying the electron-beam acceleration voltage, to use the metal back 3119 as a conductive path for electrons which excited the fluorescent film 3118, and the like. The metal back 3119 is formed by forming the fluorescent film 3118 on the face plate 3117, smoothing the upper surface of the fluorescent film, and depositing Al on the smooth surface by vacuum evaporation. When the fluorescent film 3118 is made of a low-voltage fluorescent substance, no metal back 3119 is used.

A transparent electrode made of, e.g., ITO may be provided between the face plate 3117 and fluorescent film 3118 in order to apply the acceleration voltage or improve the conductivity of the fluorescent film, though such electrode is not used in the sixth embodiment.

The application voltage to the surface-conduction type emission device of the sixth embodiment as a cold cathode device is generally about 12 to 16 V, a distance d between the metal back 3119 and cold cathode device 3112 is about 0.1 mm to 8 mm, and the voltage between the metal back 3119 and cold cathode device 3112 is about 0.1 kV to 10 kV.

[Seventh Embodiment]

Figure 33:
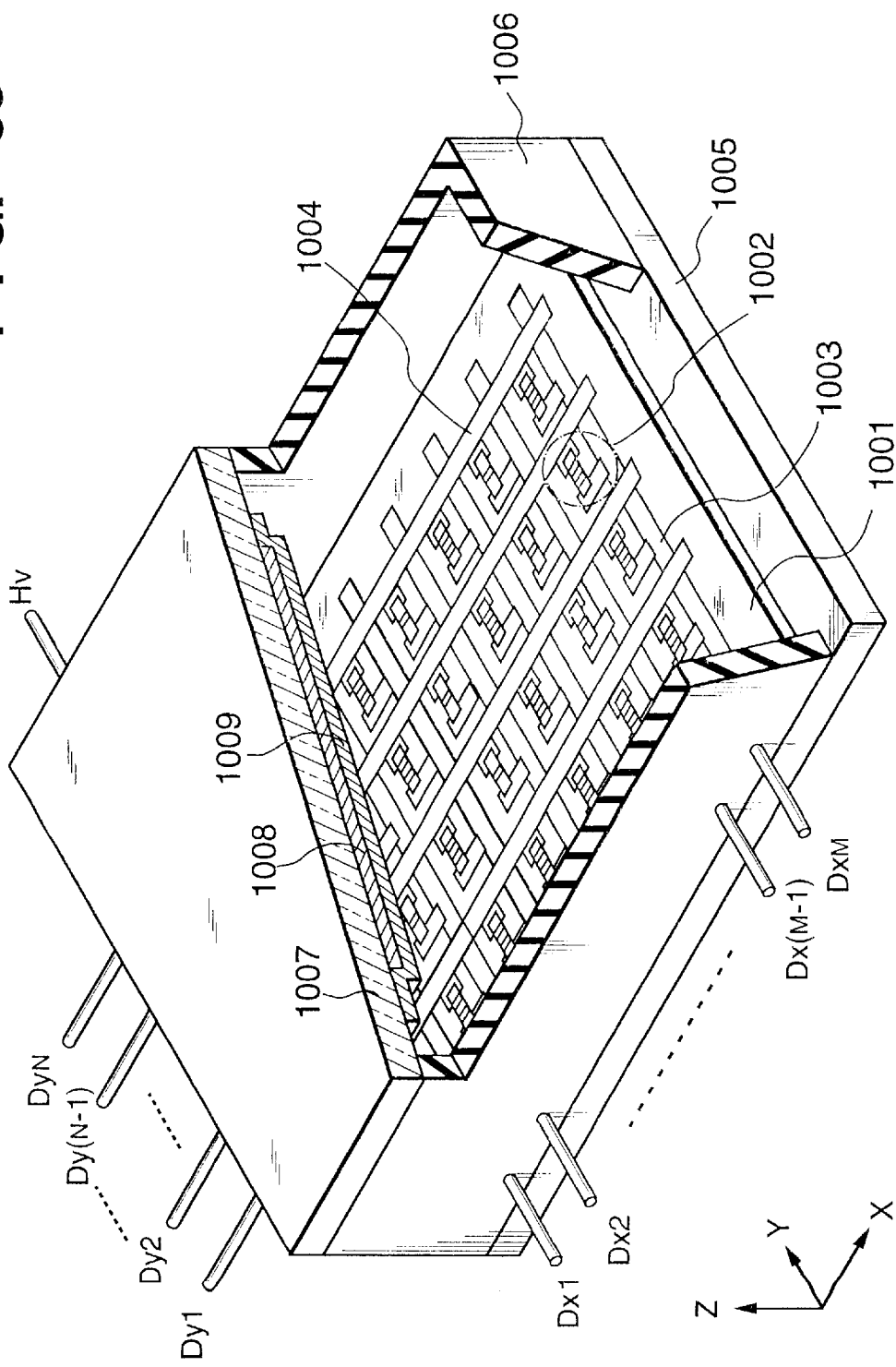
FIG. 33 is a partially cutaway perspective view showing the display panel of an image display apparatus according to the seventh embodiment of the present invention.

FIG. 33 is a perspective view of a display panel used in the seventh embodiment where part of the panel is removed for showing the internal structure of the panel.

In FIG. 33, reference numeral 1005 denotes a rear plate; 1006, a side wall; and 1007, a face plate. These parts 1005 to 1007 form an airtight container for maintaining the interior of the display panel vacuum. To construct the airtight container, it is necessary to seal-connect the respective parts to obtain sufficient strength and maintain airtight condition. For example, frit glass is applied to junction portions, and sintered at 400 to 500° C. in air or nitrogen atmosphere, thus the parts are seal-connected. A method for evacuating the container will be described later.

The rear plate 1005 is fixed to a substrate 1001. N×M cold cathode devices 1002 are formed on the substrate. (N and M are positive integers equal to 2 or more, and properly set in accordance with a target number of display pixels. For example, in a display apparatus for high-quality television display, N=3,000 or more, M=1,000 or more are desirable. In the seventh embodiment, N=3,072 and M=1,024.). The N×M cold cathode devices are arranged in a simple matrix by M row wirings 1003 and N column wirings 1004. The portion constituted by the parts 1001 to 1004 will be referred to as a multi electron source.

In the seventh embodiment, the substrate 1001 of the multi electron source is fixed to the rear plate 1005 of the airtight container. If, however, the substrate 1001 of the multi electron source has sufficient strength, the substrate 1001 of the multi electron-beam source may be used as the rear plate of the airtight container.

A fluorescent film 1008 is formed on the lower surface of the face plate 1007. As the seventh embodiment is directed to a color display apparatus, the fluorescent film 1008 is colored with fluorescent substances of three, red, green, and blue primary colors used in the CRT field. As shown in FIG. 18A, the fluorescent substances of the respective colors are applied into stripes, and black conductive members 1010 are applied between the stripes of the fluorescent substances. The purpose of applying the black conductive members 1010 is to prevent misregistration of display color even if the irradiation position of the electron beam is shifted to some extent, to prevent degradation of display contrast by shutting off reflection of external light, to prevent charge-up of the fluorescent film by the electron beam, and the like. As a material for the black conductive members 1010, graphite is used as a main component, but other materials may be used so long as the above purpose is attained.

The layout of the fluorescent substances of the three primary colors is not limited to the stripe shown in FIG. 18A. For example, a delta layout as shown in FIG. 18B or any other layout may be employed.

When a monochrome display panel is formed, a single-color fluorescent substance may be applied to the fluorescent film 1008, and the black conductive member may be omitted.

A metal back 1009, which is well-known in the CRT field, is formed on the fluorescent film 1008 on the rear plate side. The purpose of forming the metal back 1009 is to improve the light-utilization ratio by mirror-reflecting part of the light emitted by the fluorescent film 1008, to protect the fluorescent film 1008 from collision against negative ions, to use the metal back 1009 as an electrode for applying the electron-beam acceleration voltage, to use the metal back 1009 as a conductive path for electrons which excited the fluorescent film 1008, and the like. The metal back 1009 is formed by forming the fluorescent film 1008 on the face plate substrate 1007, smoothing the upper surface of the fluorescent film, and depositing Al on the smooth surface by vacuum evaporation. When the fluorescent film 1008 is made of a low-voltage fluorescent substance, no metal back 1009 is used.

In the seventh embodiment, the electrode for applying the acceleration voltage (high voltage) on the face plate side will be referred to as an anode electrode, which includes the fluorescent substance, black conductive member, and metal back.

A transparent electrode made of, e.g., ITO may be provided as an auxiliary anode electrode between the face plate substrate 1007 and fluorescent film 1008 in order to apply the acceleration voltage or improve the conductivity of the fluorescent film, though such electrode is not used in the seventh embodiment.

Reference symbols $D_{x1}$ to $D_{xM}$, $D_{y1}$, to $D_{yN}$, and Hv denote electric connection terminals for the airtight structure provided to electrically connect the display panel to an electric circuit (not shown). The terminals $D_{x1}$ to $D_{xM}$ are electrically connected to the row-direction wirings 1003 of the multi electron-beam source; $D_{y1}$ to $D_{yN}$, to the column-direction wirings 1004 of the multi electron-beam source; and Hv, to the metal back 1009 of the face plate.

To evacuate the airtight container, the airtight container is connected to an exhaust pipe and vacuum pump (both not shown) after assembling, and evacuated to a vacuum degree of about $10^{-7}$ Torr. Then, the exhaust pipe is sealed. To maintain the vacuum degree in the airtight container, a getter film (not shown) is formed at a predetermined position immediately before/after sealing. The getter film is formed by heating and depositing a getter material mainly containing, e.g., Ba, by a heater or RF heating. The absorption operation of the getter film keeps the airtight container at a vacuum degree of $1\times10^{-5}$ or $1\times10^{-7}$ Torr.

The basis structure and manufacturing method of the display panel according to the seventh-embodiment have been described.

(Driving Circuit for Driving Multi Electron-Beam Source)

A display method in the driving circuit of the seventh embodiment will be explained in detail with reference to the accompanying drawings.

In the following description, the scanning method in the seventh embodiment is non-interlace line-sequential scanning. To display an image with gradation, the electron-emitting period within one horizontal scanning period (1H) is controlled by the time width of a modulated signal to control the total light-emitting quantity of the fluorescent substance and realize gradation expression.

Figure 35:
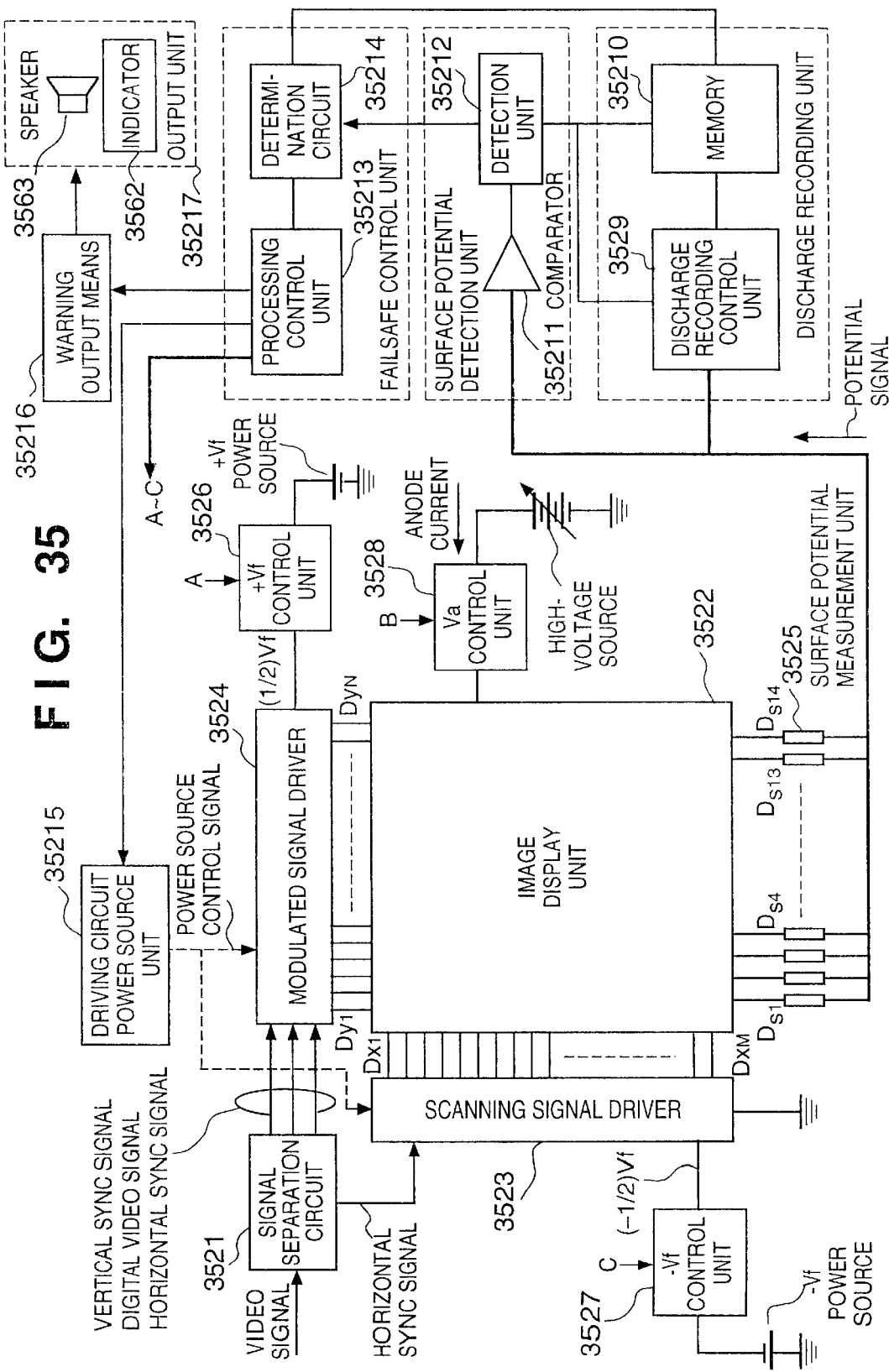
FIG. 35 is a block diagram showing the arrangement of the image display apparatus according to the seventh embodiment of the present invention.

FIG. 35 is a block diagram showing the arrangement of the electric circuit and connection between respective units in the image display apparatus according to the present embodiment. In FIG. 35, reference numeral 3521 denotes a circuit for generating a horizontal sync signal, vertical sync signal, digital video signal, and the like from a video signal such as an NTSC signal. This circuit 3521 includes a video intermediate frequency circuit, video signal detection circuit, sync separation circuit, low-pass filter, A/D conversion circuit, timing control circuit, and the like.

Reference numeral 3522 denotes an image display unit of the image display apparatus of the present invention.

Reference numeral 3523 denotes a scanning signal driver for driving the row-direction wirings of the image display unit. The scanning signal driver 3523 outputs a scanning signal (to be described later with reference to a timing chart) on the basis of a horizontal sync signal separated/generated by the circuit 3521.

Reference numeral 3524 denotes a modulated signal driver for driving the column-direction wirings of the image display unit. The modulated signal driver 3524 outputs a modulated signal (to be described later with reference to a timing chart) based on a horizontal sync signal, vertical sync signal, digital video signal, and the like separated/generated by the circuit 3521.

FIG. 8 is a timing chart showing an example of the voltage applied to the terminals of the row-direction wiring (i.e., wiring to which the scanning signal is supplied) and the column-direction wiring (i.e., wiring to which the modulated signal is supplied) in driving the image display unit of the image display apparatus according to the seventh embodiment. The timing chart in FIG. 8 shows voltages applied to row-direction wirings on rows I, I+1, and I+2 and column-direction wirings on columns J, J+1, and J+2 on the modulated signal side while sequentially driving the rows I, I+1, and I+2 of the image display apparatus. ($1<I<M-2$ and $1<J<N-2$ inevitably hold. M and N represent the total numbers row and column wirings, respectively).

In FIG. 8, an image of the $I_{th}$ row is displayed during one horizontal scanning period K, an image of the $(I+1)_{th}$ row is displayed during the period (K+1), and an image of the $(I+2)_{th}$ row is displayed during the period (K+2).

Row-direction wirings serving as the scanning side in line-sequential scanning are sequentially selected every horizontal scanning period (to be referred to as 1H hereinafter). Row-direction wirings on selected rows sequentially receive a scanning signal having a pulse width corresponding to 1H and a peak value $-Vf/2$ (Vf is a driving voltage; Vf=about $2V_{th}$). After the scanning is done for all row-direction wirings, it is repeated from the first row.

A modulated signal having a peak value 1/2Vf is applied to all column-direction wirings in synchronism with the scanning signal applied to the row-direction wiring for a period corresponding to a video signal displayed on a selected row.

This modulated signal rises in synchronism with the trailing edge of the scanning signal, and falls after maintaining the peak value Vf/2 for a time corresponding to the video signal. (The period between the leading and trailing edges of the modulated signal will be simply referred to as the pulse width of the modulated signal)

The pulse width of the modulated signal corresponds to the luminance of each of three, R, G, and B colors obtained by color-separating a video signal displayed on a selected row. In practice, the pulse width is not simply proportional to the luminance because various corrections are done to display a high-quality image.

By applying the voltage in this way, the driving voltage Vf is applied to cold cathode devices on a selected row for the pulse width of the modulated signal.

Since the emission current Ie of the cold cathode device has the above-described definite threshold characteristics with respect to Vf, an image corresponding to a desired video signal is displayed on a selected row.

Furthermore, an image is displayed over all cold cathode devices in the image display unit by line-sequential scanning.

In the seventh embodiment, the surface potential of the device substrate on which cold cathode devices are arranged is monitored to detect discharge using a plurality of surface potential measurement units (surface potential measurement system) for the device substrate. Upon generation of discharge, failsafe control for the display apparatus (to be referred to as a panel) is done. The history of potentials of the surface potential electrode is stored in the memory to determine a failsafe method with respect to discharge.

Figure 34:
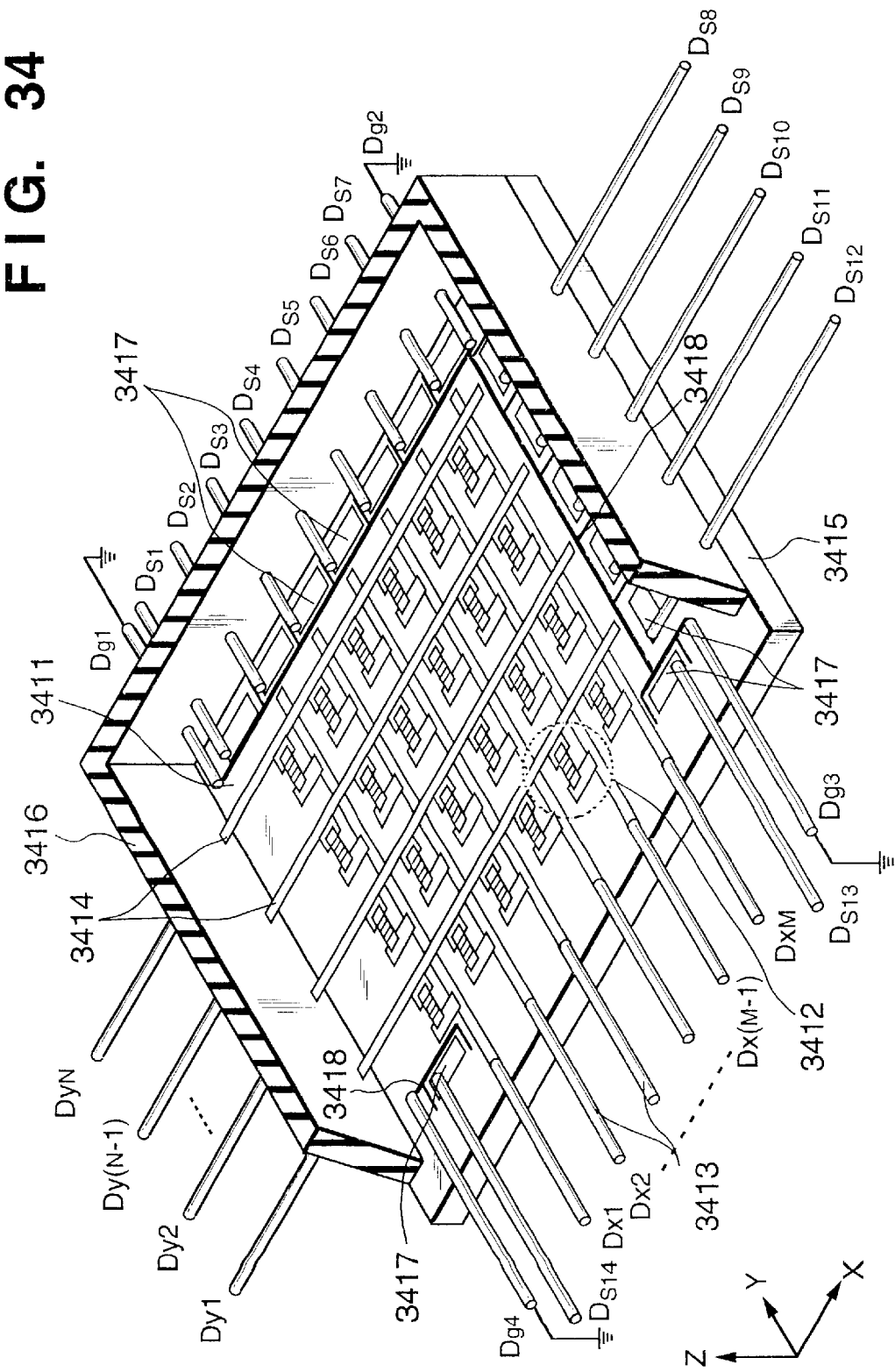
FIG. 34 is a perspective view for explaining the structure of the image display apparatus according to the seventh embodiment of the present invention.

The internal structure of the panel and the surface potential measurement electrode will be described. FIG. 34 is a partially cutaway perspective view of the panel in the seventh embodiment. In FIG. 34, the face plate and part of the side wall (frame) are not illustrated in order to explain the surface potential measurement electrode as part of the discharge detection unit in the seventh embodiment. In FIG. 34, reference numeral 3411 denotes a device substrate; 3412, a cold cathode device; 3413, a row-direction wiring; 3414, a column-direction wiring; 3415, a rear plate; 3416, a side wall (frame); 3417, a surface potential measurement electrode; and 3418, a guard electrode arranged around the surface potential measurement electrode to guard it. In the seventh embodiment, a plurality of surface potential measurement electrodes are arranged at the periphery of the device substrate 3411, and each surface potential measurement electrode 3417 has a rectangular shape. The surface potential measurement electrode 3417 is covered with the guard electrode 3418 to avoid any potential influence on the display unit in the panel and measure the potential value of the surface potential electrode with high precision. Note that the surface potential measurement electrode 3417 may have any shape other than a rectangular shape so long as the potential value can be measured. The number of electrodes is not particularly limited. In the seventh embodiment, a plurality of electrodes are arranged at the peripheral portion within the panel, and thus the potential state on the surface can be independently monitored in units of areas within the panel to specify the location where discharge has occurred.

The surface potential measurement electrodes 3417 are arranged on the device substrate so as to be electrically isolated from the row-direction wiring 3413, column-direction wiring 3414, cold cathode device 3412, and the like, and are extracted via outer extraction lines $D_{s1}$, to $D_{s14}$ of the vacuum container. Since the surface potential measurement electrodes 3417 are made of the same material as the material for the row- and column-direction wirings, they can also be formed at the same time as the wirings and the like.

The material for the surface potential measurement electrode 3417 need only be conductive, and may be different from the wiring material.

The circuit arrangement for realizing the failsafe function will be described with reference to FIG. 35. Reference numeral 3525 denotes a potential measurement unit for outputting a potential signal from the extraction line of the surface potential measurement electrode, as described above. The surface potential measurement electrode 3417 and surface potential measurement unit 3525 constitute a potential measurement means. A discharge recording unit for recording a potential output on the memory or the like is arranged on the output stage of the surface potential measurement unit 3525, and constituted by a discharge recording control unit 3529 and a memory 35210. A surface potential detection unit for detecting the surface potential value is constituted by a comparator 35211 for comparing the potential value with the threshold and a detection unit 35212. An output from the surface potential measurement unit 3525 is added with a potential signal by a measurement unit having a higher input impedance than the surface measurement electrode, and then output as a potential with a proper gain. These signals are input as analog values. In this case, the surface potential output may be output as a digital value and can take an optimum form for the circuit arrangement. A discharge detection means comprises the surface potential detection unit having the comparator 35211 and detection unit 35212, and an abnormality count means comprises the discharge recording unit having the discharge recording control unit 3529 and memory 35210.

Failsafe control is performed by a failsafe control unit which is made up of a determination circuit 35214 and a processing control unit 35213. The processing control unit 35213 outputs signals for actually performing failsafe control, and these signals are input to a warning output means 35216 for outputting warning information to the user (operator) or the like, control units 3526, 3527, and 3528 for power sources Vf and Va for applying power to the matrix device in the panel, and a driving circuit power source unit 35215 for controlling the power source voltage of the display circuit system.

The warning output means 35216 serves as a control means for displaying optimum information on the output unit 35217 made up of a display indicator, speaker, or the like, and drives a speaker 3563 or an indicator unit 3562 in accordance with a control signal. The +Vf control unit 3526, −Vf control unit 3527, and Va control unit 3528 control application voltages to the device in accordance with signals from the processing control unit 35213. They function to reduce the power source voltages Vf and Va or change the voltage values depending on signals from the processing control unit 35213. With these functions, supply of the device voltage via the modulation and scanning signal drivers 3524 and 3523 and application of the anode voltage to the face plate side of the panel can be limited to set the device at an operating voltage or less and suppress the device current If and emission current Ie.

The driving circuit power source unit 35215 supplies power to the whole display circuit system, and in addition controls the power source voltage of the driving circuit systems (mainly digital and analog circuit systems) of the modulation and scanning signal drivers 3524 and 3523. Depending on control from the processing control unit 35213, the driving circuit power source unit 35215 can limit supply of the power source voltage to the display circuit system to stop the pulse width modulation driving by line-sequential scanning performed in the seventh embodiment.

A detailed control method of each control unit for realizing failsafe control upon discharge in the seventh embodiment will be explained.

The discharge recording control unit 3529 serves as a control means for recording a potential signal output from the surface potential measurement unit 3525 on the memory 35210. More specifically, the discharge recording control unit 3529 A/D-converts potential outputs Ds1 to Ds14 input as analog signals at predetermined timings and writes the digital signals in the memory 35210. Information written in the memory 35210 includes surface potential amounts corresponding to the locations of Ds1 to Ds14 and measurement time (time & date) data. For example, surface potential amounts divided in units of locations may be written in the memory 35210, and information may be written in the memory 35210 in correspondence with a measurement time or the like. These memory arrangements are desirably set optimally for information in reading out the potential amount by the determination circuit 35214 or externally accessing memory information.

As for the write timing of discharge information in the memory 35210, A/D conversion may be done using an external input signal based on a signal from the detection unit 35212, or A/D conversion and a write in the memory 35210 may be done using an internal signal. The seventh embodiment adopts a method using both the functions.

The comparator 35211 of the surface potential detection unit compares an analog potential signal from the surface potential measurement unit 3525 with a set threshold $V_{th}$, converts a potential equal to or lower than the threshold into a logic signal (e.g., TTL level), and inputs the logic signal to the detection unit 35212. The threshold $V_{th}$ of the comparator 35211 can be externally set and can be changed in accordance with the panel state. The comparator 35211 may be a buffer amplifier for directly inputting the absolute value of the surface potential amount to the detection unit 35212.

The detection unit 35212 comprises a means for detecting, based on a signal from the comparator 35211, the location of an electrode which exceeds $V_{th}$ out of a plurality of surface potential measurement electrodes 3417, and detecting discharge after a signal equal to or higher than $V_{th}$ is detected. The timings of these signals will be explained with reference to FIG. 36.

Figure 36:
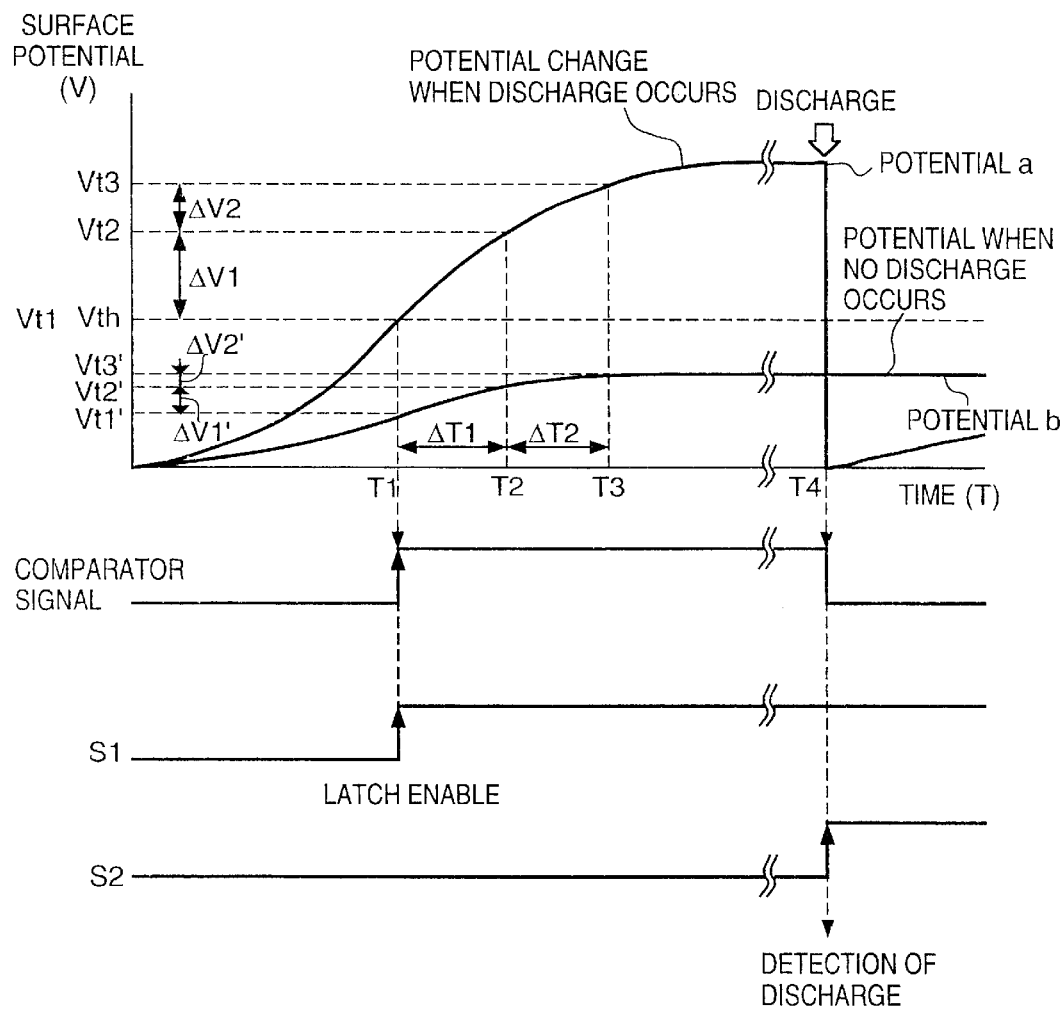
FIG. 36 is a timing chart showing the potential state of a surface potential electrode and a failsafe timing signal in the seventh and eighth embodiments of the present invention.

FIG. 36 is a timing chart showing a change in time vs. change in state of an output potential a from an arbitrary surface potential measurement electrode 3417 causing discharge. Further, FIG. 36 shows timings of signals S1 and S2 for detecting the comparator signal and discharge when the surface potential output exceeds $V_{th}$ set by the comparator 35211.

Before discharge occurs in the panel, the potential on the matrix in the panel tends to rise over time. This is caused by accumulation of charges on the device or device wiring electrode along with deterioration of the atmosphere in the panel, and is also influenced by panel driving conditions.

When the surface potential output exceeds the set $V_{th}$ due to the above reason, like the potential a, the comparator signal changes from L to H. At time T1, the comparator signal is input as a latch clock by arranging a latch circuit in, e.g., the detection unit 35212. The latch circuit outputs a latch enable signal S1 by the input comparator signal. When discharge occurs at time T4 near the surface potential electrode which exceeds $V_{th}$, the potential of the surface potential electrode 3417 instantaneously drops to $V_{th}$ or less owing to the discharge, and the comparator signal changes from H to L.

Detection of discharge is done by determining as discharge only a signal when the comparator signal changes from H to L while the latch enable signal S1 is kept in an enable state.

When the surface potential is equal to or lower than $V_{th}$, i.e., no discharge occurs in FIG. 36, the latch enable signal S1 is in a disable state, and even a change in signal S2 is not regarded as discharge.

Hence, when generation of discharge is detected, the potential of the surface potential electrode 3417 near the discharge generation location always exceeds $V_{th}$ and can be estimated to a certain degree. As another method, when generation of discharge is detected by inputting the absolute value of the surface potential, the surface potential amount is converted into a digital value using an arithmetic processing system including an A/D conversion circuit and CPU, and discharge is detected by arithmetic processing.

In this manner, the surface potential detection unit realizes detection of discharge on the basis of the comparator signal with respect to output values from a plurality of surface potential electrodes. The detection unit 35212 outputs a detection signal upon discharge to the discharge recording control unit 3529 and the determination circuit 35214 in the failsafe control unit.

To realize failsafe control for the panel, the failsafe control unit is constituted by the determination circuit 35214 for receiving signals from the detection unit 35212 and memory 35210, and the processing control unit 35213. The determination circuit 35214 determines how to perform failsafe control for the panel on the basis of a discharge detection signal input from the detection unit 35212 and information in the memory 35210 in the panel. In the present invention, the failsafe sequence is divided into three modes and executed in accordance with a sequencer in the determination circuit 35214. The determination circuit 35214 corresponds to a sequence determination means, and the determination circuit 35214 and processing control unit 35213 constitute a protection control means.

Figure 37:
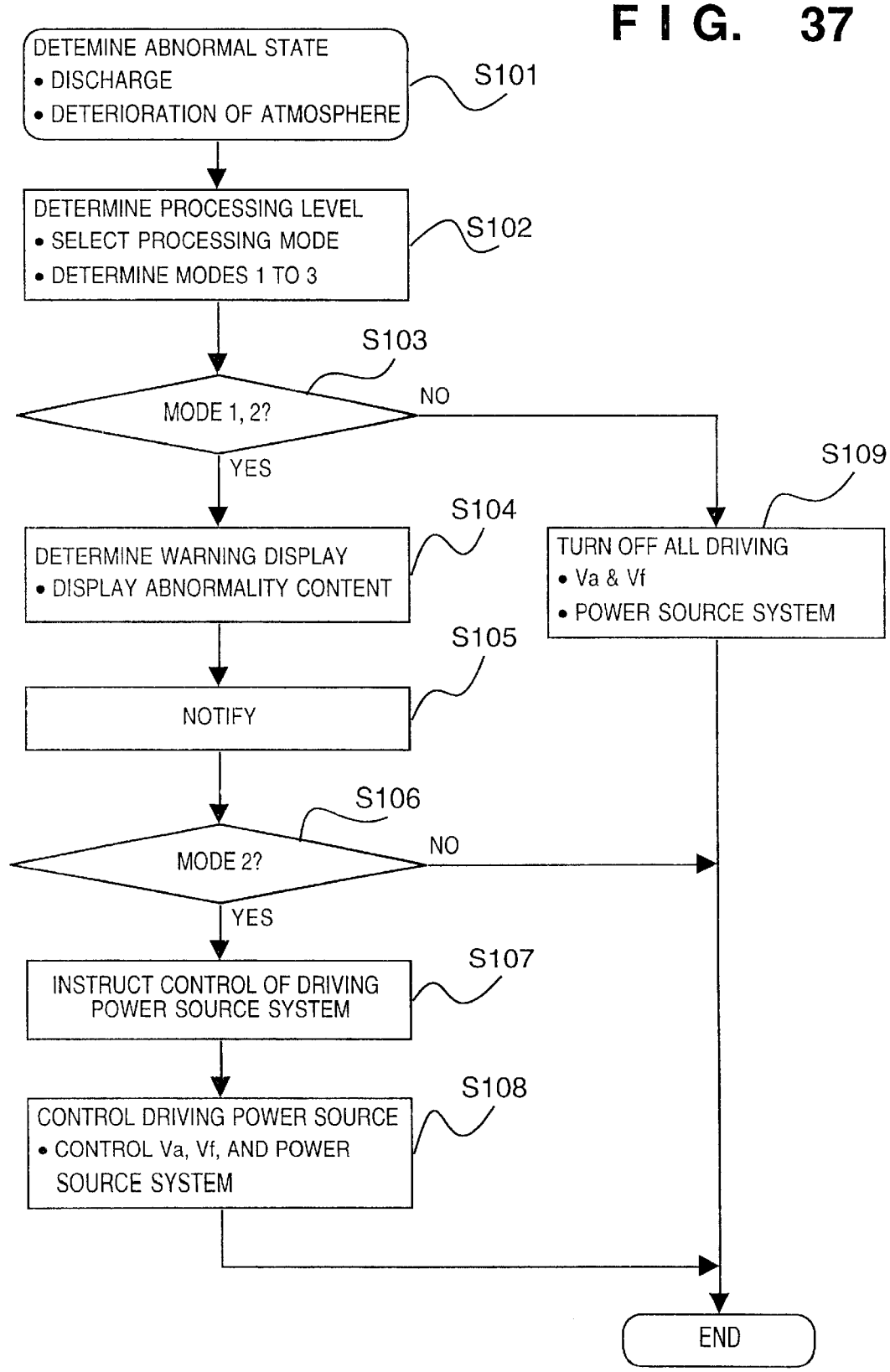
FIG. 37 is a flow chart in the seventh embodiment of the present invention.

FIG. 37 shows a failsafe sequence used in the seventh embodiment. In a step S101, the determination circuit 35214 recognizes that the panel is in an abnormal state on the basis of signals from the detection unit 35212 and memory 35210. In step S102, the determination circuit 35214 determines which failsafe sequence is the most optimum for the abnormal state.

In the seventh embodiment, the processing level is divided into three modes, and a sequence corresponding to the abnormal state is executed. "MODE 1" has a sequence of notifying the user (operator) by a warning display indicator or voice. "MODE 2" has a sequence of controlling the power source of the driving power source system after the notice. "MODE 3" has a sequence of directly turning off the whole driving system without any notice. Which sequence is actually executed is determined by the abnormality level in the panel. Of the sequences of "MODE 1" to "MODE 3", "MODE 1" and "MODE 2" are for a relatively low abnormal state level and allow automatic return in the panel. To the contrary, "MODE 3" is for a high abnormal state level and inhibits automatic return.

A flow corresponding to the set sequence will be explained. In step S103, the processing sequence is selected. If "MODE 3" is to be executed, the flow shifts to step S109; if "MODE 1" or "MODE 2" is to be executed, to step S104. In the step S104, a warning display is determined as the sequences of "MODE 1" and "MODE 2".

In a step S105, the contents of the warning display correspond to the level of the abnormal state. The indicator unit 3562 may be mounted on the front surface of an image display apparatus 3861 shown in FIG. 38, or the voice output speaker 3563 may be mounted to output a message. For example, if no discharge is detected and the potential state is stable, like "MODE 1", the message indicator 3562 or speaker 3563 may instruct periodic maintenance of the display apparatus. If discharge occurs like "MODE 2", the state is determined as an emergency, and the message indicator 3562 or speaker 3563 may notify the operator of turning off the TV power source. The message indicator 3562 and speaker 3563 constitute an information transfer means. In step S106, whether the sequence in progress is "MODE 2" is checked. If NO in the step S106, the failsafe control ends.

If YES in the step S106, control of the driving power source is instructed. This control instruction determines which system is to be controlled in control of the power source executed in step S108. For example, the power sources Va and Vf are subjected to control of the power source. This control or operation is divided into control of stopping the driving voltage itself to the cold cathode device in the panel, and control of stopping the power source voltage unit of the display circuit system itself, as described above. When discharge is generated by any thermal factor in the circuit system, both the display circuit system and device driving voltage must be stopped. To the contrary, when the circuit system is normal, discharge is determined to be generated by the device itself in the panel, and only the device driving voltage is stopped. This determination is enabled by monitoring by the processing control unit 35213 whether an output current value from the driving circuit power source unit 35215 is in an excessive-current state when discharge occurs.

If NO in the step S103, the flow shifts from the step S103 to the step S109 to turn off the whole driving system. In this case, the control system unconditionally turns off the driving circuit power source unit 35215 and the +Vf, −Vf, and Va output control units 3526, 3527, and 3528.

By these control units, the seventh embodiment realizes detection of discharge, suppression of discharge upon generation of discharge occurs, and failsafe control to the panel. Discharge is detected using the detection means shown in FIG. 36. As mode determination processing in the failsafe sequence, for example, when discharge occurs a plurality of the number of times or continuously, or the panel itself is destroyed by an external operation, the vacuum degree (atmosphere or pressure) in the panel is determined to be very low, and "MODE 3" is executed. When discharge rarely occurs and the panel itself is almost free from the influence of discharge, "MODE 2" is set. When the potential state of the surface potential electrode 3417 is equal to or lower than $V_{th}$, or no discharge occurs and the potential is stable even if the potential state exceeds $V_{th}$, "MODE 11" is set.

[Eighth Embodiment]

The eighth embodiment of the present invention will be described. The eighth embodiment uses a plurality of surface potential measurement units (surface potential measurement system) for the device substrate. A temporal change of the potential of the surface potential electrode is measured based on information from the memory storing the history of the surface potential of the device substrate on which cold cathode devices are arranged. In accordance with the change amount, generation of discharge is estimated to notify the user. At the same time, the failsafe mode is set to protect the panel from discharge.

The eighth embodiment has the same arrangement as described in the seventh embodiment with reference to FIGS. 34, 35, and 8, and a detailed description thereof will be omitted. FIG. 36 shows a change in potential of a surface potential electrode 3417. The potential of each electrode in the panel is written in a memory 35210 by a discharge recording control unit 3529 via a surface potential measurement unit 3525. The write method in the memory 35210 is the same as in the seventh embodiment. As for a change in arbitrary potential amount shown inn FIG. 36, the potential a which may cause discharge increases in potential amount over time. In contrast, the potential b on the electrode which does not cause discharge is stable almost free from any change.

For this reason, to estimate discharge in the panel, a determination circuit 35214 in FIG. 35 accesses the memory 35210 to read out a plurality of surface potential amounts written in the memory (the eighth embodiment exemplifies the potentials a and b on two electrodes for descriptive convenience). The determination circuit 35214 and memory 35210 constitute a potential change rate calculation means.

For example, the potential amounts of the potentials d and b correspond to Vt1 and Vt1' at time T1. After the lapse of a predetermined time, the potential amounts Vt2 and Vt2' at time T2 are read. Similarly, the potential amounts Vt3 and Vt3 at time T3 are read. Then, changes in read potential amount are calculated as changes $\Delta V1$, $\Delta V1'$, $\Delta V2$, and $\Delta V2'$, in potential amount at $\Delta T1$ and $\Delta T2$. By this method, changes in potential amount for a predetermined time can be obtained. The changes $\Delta V1$ and $\Delta V2$ in potential amount of the potential a which may cause discharge in FIG. 36 are determined to be larger than the changes $\Delta V1'$ and $\Delta V2'$ in potential amount of the potential b when no discharge occurs.

The determination circuit 35214 compares the calculated change in potential amount with a set value to check whether the change in potential amount causes discharge. The discharge prediction means is constituted by a potential measurement means made up of the surface potential electrode 3417 and surface potential measurement unit 3525 and a potential change rate calculation means made up of the determination circuit 35214 and memory 35210.

The set value is a normalized value of the gradient of a potential change as a function of time, and is compared with the calculated change amount.

In the example of FIG. 36, the gradients of the potential changes $\Delta V1$ and $\Delta V2$ are determined to be larger than the set value, and the gradients of the potential changes $\Delta V1'$ and $\Delta V2'$ are determined to be smaller than the set value. In other words, when surface potential amounts in the panel exhibit different changes and the determination of comparison with the set value becomes different, priority is given to failsafe control for the potential changes $\Delta V1$ and $\Delta V2$ in order to perform failsafe control against discharge.

The determination circuit 35214 may steadily access the memory 35210 to read the potential amounts of a plurality of surface potential electrodes in order to grasp the internal state of the panel, or may access the memory 35210 as needed.

As another method, the absolute value of the surface potential from the surface potential measurement unit 3525 can be used.

In this case, discharge is determined by a comparator 35211 and detection unit 35212 of the surface potential detection unit without any read from the memory 35210. To input the absolute value, the comparator 35211 is used as a buffer amplifier. To estimate discharge, the detection unit 35212 compares a temporal change in potential amount with a set value, and outputs, e.g., abnormal value $\Delta V1$ and $\Delta V2$ to the determination circuit 35214. The temporal change in potential amount can be calculated by the same method as mentioned above by performing the processing function in the determination circuit 35214 by the detection unit 35212. The internal arrangement of the determination circuit 35214 may include an arithmetic processing system having an A/D conversion circuit, CPU, and the like, as described in the seventh embodiment. In this case, a potential change rate calculation means comprises the comparator 35211 and detection unit 35212, and a discharge prediction means comprises the potential change rate calculation means and determination circuit 35214.

Figure 39:
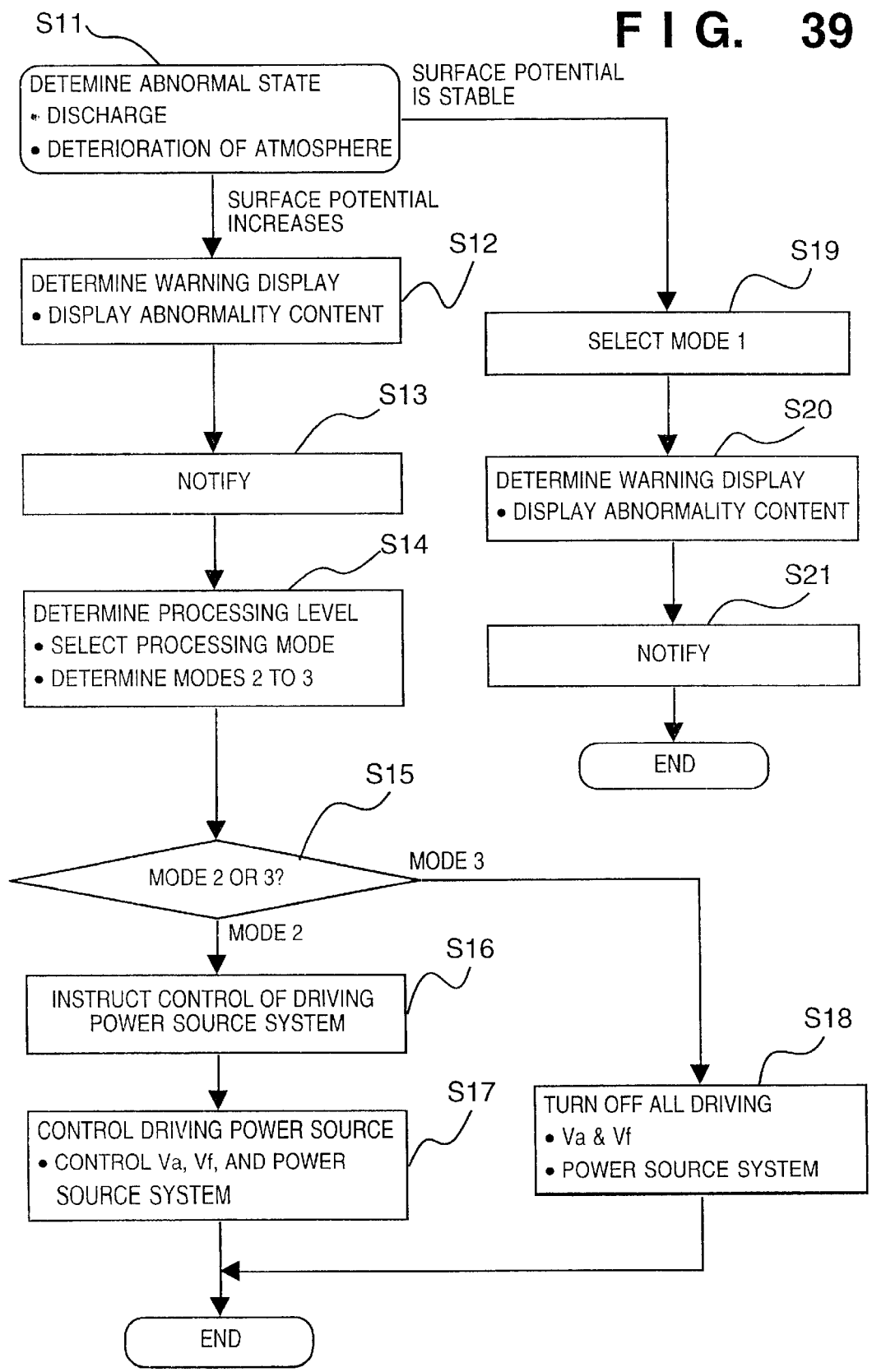
FIG. 39 is a flow chart in the eighth embodiment of the present invention.

FIG. 39 shows a failsafe sequence used in the eighth embodiment.

As processing corresponding to failsafe control, the determination circuit 35214 determines whether the changes $\Delta V1$ and $\Delta V2$ of the potential a may cause discharge (step S111), and notifies the user (operator) of the abnormal state via a processing control unit 35213 and a warning means 35216 (step S113). A protection control means comprises the processing control unit 35213 and determination circuit 35214.

The contents of the notice properly correspond to the abnormal state, similar to the seventh embodiment (step S112). In the above example, a message of turning off the TV switch SW is displayed or output by voice from the speaker.

The determination circuit 35214 sets the failsafe mode against discharge in the panel (step S114). The mode is set to either "MODE 2" or "MODE 3") because discharge will occur at high probability in this example. As for failsafe control when discharge actually occurs, the discharge is detected by the comparator 35211 and detection unit 35212 in the surface potential detection unit, and the detection signal is input to the determination circuit 35214 to execute failsafe control, similar to the seventh embodiment. In this case, the notice in the step S105 of the failsafe sequence in the seventh embodiment shown in FIG. 37 has already been executed in step S113 and thus can be omitted.

When the value of the surface potential electrode 3417 in the panel is very stable like $\Delta V1'$ and $\Delta V2'$ of the potential b, the change amounts are equal to or smaller than the set value, the probability of generation of discharge is determined to be low, and the failsafe mode is set to "MODE 1" (step S119). In this case, the user is notified in accordance with a normal failsafe sequence (steps S120 and S121).

The eighth embodiment is different from the seventh embodiment in that the user is notified of the abnormal state of the panel and the failsafe mode is selected before discharge occurs. As a failsafe setting criterion for "MODE 2"

or "MODE 3" in estimating discharge, when changes in potential amounts of a plurality of surface potential electrodes 3417 exceed the set value of the change amount, or when the potential amount steeply changes, "MODE 3" is set. When the number of electrodes which exhibit potentials exceeding the set value is small, the influence on the panel is determined to be small, and "MODE 2" is selected. Processing (steps S116, S117, and S118) after selecting "MODE 2" or "MODE 3" is the same as in the seventh embodiment, and a description thereof will be omitted.

Figure 38:
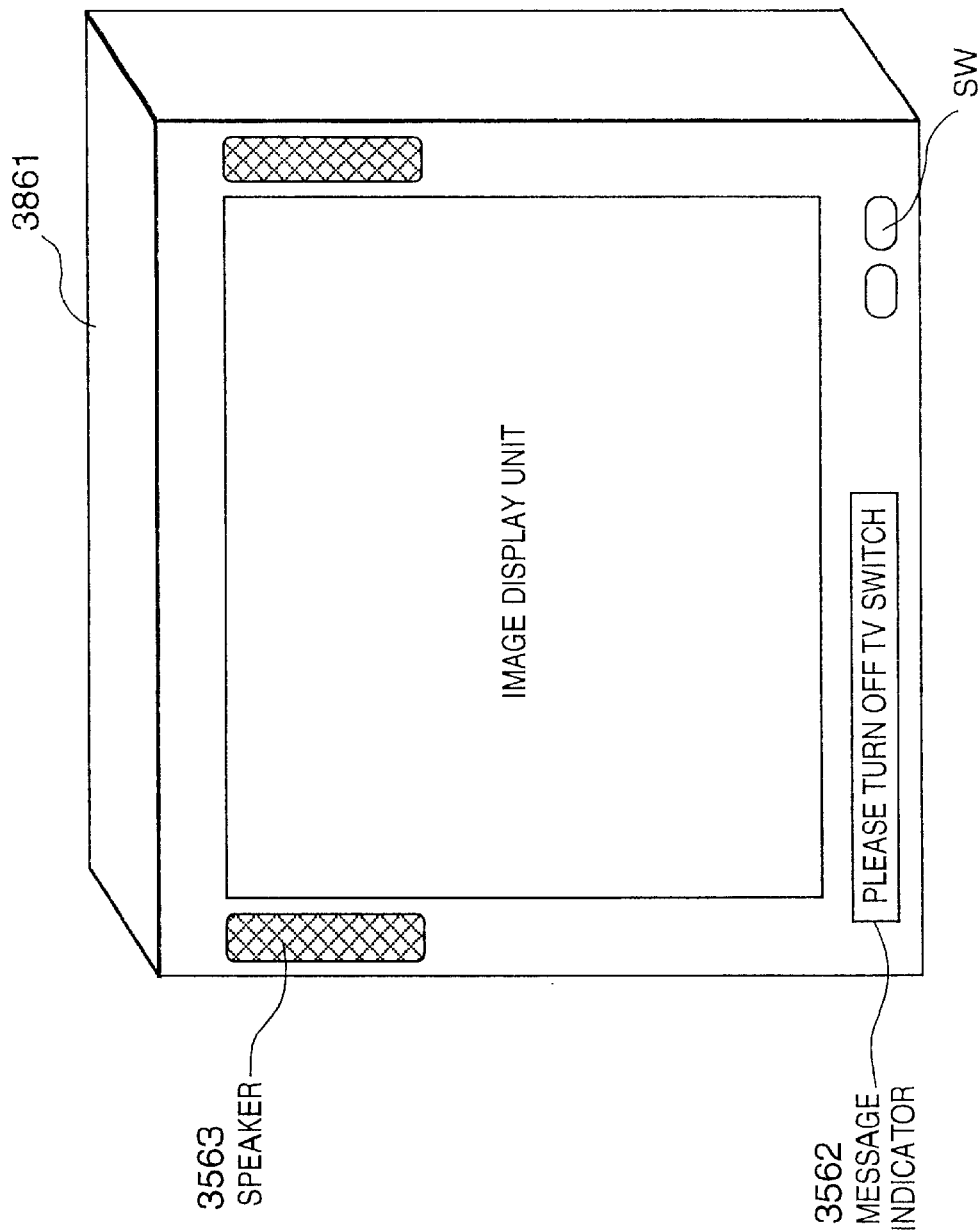
FIG. 38 is a perspective view showing an image display apparatus which displays a notice in the seventh and eighth embodiments.

Similar to the seventh embodiment, the notice to the user may be output to an indicator 3562 or a speaker 3563 mounted on the front surface of the display, as shown in FIG. 38.

As described above, the eighth embodiment realizes estimation of the internal state of the panel and failsafe control by detecting the gradients of temporal changes in potentials of a plurality of surface potential electrodes.

In the eighth embodiment, generation of discharge is estimated from the change amount of the surface potential. Generation of discharge can also be predicted by comparing the absolute value of a surface potential measured by the comparator 35211 and detection unit 35212 with the set value, and if the measured value exceeds the set value, outputting a signal from the detection unit 35212 to the determination circuit 35214. In this case, the comparator 35211 and detection unit 35212 constitute a comparison means, and the comparison means and determination circuit 35214 constitute a discharge prediction means.

In both the seventh and eighth embodiments, the message indicator 3562 is of a scheme of displaying a message to the user, but may be of another scheme of notifying an abnormal state by turning on, e.g., a lamp or LED. In addition, the speaker 3563 may output warning sound other than voice as long as the user can recognize an abnormal state.

The surface potential measurement electrode 3417 is arranged outside the device area within the panel. However, the number of electrodes, the arrangement position, and the electrode shape are not particularly limited. To accurately detect discharge, the number of electrodes may be increased. The electrode may be arranged near the device as close as possible.

According to the image display apparatus of the present invention, face-safe control can be executed for the display apparatus by predicting generation of discharge or the state in which discharge readily occurs. Moreover, the atmosphere in the display apparatus can be estimated by providing a means for detecting generated discharge and recording the history of the generation time and date of the discharge.

By this means, the user (operator) can be notified of an abnormality (state) by a warning output (display or voice).

As a result, the panel or user can be protected, and a high-reliability display apparatus can be provided.

<Manufacturing Method of Multi Electron Source>

A method of manufacturing the multi electron source used in the display panel of this embodiment will be described below. In the multi electron source used in the image display apparatus of this embodiment, any type of electron emission devices, and any material, shape, and manufacturing method for cold cathode device devices may be employed, especially an electron source arranging cold cathode devices in a simple matrix is preferable. Therefore, cold cathode devices such as surface-conduction type emission devices, FE type devices, or MIM type devices can be used.

Under circumstances where inexpensive display apparatuses having large display areas are required, a surface-conduction type emission device, of these cold cathode devices, is especially preferable. More specifically, the electron-emitting characteristic of an FE type device is greatly influenced by the relative positions and shapes of the emitter cone and the gate electrode, and hence a high-precision manufacturing technique is required to manufacture this device. This poses a disadvantageous factor in attaining a large display area and a low manufacturing cost. According to an MIM type device, the thicknesses of the insulating layer and the upper electrode must be decreased and made uniform. This also poses a disadvantageous factor in attaining a large display area and a low manufacturing cost. In contrast to this, a surface-conduction type emission device can be manufactured by a relatively simple manufacturing method, and hence an increase in display area and a decrease in manufacturing cost can be attained. The present inventors have also found that among the surface-conduction type emission devices, an electron source having an electron-emitting portion or its peripheral portion consisting of a fine particle film is excellent in electron-emitting characteristic and can be easily manufactured. Such a device can therefore be most suitably used for the multi electron source of a high-brightness, large-screen image display apparatus. For this reason, in the display panel 101 of this embodiment, surface-conduction type emission devices each having an electron-emitting portion or its peripheral portion made of a fine particle film are used. The basic structure and manufacturing method of the preferred surface-conduction type emission device will be described.

(Preferred Structure of Surface-Conduction Type Emission Device and Preferred Manufacturing Method)

Typical examples of surface-conduction type emission devices each having an electron-emitting portion or its peripheral portion made of a fine particle film include two types of devices, namely flat and step type devices.

(Flat Surface-Conduction Type Emission Device)

First, the structure and manufacturing method of a flat surface-conduction type emission device will be described.

FIGS. 19A and 19B are a plan view and a sectional view, respectively, for explaining the structure of the flat surface-conduction type emission device.

Referring to FIGS. 19A and 19B, reference numeral 1011 denotes a substrate; 1102 and 1103, device electrodes; 1104, a conductive thin film; 1105, an electron-emitting portion formed by the forming processing; and 1113, a thin film formed by the activation processing. As the substrate 1011, various glass substrates of, e.g., quartz glass and soda-lime glass, various ceramic substrates of, e.g., alumina, or any of those substrates with an insulating layer formed thereon can be employed.

The device electrodes 1102 and 1103, provided in parallel to the substrate 1011 and opposing to each other, comprise conductive material. Examples of the material are metals such as Ni, Cr, Au, Mo, W, Pt, Ti, Cu, Pd, and Ag, alloys of these metals, metal oxides such as $In_2O_3$—$SnO_2$, and semiconductors such as polysilicon. These electrodes 1102 and 1103 can be easily formed by the combination of a film-forming technique such as vacuum-evaporation and a patterning technique such as photolithography or etching, however, any other method (e.g., printing technique) may be employed.

The shape of the electrodes 1102 and 1103 is appropriately designed in accordance with an application object of the electron-emitting device. Generally, an interval L between electrodes is designed by selecting an appropriate value in a range from several hundred Å to several hundred $\mu$m. Most preferable range for a display apparatus is from several $\mu$m to several ten $\mu$m. As for electrode thickness d, an appropriate value is selected in a range from several hundred Å to several μm.

The conductive thin film 1104 comprises a fine particle film. The "fine particle film" is a film which contains a lot of fine particles (including masses of particles) as film-constituting members. In microscopic view, normally individual particles exist in the film at predetermined intervals, or in adjacent to each other, or overlapped with each other.

One particle has a diameter within a range from several Å to thousand Å. Preferably, the diameter is within a range from 10 Å to 200 Å. The thickness of the fine particle film is appropriately set in consideration of conditions as follows. That is, condition necessary for electrical connection to the device electrode 1102 or 1103, condition for the forming processing to be described later, condition for setting electrical resistance of the fine particle film itself to an appropriate value to be described later etc. Specifically, the thickness of the film is set in a range from several Å to thousand Å, more preferably, 10 Å to 500 Å.

Examples of the material used for forming the fine particle film are metals such as Pd, Pt, Ru, Ag, Au, Ti, In, Cu, Cr, Fe, Zn, Sn, Ta, W and Pb, oxides such as PdO, $SnO_2$, $In_2O_3$, PbO and $Sb_2O_3$, borides such as $HfB_2$, $ZrB_2$, $LaB_6$, $CeB_6$, $YB_4$, and $GdB_4$, carbides such as TiC, ZrC, HfC, TaC, SiC, and WC, nitrides such as TiN, ZrN, and HfN, semiconductors such as Si and Ge, and carbons. Any material is appropriately selected.

As described above, the conductive thin film 1104 is formed with a fine particle film, and sheet resistance of the film is set to reside within a range from $10^3$ to $10^7$ ($\Omega/\square$).

As it is preferable that the conductive thin film 1104 is electrically connected to the device electrodes 1102 and 1103, they are arranged so as to overlap with each other at one portion. In FIG. 19A, the respective parts overlap in the order of the substrate, device electrodes, and conductive thin film from the bottom. However, they may overlap in the order of the substrate, conductive thin film, and device electrodes from the bottom.

The electron-emitting portion 1105 is a fissured portion formed at part of the conductive thin film 1104. The electron-emitting portion 1105 has a resistance characteristic higher than peripheral conductive thin film. The fissure is formed by the forming processing to be described later on the conductive thin film 1104. In some cases, particles, having a diameter of several Å to several hundred Å, are arranged within the fissured portion. As it is difficult to exactly illustrate actual position and shape of the electron-emitting portion, therefore, FIGS. 19A and 19B show the fissured portion schematically.

The thin film 1113 made of carbon or a carbon compound covers the electron-emitting portion 1115 and its peripheral portion. The thin film 1113 is formed by the activation processing to be described later after the forming processing.

The thin film 1113 is preferably made of graphite monocrystalline, graphite polycrystalline, amorphous carbon, or mixture thereof, and the thickness is 500 Å or less and more preferably, 300 Å or less. As it is difficult to exactly illustrate actual position or shape of the thin film 1113, FIGS. 19A and 19B show the film schematically. FIG. 19A shows the device where part of the thin film 1113 is removed.

The preferred basic structure of the surface-conduction type emission device is as described above. In the embodiment, the device has the following constituents.

That is, the substrate 1011 comprises a soda-lime glass, and the device electrodes 1102 and 1103, an Ni thin film. The electrode thickness d is 1,000 Å and the electrode interval L is 2 μm.

The main material of the fine particle film is Pd or PdO. The thickness of the fine particle film is about 100 Å, and its width W is 100 μm.

Next, a method of manufacturing a preferred flat surface-conduction type emission device will be described with reference to FIGS. 20A to 20D which are sectional views showing the manufacturing processes of the surface-conduction type emission device. Note that reference numerals are the same as those in FIGS. 19B and 19A.

Figure 20A:
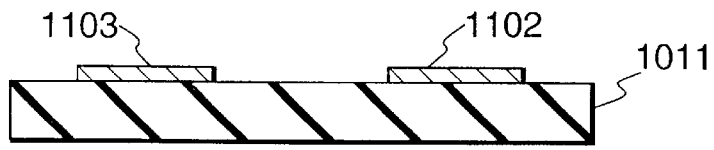
FIGS. 20A to 20E are sectional views showing the steps in manufacturing the flat surface-conduction type emission device.

(1) First, as shown in FIG. 20A, the device electrodes 1102 and 1103 are formed on the substrate 1011.

In forming the device electrodes 1102 and 1103, the substrate 1011 is fully washed with a detergent, pure water and an organic solvent, then, material of the device electrodes is deposited there. (As a depositing method, a vacuum film-forming technique such as evaporation and sputtering may be used.) Thereafter, patterning using a photolithography etching technique is performed on the deposited electrode material. Thus, the pair of device electrodes (1102 and 1103) shown in FIG. 19A are formed.

Figure 20B:
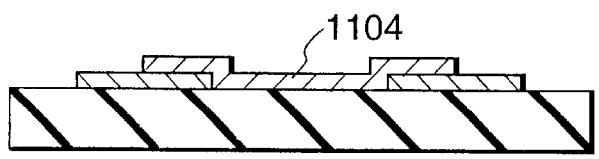

(2) Next, as shown in FIG. 20B, the conductive thin film 1104 is formed. In forming the conductive thin film 1104, first, an organic metal solvent is applied to the substrate 1011 in FIG. 20A, and then the applied solvent is dried and sintered, thus forming a fine particle film. Thereafter, the fine particle film is patterned into a predetermined shape by the photolithography etching method. The organic metal solvent means a solvent of organic metal compound containing material of minute particles, used for forming the conductive thin film, as main component. (More specifically, Pd is used in this embodiment. In the embodiment, application of organic metal solvent is made by dipping, however, any other method such as a spinner method and spraying method may be employed.)

As a film-forming method of the conductive thin film made with the minute particles, the application of organic metal solvent used in the embodiment can be replaced with any other method such as a vacuum evaporation method, a sputtering method or a chemical vapor-phase accumulation method.

Figure 20C:
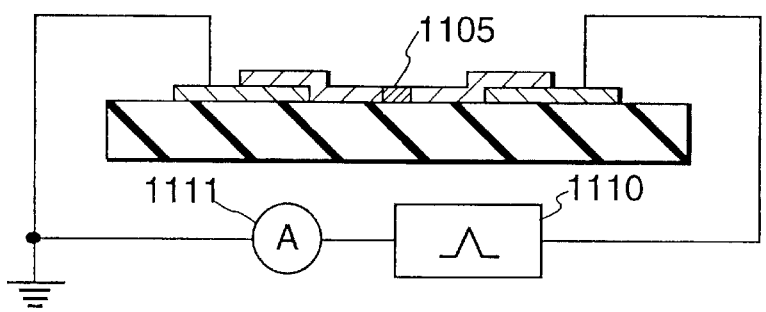

(3) Then, as shown in FIG. 20C, appropriate voltage is applied between the device electrodes 1102 and 1103, from a power source 1110 for the forming processing, then the forming processing is performed, thus forming the electron-emitting portion 1105.

The forming processing here is electric energization of a conductive thin film 1104, for example, made of a fine particle film to appropriately destroy, deform, or deteriorate part of the conductive thin film, thus changing the film to have a structure suitable for electron emission. In the conductive thin film made of the fine particle film, the portion changed for electron emission (i.e., electron-emitting portion 1105) has an appropriate fissure in the thin film. Comparing the thin film 1104 having the electron-emitting portion 1105 with the thin film before the forming processing, the electrical resistance measured between the device electrodes 1102 and 1103 has greatly increased.

Figure 21:
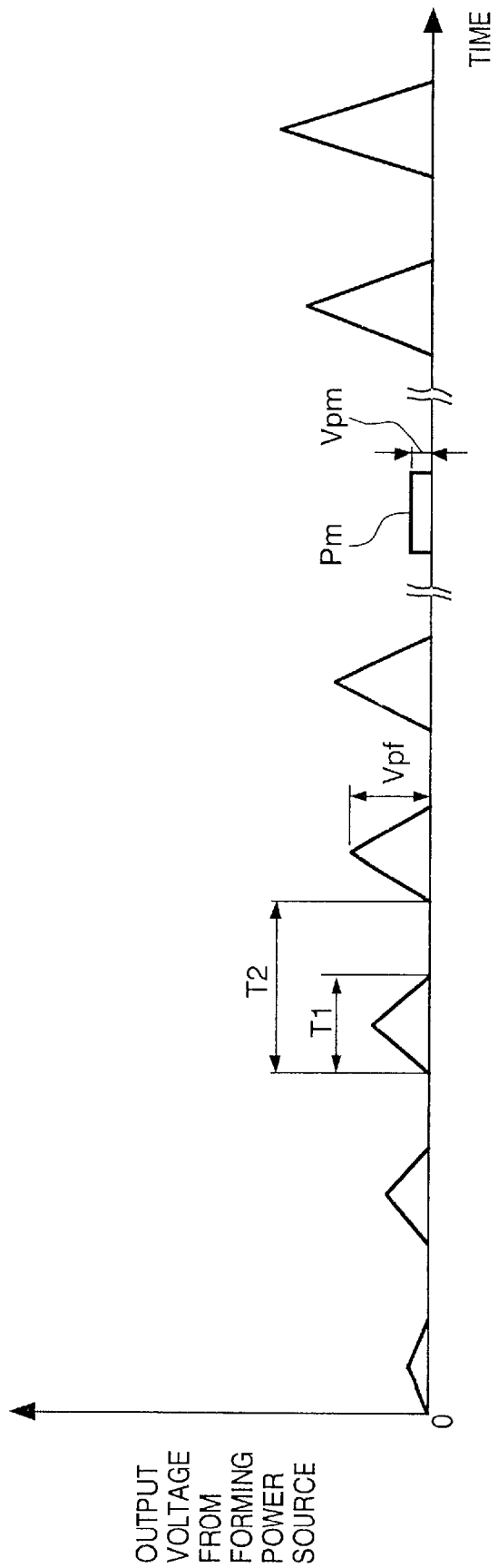
FIG. 21 is a graph showing an application voltage waveform in forming processing.

The electrification method will be explained in more detail with reference to FIG. 21 showing an example of the waveform of appropriate voltage applied from the forming power source 1110. Preferably, in case of forming a conductive thin film of a fine particle film, a pulse-like voltage is employed. In this embodiment, as shown in FIG. 21, a triangular-wave pulse having a pulse width T1 is continuously applied at pulse interval of T2. Upon application, a wave peak value Vpf of the triangular-wave pulse is sequentially increased. Further, a monitor pulse Pm to monitor status of forming the electron-emitting portion 1105 is inserted between the triangular-wave pulses at appropriate intervals, and current that flows at the insertion is measured by a galvanometer 1111.

In this embodiment, in $10^{-5}$ Torr vacuum atmosphere, the pulse width T1 is set to 1 msec; and the pulse interval T2, to 10 msec. The wave peak value Vpf is increased by 0.1 V, at each pulse. Each time the triangular-wave has been applied for five pulses, the monitor pulse Pm is inserted. To avoid ill-effecting the forming processing, a voltage Vpm of the monitor pulse is set to 0.1 V. When the electrical resistance between the device electrodes 1102 and 1103 becomes $1\times10^6$, i.e., the current measured by the galvanometer 1111 upon application of monitor pulse becomes $1\times10^{-7}$ A or less, the electrification of the forming processing is terminated.

Note that the above processing method is preferable for the surface-conduction type emission device of this embodiment. In case of changing the design of the surface-conduction type emission device concerning, e.g., the material or thickness of the fine particle film, or the device electrode interval L, the conditions for electrification are preferably changed in accordance with the change of device design.

Figure 20D:
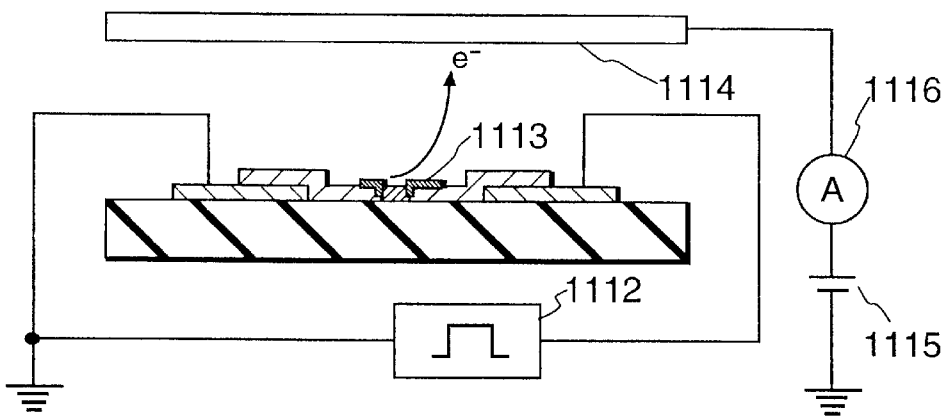

(4) Next, as shown in FIG. 20D, appropriate voltage is applied, from an activation power source 1112, between the device electrodes 1102 and 1103, and the activation processing is performed to improve electron-emitting characteristic.

The activation processing here is electrification of the electron-emitting portion 1105 formed by the forming processing, on appropriate conditions, for depositing carbon or carbon compound around the electron-emitting portion 1105. (In FIG. 20D, the deposited material of carbon or carbon compound is shown as material 1113.) Comparing the electron-emitting portion 1105 with that before the activation processing, the emission current at the same application voltage has become typically 100 times or more.

The activation is made by periodically applying a voltage pulse in $10^{-4}$ or $10^{-5}$ Torr vacuum atmosphere, to accumulate carbon or carbon compound mainly derived from an organic compound existing in the vacuum atmosphere. The accumulated material 1113 is any of graphite monocrystalline, graphite polycrystalline, amorphous carbon or mixture thereof. The thickness of the accumulated material 1113 is 500 Å or less, more preferably, 300 Å or less.

Figure 22A:
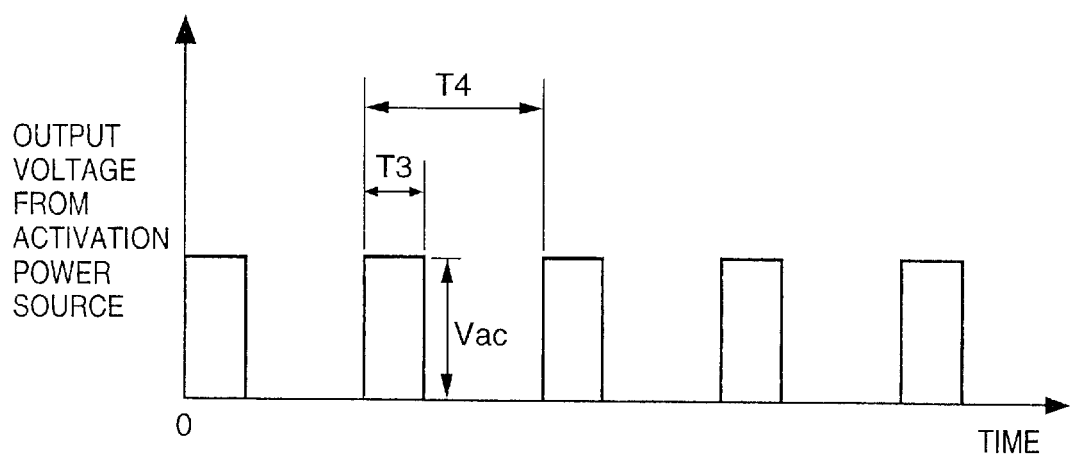
FIG. 22A is a graph showing an application voltage waveform in the activation processing.

The electrification method will be described in more detail with reference to FIG. 22A showing an example of the waveform of appropriate voltage applied from the activation power source 1112. In this embodiment, the activation processing is performed by periodically applying a rectangular wave at a predetermined voltage. A rectangular-wave voltage Vac is set to 14 V; a pulse width T3, to 1 msec; and a pulse interval T4, to 10 msec. Note that the above electrification conditions are preferable for the surface-conduction type emission device of the embodiment. In the case in which the design of the surface-conduction type emission device is changed, the electrification conditions are preferably changed in accordance with the change of device design.

Figure 22B:
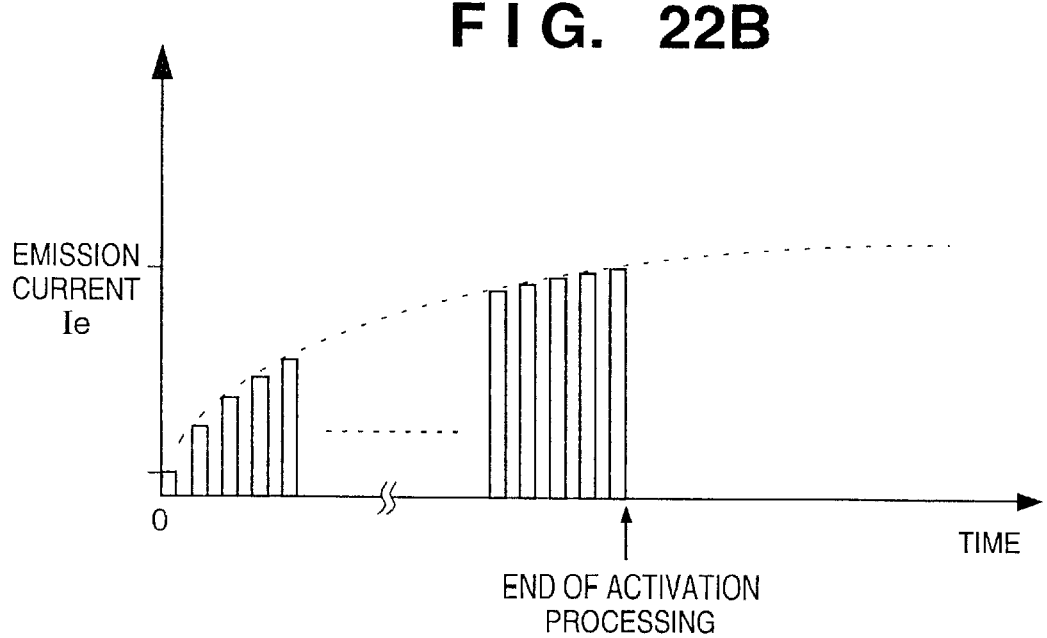
FIG. 22B is a graph showing a change in emission current Ie.

In FIG. 20D, reference numeral 1114 denotes an anode electrode, connected to a direct-current (DC) high-voltage power source 1115 and a galvanometer 1116, for capturing emission current Ie emitted by the surface-conduction type emission device. (In the case in which the substrate 1011 is incorporated into the display panel before the activation processing, the Al layer on the fluorescent surface of the display panel is used as the anode electrode 1114). While applying voltage from the activation power source 1112, the galvanometer 1116 measures the emission current Ie, thus monitors the progress of activation processing, to control operation of the activation power source 1112. FIG. 22B shows an example of the emission current Ie measured by the galvanometer 1116. As application of pulse voltage from the activation power source 1112 is started in this manner, the emission current Ie increases with elapse of time, gradually comes into saturation, and almost never increases then. At the substantial saturation point, the voltage application from the activation power source 1112 is stopped, then the activation processing is terminated.

Note that the above electrification conditions are preferable for the surface-conduction type emission device of the embodiment. In case of changing the design of the surface-conduction type emission device, the conditions are preferably changed in accordance with the change of device design.

Figure 20E:
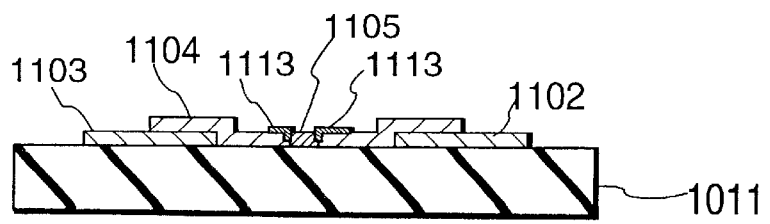

As described above, the surface-conduction type emission device as shown in FIG. 20E is manufactured.

(Step Type of Surface-Conduction Type Emission Device)

Next, another typical structure of the surface-conduction type emission device where an electron-emitting portion or its peripheral portion is formed of a fine particle film, i.e., a step type of surface-conduction type emission device will be described.

Figure 23:
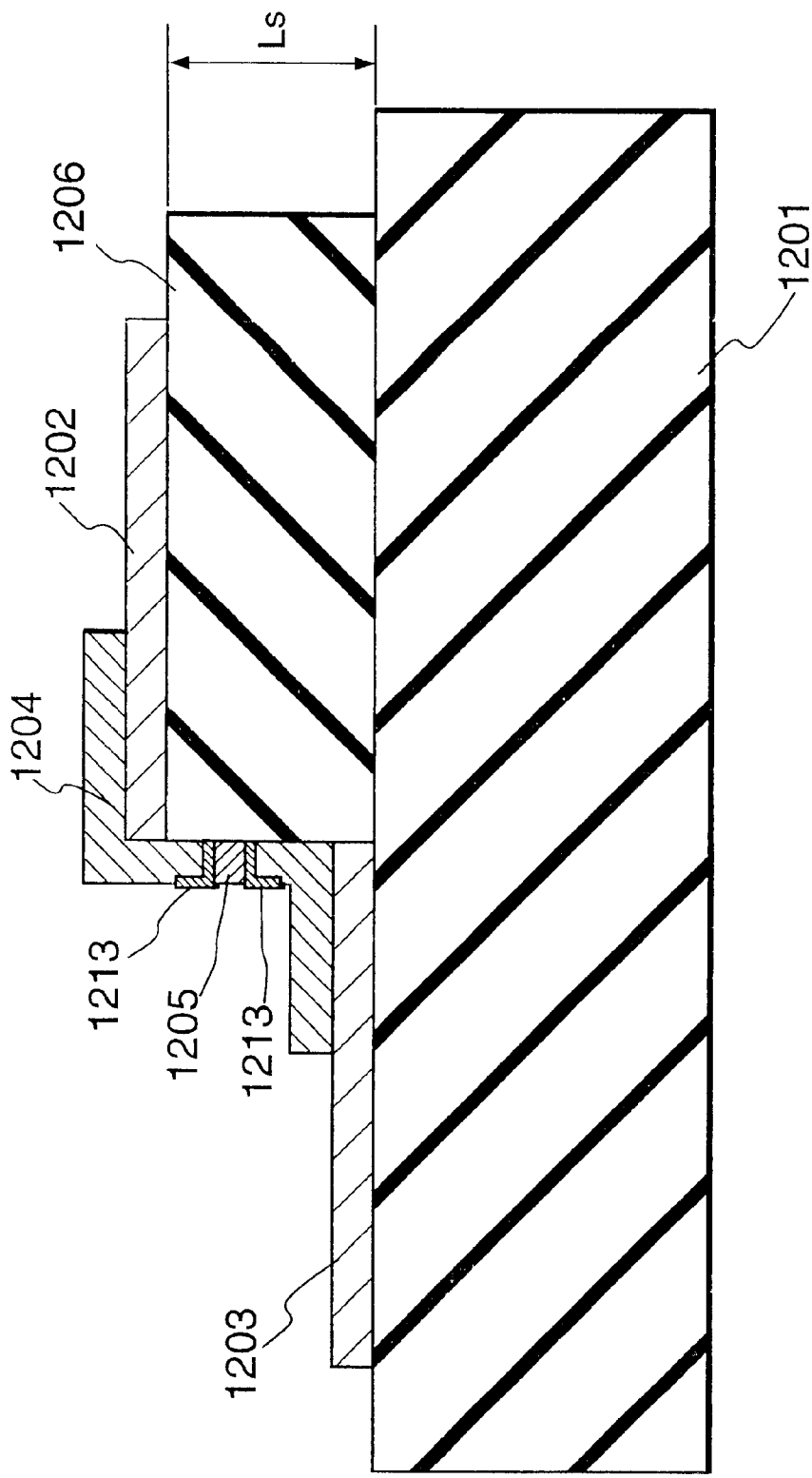
FIG. 23 is a sectional view showing a step type of surface-conduction type emission device used in the embodiment.

FIG. 23 is a sectional view schematically showing the basic construction of the step surface-conduction type emission device. Referring to FIG. 23, reference numeral 1201 denotes a substrate; 1202 and 1203, device electrodes; 1206, a step-forming member for making height difference between the electrodes 1202 and 1203; 1204, a conductive thin film using a fine particle film; 1205, an electron-emitting portion formed by the forming processing; and 1213, a thin film formed by the activation processing.

The difference between the step and flat devices is that one of the device electrodes (1202 in this example) is formed on the step-forming member 1206 and the conductive thin film 1204 covers the side surface of the step-forming member 1206. The device interval L in FIG. 19A is set in this structure as a height difference Ls corresponding to the height of the step-forming member 1206. Note that the substrate 1201, device electrodes 1202 and 1203, and conductive thin film 1204 using the fine particle film can comprise the materials given in the explanation of the flat surface-conduction type emission device. Further, the step-forming member 1206 contains an electrically isolating material such as $SiO_2$.

Next, a method of manufacturing the step surface-conduction type emission device will be described.

FIGS. 24A to 24F which are sectional views showing the manufacturing processes. In these figures, reference numerals of the respective parts are the same as those in FIG. 23.

Figure 24A:
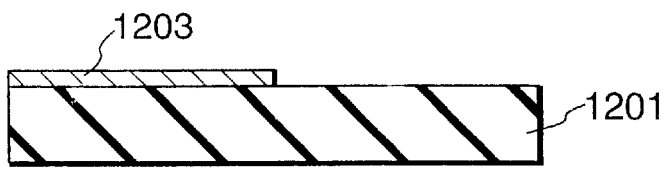
FIGS. 24A to 24F are sectional views showing the steps in manufacturing the step type of surface-conduction type emission device.

(1) First, as shown in FIG. 24A, the device electrode 1203 is formed on the substrate 1201.

Figure 24B:
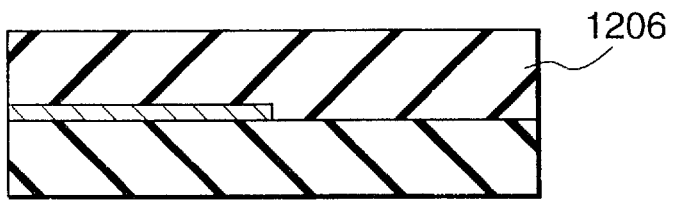

(2) Next, as shown in FIG. 24B, an insulating layer for forming the step-forming member is deposited. The insulating layer may be formed by accumulating, e.g., $SiO_2$ by a sputtering method, however, the insulating layer may be formed by a film-forming method such as a vacuum evaporation method or a printing method.

Figure 24C:
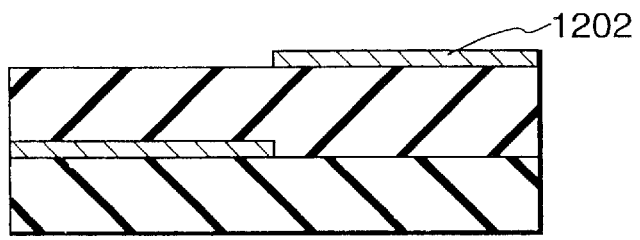

(3) As shown in FIG. 24C, the device electrode 1202 is formed on the insulating layer.

Figure 24D:
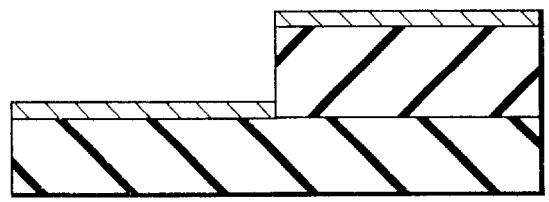

(4) As shown in FIG. 24D, part of the insulating layer is removed by using, e.g., an etching method, to expose the device electrode 1203.

Figure 24E:
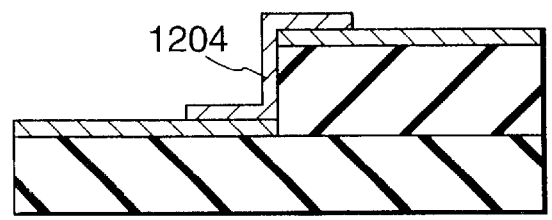

(5) As shown in FIG. 24E, the conductive thin film 1204 using the fine particle film is formed. Upon formation, similar to the above-described flat device structure, a film-forming technique such as an applying method is used.

(6) Similar to the flat device structure, the forming processing is performed to form an electron-emitting portion. (The forming processing similar to that explained using FIG. 20C may be performed).

(7) Similar to the flat device structure, the activation processing is performed to deposit carbon or carbon compound around the electron-emitting portion. (Activation processing similar to that explained using FIG. 20D may be performed).

Figure 24F:
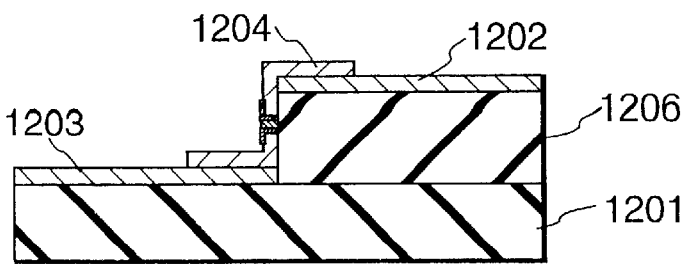

As described above, the step surface-conduction type emission device shown in FIG. 24F is manufactured.
(Characteristic of Surface-Conduction Type Emission Device Used in Display Apparatus)

The structure and manufacturing method of the flat surface-conduction type emission device and those of the step surface-conduction type emission device are as described above. Next, the characteristic of the electron-emitting device used in the display apparatus will be described below.

Figure 25:
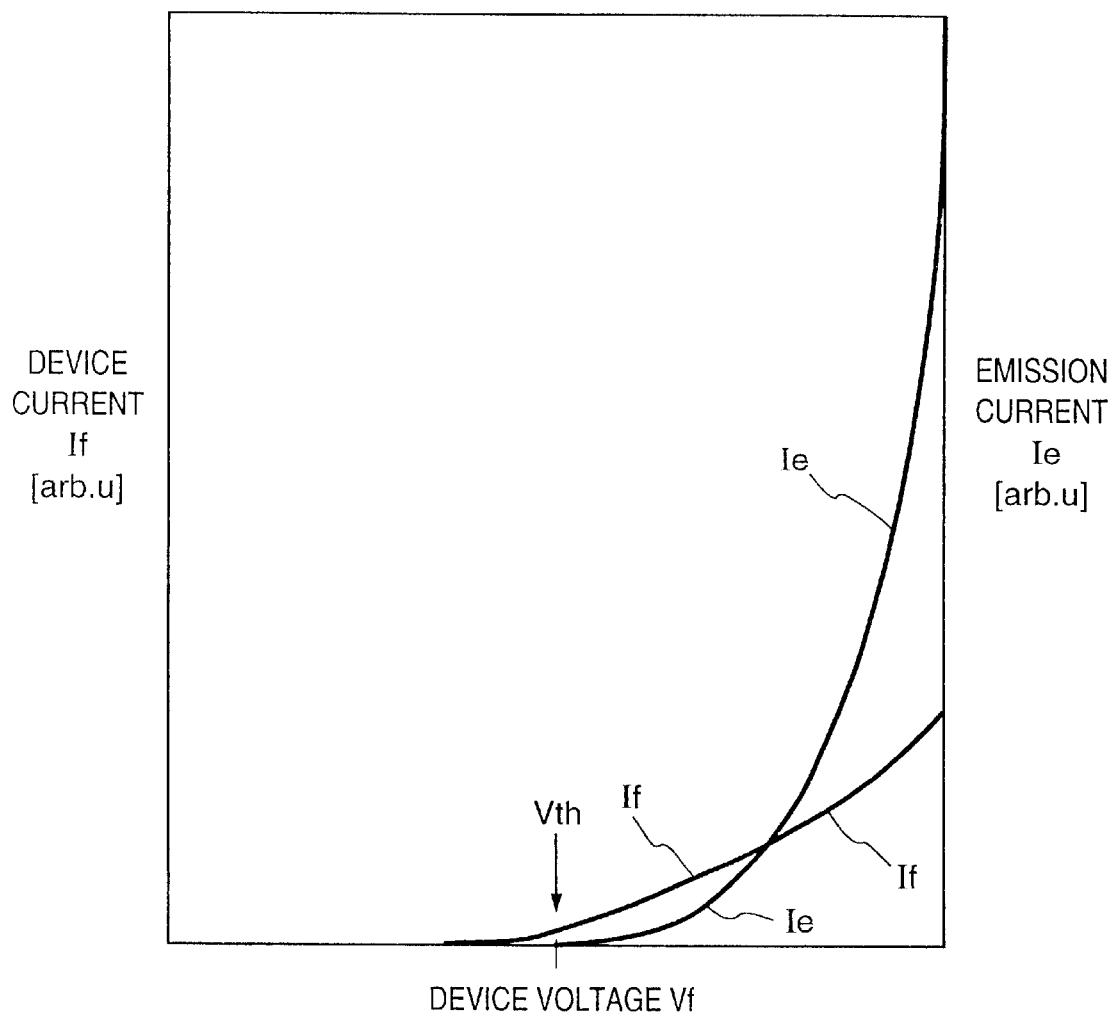
FIG. 25 is a graph showing the typical characteristics of the surface-conduction type emission device used in the embodiment.

FIG. 25 shows a typical example of (emission current Ie) to (device voltage (i.e., voltage to be applied to the device) Vf) characteristic and (device current If) to (device application voltage Vf) characteristic of the device used in the display apparatus. Note that compared with the device current If, the emission current Ie is very small, therefore it is difficult to illustrate the emission current Ie by the same measure of that for the device current If. In addition, these characteristics change due to change of designing parameters such as the size or shape of the device. For these reasons, two lines in the graph of FIG. 25 are respectively given in arbitrary units.

Regarding the emission current Ie, the device used in the display apparatus has three characteristics as follows:

First, when voltage of a predetermined level (referred to as "threshold voltage $V_{th}$") or more is applied to the device, the emission current Ie drastically increases, however, with voltage lower than the threshold voltage $V_{th}$, almost no emission current Ie is detected. That is, regarding the emission current Ie, the device has a nonlinear characteristic based on the clear threshold voltage $V_{th}$.

Second, the emission current Ie changes in dependence upon the device application voltage Vf. Accordingly, the emission current Ie can be controlled by changing the device voltage Vf.

Third, the emission current Ie is output quickly in response to application of the device voltage Vf to the device. Accordingly, an electrical charge amount of electrons to be emitted by the device can be controlled by changing period of application of the device voltage Vf.

The surface-conduction type emission device with the above three characteristics is preferably applied to the display apparatus. For example, in a display apparatus having a large number of devices provided corresponding to the number of pixels of a display screen, if the first characteristic is utilized, display by sequential scanning of display screen is possible. This means that the threshold voltage $V_{th}$ or more is appropriately applied to a driven device in accordance with a desired emission luminance, while voltage lower than the threshold voltage $V_{th}$ is applied to an unselected device. In this manner, sequentially changing the driven devices enables display by sequential scanning of display screen.

Further, emission luminance can be controlled by utilizing the second or third characteristic, which enables gradation display.

Figure 26:
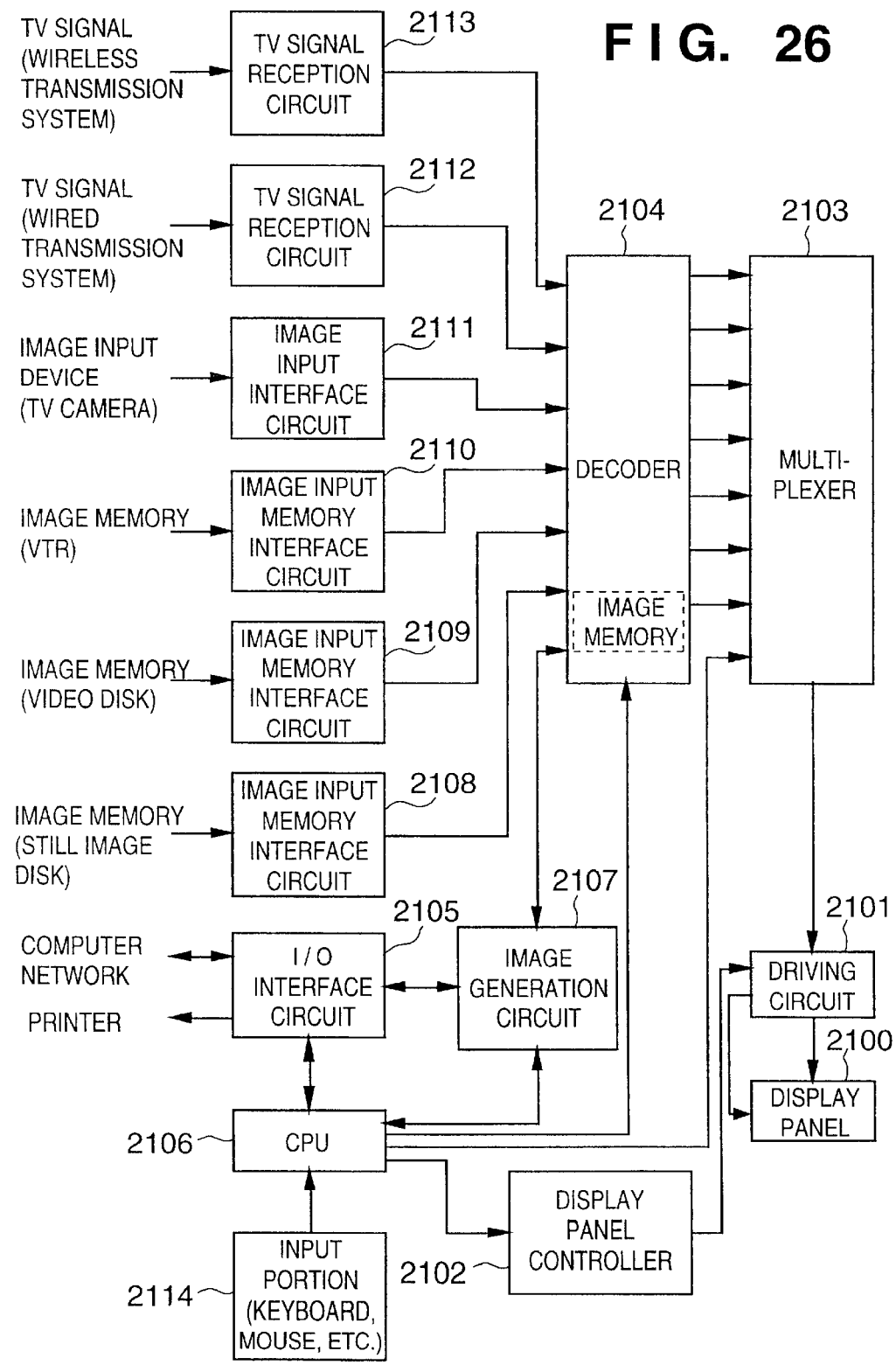
FIG. 26 is a block diagram showing a multi-functional image display apparatus using the image display apparatus according to the embodiment of the present invention.
Figure 27:
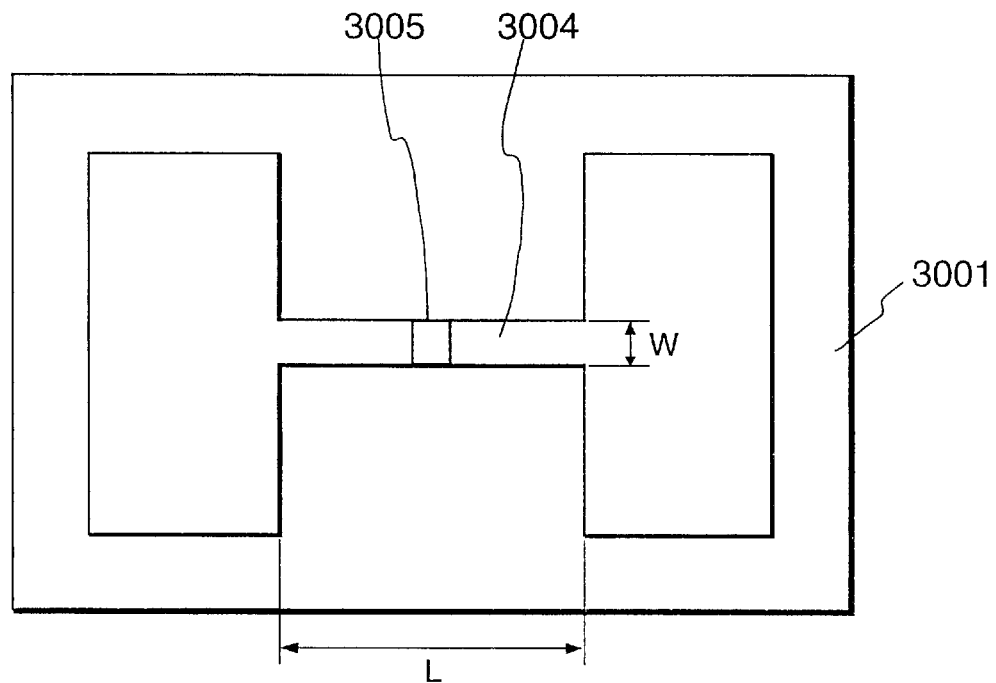
FIG. 27 is a plan view showing an example of a conventionally known surface-conduction type emission device.
Figure 28:
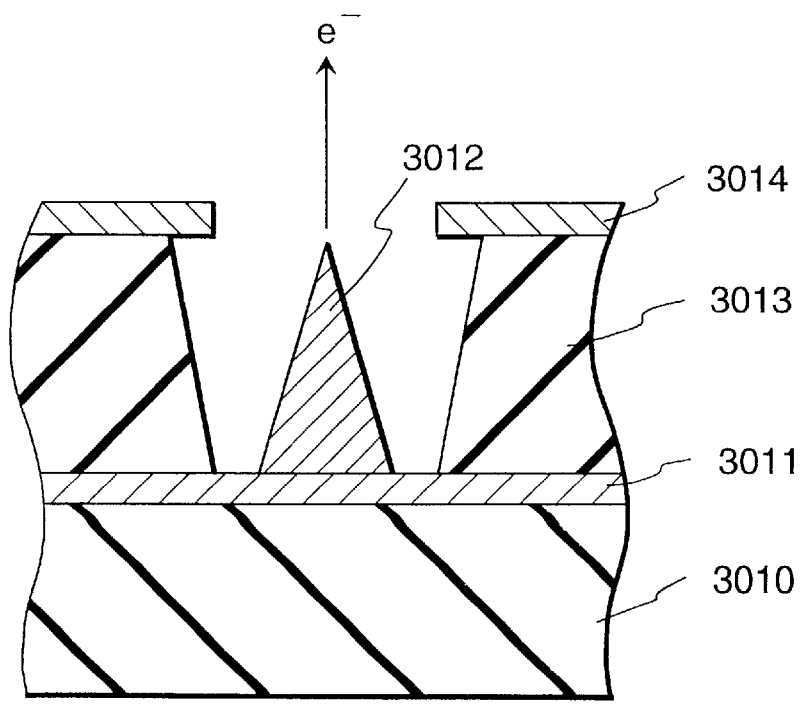
FIG. 28 is a sectional view showing an example of a conventionally known FE type device.
Figure 29:
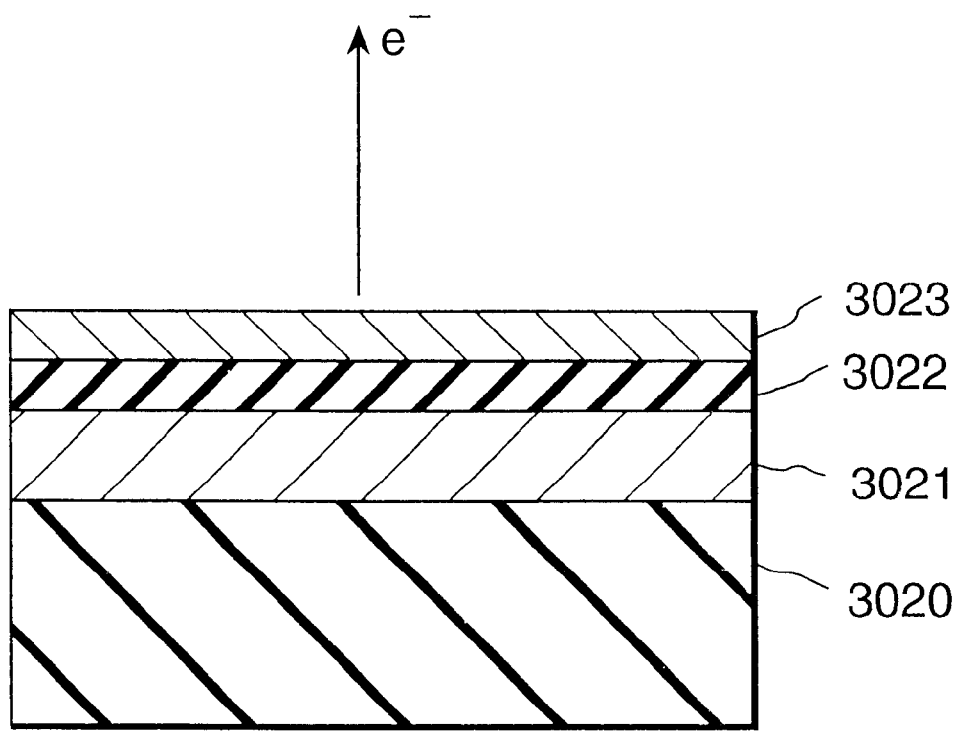
FIG. 29 is a sectional view showing an example of a conventionally known MIM type device.
Figure 30:
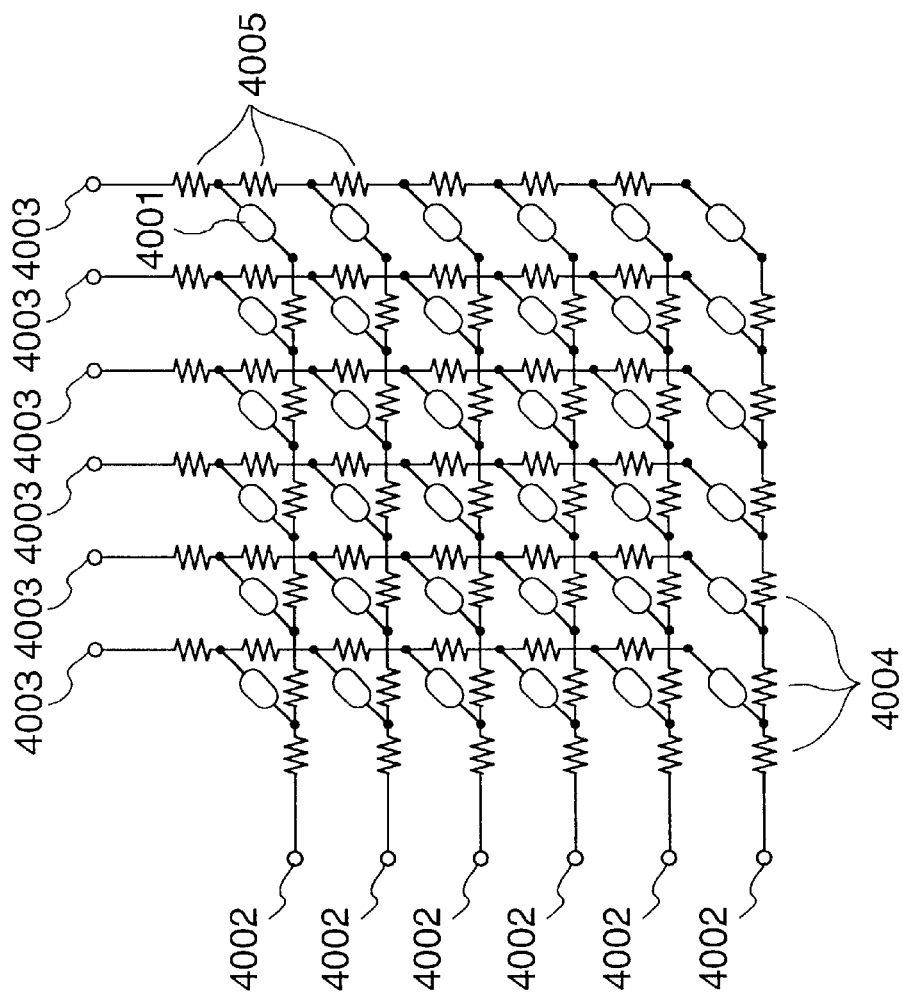
FIG. 30 is a diagram for explaining an electron-emitting device wiring method examined by the present inventors.

FIG. 26 is a block diagram showing an example of a display apparatus capable of displaying image information provided from various image information sources such as television broadcasting on a display panel using the surface-conduction type emission device of this embodiment as an electron source. Referring to FIG. 26, reference numeral 2100 denotes a display panel; 2101, a driving circuit for the display panel; 2102, a display controller; 2103, a multiplexer; 2104, a decoder; 2105, an I/O interface circuit; 2106, a CPU; 2107, an image generation circuit; 2108, 2109, and 2110, image memory interface circuits; 2111, an image input interface circuit; 2112 and 2113, TV signal reception circuits; and 2114, an input portion.

In the display apparatus of this embodiment, upon reception of a signal containing both video information and audio information such as a TV signal, the video information is displayed while the audio information is reproduced. A description of a circuit or a speaker for reception, division, reproduction, processing, storage, or the like of the audio information, which is not directly related to the features of the present invention, will be omitted. The functions of the respective parts will be explained in accordance with the flow of an image signal.

The TV signal reception circuit 2113 receives a TV image signal transmitted using a radio transmission system such as radio waves or spatial optical communication. The scheme of the TV signal to be received is not particularly limited, and is the NTSC scheme, the PAL scheme, the SECAM scheme, or the like. A more preferable signal source to take the advantages of the display panel realizing a large area and a large number of pixels is a TV signal (e.g., a so-called high-quality TV of the MUSE scheme or the like) made up of a larger number of scanning lines than that of the TV signal of the above scheme. The TV signal received by the TV signal reception circuit 2113 is output to the decoder 2104.

The TV signal reception circuit 2112 receives a TV image signal transmitted using a wire transmission system such as a coaxial cable or optical fiber. The scheme of the TV signal to be received is not particularly limited, as in the TV signal reception circuit 2113. The TV signal received by the circuit 2112 is also output to the decoder 2104.

The image input interface circuit 2111 receives an image signal supplied from an image input device such as a TV camera or image read scanner, and outputs it to the decoder 2104. The image memory interface circuit 2110 receives an image signal stored in a video tape recorder (to be briefly referred to as a VTR hereinafter), and outputs it to the decoder 2104. The image memory interface circuit 2109 receives an image signal stored in a video disk, and outputs it to the decoder 2104. The image memory interface circuit 2108 receives an image signal from a device storing still image data such as a so-called still image disk, and outputs the received still image data to the decoder 2104.

The I/O interface circuit 2105 connects the display apparatus to an external computer, computer network, or output device such as a printer. The I/O interface circuit 2105 allows inputting/outputting image data, character data, and graphic information, and in some cases inputting/outputting a control signal and numerical data between the CPU 2106 of the display apparatus and an external device.

The image generation circuit 2107 generates display image data on the basis of image data or character/graphic information externally input via the I/O interface circuit 2105, or image data or character/graphic information output from the CPU 2106. This circuit 2107 incorporates circuits necessary to generate images such as a programmable memory for storing image data and character/graphic information, a read-only memory storing image patterns corresponding to character codes, and a processor for performing image processing. Display image data generated by the circuit 2107 is output to the decoder 2104. In some cases, display image data can also be input/output from/to an external computer network or printer via the I/O interface circuit 2105.

The CPU 2106 mainly performs control of operation of this display apparatus, and operations about generation, selection, and editing of display images. For example, the CPU 2106 outputs a control signal to the multiplexer 2103 to properly select or combine image signals to be displayed on the display panel. At this time, the CPU 2106 generates a control signal to the display panel controller 2102 in accordance with the image signals to be displayed, and appropriately controls operation of the display apparatus in terms of the screen display frequency, the scanning method (e.g., interlaced or non-interlaced scanning), the number of scanning lines for one frame, and the like. The CPU 2106 directly outputs image data or character/graphic information to the image generation circuit 2107. In addition, the CPU 2106 accesses an external computer or memory via the I/O interface circuit 2105 to input image data or character/graphic information. The CPU 2106 may also be concerned with operations for other purposes. For example, the CPU 2106 can be directly concerned with the function of generating and processing information, like a personal computer or wordprocessor. Alternatively, the CPU 2106 may be connected to an external computer network via the I/O interface circuit 2105 to perform operations such as numerical calculation in cooperation with the external device.

The input portion 2114 allows the user to input an instruction, program, or data to the CPU 2106. As the input portion 2114, various input devices such as a joystick, bar code reader, and speech recognition device are available in addition to a keyboard and mouse.

The decoder 2104 inversely converts various image signals input from the circuits 2107 to 2113 into three primary color signals, or a luminance signal and I and Q signals. As is indicated by the dotted line in FIG. 26, the decoder 2104 desirably incorporates an image memory in order to process a TV signal of the MUSE scheme or the like which requires an image memory in inverse conversion. This image memory advantageously facilitates display of a still image, or image processing and editing such as thinning, interpolation, enlargement, reduction, and synthesis of images in cooperation with the image generation circuit 2107 and CPU 2106.

The multiplexer 2103 appropriately selects a display image on the basis of a control signal input from the CPU 2106. More specifically, the multiplexer 2103 selects a desired one of the inversely converted image signals input from the decoder 2104, and outputs the selected image signal to the driving circuit 2101. In this case, the image signals can be selectively switched within a 1-frame display time to display different images in a plurality of areas of one frame, like a so-called multiwindow television.

The display panel controller 2102 controls operation of the driving circuit 2101 on the basis of a control signal input from the CPU 2106.

As for the basic operation of the display panel, the display panel controller 2102 outputs, e.g., a signal for controlling the operation sequence of a driving power source (not shown) of the display panel to the driving circuit 2101. As for the method of driving the display panel, the display panel controller 2102 outputs, e.g., a signal for controlling the screen display frequency or scanning method (e.g., interlaced or non-interlaced scanning) to the driving circuit 2101. In some cases, the display panel controller 2102 outputs to the driving circuit 2101 a control signal about adjustment of the image quality such as the brightness, contrast, color tone, or sharpness of a display image.

The driving circuit 2101 generates a driving signal to be applied to the display panel 2100, and operates based on an image signal input from the multiplexer 2103 and a control signal input from the display panel controller 2102.

The functions of the respective parts have been described. The arrangement of the display apparatus shown in FIG. 26 makes it possible to display image information input from various image information sources on the display panel 2100. More specifically, various image signals such as television broadcasting image signals are inversely converted by the decoder 2104, appropriately selected by the multiplexer 2103, and supplied to the driving circuit 2101. On the other hand, the display controller 2102 generates a control signal for controlling operation of the driving circuit 2101 in accordance with an image signal to be displayed. The driving circuit 2101 applies a driving signal to the display panel 2100 on the basis of the image signal and control signal. As a result, the image is displayed on the display panel 2100. A series of operations are systematically controlled by the CPU 2106.

In the display apparatus of this embodiment, the image memory incorporated in the decoder 2104, the image generation circuit 2107, and the CPU 2106 can cooperate with each other to simply display selected ones of a plurality of pieces of image information and to perform, for the image information to be displayed, image processing such as enlargement, reduction, rotation, movement, edge emphasis, thinning, interpolation, color conversion, and conversion of the aspect ratio of an image, and image editing such as synthesis, erasure, connection, exchange, and pasting. Although not described in this embodiment, an audio circuit for processing and editing audio information may be arranged, similar to the image processing and the image editing.

The display apparatus of this embodiment can therefore function as a display device for television broadcasting, a terminal device for video conferences, an image editing device processing still and dynamic images, a terminal device for a computer, an office terminal device such as a wordprocessor, a game device, and the like. This display apparatus are useful for industrial and business purposes and can be variously applied.

FIG. 26 merely shows an example of the arrangement of the display apparatus using the display panel having the surface-conduction type emission device as an electron source. The present invention is not limited to this, as a matter of course. For example, among the constituents in FIG. 26, a circuit associated with a function unnecessary for the application purpose can be eliminated from the display apparatus. To the contrary, another constituent can be added to the display apparatus in accordance with the application purpose. For example, when the display apparatus of this embodiment is used as a television telephone set, transmission and reception circuits including a television camera, audio microphone, lighting, and modem are preferably added as constituents.

In the display apparatus of this embodiment, since particularly the display panel using the surface-conduction type emission device as an electron source can be easily made thin, the width of the whole display apparatus can be decreased. In addition to this, the display panel using the surface-conduction type emission device as an electron source is easily increased in screen size and has a high brightness and a wide view angle. This display apparatus can therefore display an impressive image with reality and high visibility.

The present invention is not limited to the above embodiments and various changes and modifications can be made within the spirit and scope of the present invention. Therefore, to apprise the public of the scope of the present invention, the following claims are made.

What is claimed is:

1. An image display apparatus comprising:
   a display panel having an electron source, an acceleration electrode for accelerating electrons emitted from said electron source and phosphors for emitting light by collision of electrons accelerated by said acceleration electrode;
   detection means for detecting a current flowing through said acceleration electrode during a non-display period; and
   control means for decreasing the luminance level in a case where the current detected by said detection means becomes more than a predetermined value.

2. An apparatus according to claim 1, wherein said display panel comprises an electron source having a plurality of electron-emitting devices, said electron source emits electrons from respective electron-emitting devices while sequentially switching electron-emitting devices selected from said plurality of electron-emitting devices.

3. An apparatus according to claim 2, wherein said detection means detects the current when said electron-emitting devices to be selected are switched.

4. An apparatus according to claim 1, wherein said electron source has N×M cold cathode devices, where N and M are integers more than 2, respectively.

5. An apparatus according to claim 1, wherein said electron source has surface-conduction type electron emitting devices.

6. An image display apparatus comprising:
   a display panel having an electron source, an acceleration electrode for accelerating electrons emitted from said electron source and phosphors for emitting light by collision of electrons accelerated by said acceleration electrode;
   detection means for detecting a current flowing through said acceleration electrode during a non-display period; and
   control means for stopping display driving of said display panel in a case where the current detected by said detection means becomes more than a predetermined value.

7. An image display apparatus comprising:
   a display panel having an electron source, an acceleration electrode for accelerating electrons emitted from said electron source and phosphors for emitting light by collision of electrons accelerated by said acceleration electrode;
   detection means for detecting a current flowing through said acceleration electrode during a non-display period; and
   means for transmitting warning information in a case where the current detected by said detection means becomes more than a predetermined value.

8. An image display apparatus comprising:
   a display panel having an electron source, an acceleration electrode for accelerating electrons emitted from said electron source and phosphors for emitting light by collision of electrons accelerated by said acceleration electrode;
   detection means for detecting a current flowing through said acceleration electrode when said electron source does not emit electrons; and
   control means for decreasing the luminance level in a case where the current detected by said detection means becomes more than a predetermined value.

9. An image display apparatus comprising:
   a display panel having an electron source, an acceleration electrode for accelerating electrons emitted from said electron source and phosphors for emitting light by collision of electrons accelerated by said acceleration electrode;
   detection means for detecting a current flowing through said acceleration electrode when said electron source does not emit electrons; and
   control means for stopping driving of said display panel in a case where the current detected by said detection means becomes more than a predetermined value.

10. An image display apparatus comprising:
    a display panel having an electron source, an acceleration electrode for accelerating electrons emitted from said electron source and phosphors for emitting light by collision of electrons accelerated by said acceleration electrode;
    detection means for detecting a current flowing through said acceleration electrode when said electron source does not emit electrons; and
    means for transmitting warning information in a case where the current detected by said detection means becomes more than a predetermined value.

11. A method of controlling an image display apparatus comprising a display panel having an electron source, an acceleration electrode for accelerating electrons emitted from the electron source and phosphors for emitting light by collision of electrons accelerated by the acceleration electrode, the method comprising the steps of:
    detecting a current flowing through the acceleration electrode during a non-display period; and
    decreasing the luminance level in a case where the detected current becomes more than a predetermined value.

12. A method according to claim 11, wherein the electron source includes a plurality of electron-emitting devices, the electron source emits electrons from respective electron-emitting devices while sequentially switching electron-emitting devices selected from the plurality of electron-emitting devices.

13. A method according to claim 11, wherein the electron source has N×M cold cathode devices, where N and M are integers more than 2, respectively.

14. A method according to claim 11, wherein the electron source has surface-conduction type electron emitting devices.

15. A method according to claim 12, wherein in said detecting step, the current is detected when the electron-emitting devices to be selected are switched.

16. A method of controlling an image display apparatus comprising a display panel having an electron source, an acceleration electrode for accelerating electrons emitted from the electron source and phosphors for emitting light by collision of electrons accelerated by the acceleration electrode, the method comprising the steps of:

detecting a current flowing through the acceleration electrode during a non-display period; and stopping display driving of the display panel in a case where the detected current becomes more than a predetermined value.

17. A method of controlling an image display apparatus comprising a display panel having an electron source, an acceleration electrode for accelerating electrons emitted from the electron source and phosphors for emitting light by collision of electrons accelerated by the acceleration electrode, the method comprising the steps of:

detecting a current flowing through the acceleration electrode during a non-display period; and transmitting warning information in a case where the detected current becomes more than a predetermined value.

18. A method of controlling an image display apparatus comprising a display panel having an electron source, an acceleration electrode for accelerating electrons emitted from the electron source and phosphors for emitting light by collision of electrons accelerated by the acceleration electrode, the method comprising the steps of:

detecting a current flowing through the acceleration electrode when the electron source does not emit electrons; and decreasing the luminance level in a case where the detected current becomes more than a predetermined value.

19. A method of controlling an image display apparatus comprising a display panel having an electron source, an acceleration electrode for accelerating electrons emitted from the electron source and phosphors for emitting light by collision of electrons accelerated by the acceleration electrode, the method comprising the steps of:

detecting a current flowing through the acceleration electrode when the electron source does not emit electrons; and stopping driving of the display panel in a case where the detected current becomes more than a predetermined value.

20. A method of controlling an image display apparatus comprising a display panel having an electron source, an acceleration electrode for accelerating electrons emitted from the electron source and phosphors for emitting light by collision of electrons accelerated by the acceleration electrode, the method comprising the steps of:

detecting a current flowing through the acceleration electrode when the electron source does not emit electrons; and transmitting warning information in a case where the detected current becomes more than a predetermined value.

21. An image display apparatus comprising:

a display panel comprising an envelope;

a spacer arranged to support the envelope internally;

a current detection circuit for detecting a current flowing through said spacer; and control means for decreasing a luminance level of said display panel when the current detected by said current detection circuit becomes more than a predetermined value.

22. An image display apparatus according to claim 21, wherein said spacer has a conductive film on its surface.

23. An image display apparatus comprising:

a display panel comprising an envelope;

a spacer arranged to support the envelope internally;

a current detection circuit for detecting a current flowing through said spacer; and control means for stopping driving of said display panel when the current detected by said current detection circuit becomes more than a predetermined value.

24. An image display apparatus according to claim 23, wherein said spacer has a conductive film on its surface.

25. An image display apparatus comprising:

a display panel comprising an envelope;

a spacer arranged to support the envelope internally;

a current detection circuit for detecting a current flowing through said spacer; and means for transmitting warning information when the current detected by said current detection circuit becomes more than a predetermined value.

26. An image display apparatus according to claim 25, wherein said spacer has a conductive film on its surface.

27. An image display apparatus comprising:

a display panel comprising an envelope;

a spacer arranged to support the envelope internally; and a current detection circuit for detecting a current flowing through said spacer;

wherein a driving voltage of said display panel is controlled so as to be decreased when the current detected by said current detection circuit becomes more than a predetermined value.

28. An image display apparatus according to claim 27, wherein said spacer has a conductive film on its surface.

29. An image display apparatus comprising:

a display panel comprising an envelope;

a spacer arranged to support the envelope internally; and a current detection circuit for detecting a current flowing through said spacer;

wherein supplying a voltage to said display panel is stopped when the current detected by said current detection circuit becomes more than a predetermined value.

30. An image display apparatus according to claim 29, wherein said spacer has a conductive film on its surface.

31. An image display apparatus comprising:

a display panel comprising an envelope;

a spacer arranged to support the envelope internally;

an electrode electrically connected to said spacer;

a current detection circuit for detecting a current flowing through said electrode; and control means for decreasing a luminance level of said display panel when the current detected by said current detection circuit becomes more than a predetermined value.

32. An image display apparatus according to claim 31, wherein said spacer has a conductive film on its surface.

33. An image display apparatus comprising:

a display panel comprising an envelope;

a spacer arranged to support the envelope internally;

an electrode electrically connected to said spacer;

a current detection circuit for detecting a current flowing through said electrode; and control means for stopping driving of said display panel when the current detected by said current detection circuit becomes more than a predetermined value.

34. An image display apparatus according to claim 33, wherein said spacer has a conductive film on its surface.

35. An image display apparatus comprising:
a display panel comprising an envelope;
a spacer arranged to support the envelope internally;
an electrode electrically connected to said spacer;
a current detection circuit for detecting a current flowing through said electrode; and
means for transmitting warning information when the current detected by said current detection circuit becomes more than a predetermined value.

36. An image display apparatus according to claim 35, wherein said spacer has a conductive film on its surface.

37. An image display apparatus comprising:
a display panel comprising an envelope;
a spacer arranged to support the envelope internally;
an electrode electrically connected to said spacer; and
a current detection circuit for detecting a current flowing through said electrode,
wherein a driving voltage of said display panel is controlled so as to be decreased when the current detected by said current detection circuit becomes more than a predetermined value.

38. An image display apparatus according to claim 37, wherein said display panel comprises an electron source, and said electrode is an acceleration electrode for accelerating electrons emitted from said electron source.

39. An image display apparatus according to claim 37, wherein said spacer has a conductive film on its surface.

40. An image display apparatus comprising:
a display panel comprising an envelope;
a spacer arranged to support the envelope internally;
an electrode electrically connected to said spacer; and
a current detection circuit for detecting a current flowing through said electrode,
wherein a driving voltage supplied to said electrode for driving said display panel is controlled so as to be decreased when the current detected by said current detection circuit becomes more than a predetermined value.

41. An image display apparatus according to claim 40, wherein said display panel comprises an electron source, and said electrode is an acceleration electrode for accelerating electrons emitted from said electron source.

42. An image display apparatus according to claim 40, wherein said spacer has a conductive film on its surface.

43. An image display apparatus comprising:
a display panel comprising an envelope;
a spacer arranged to support the envelope internally;
an electrode electrically connected to said spacer; and
a current detection circuit for detecting a current flowing through said electrode,
wherein said display panel comprises an electron source, and a voltage supplied to said electron source is controlled so as to be decreased when the current detected by said current detection circuit becomes more than a predetermined value.

44. An image display apparatus according to claim 43, wherein said display panel comprises an electron source, and said electrode is an acceleration electrode for accelerating electrons emitted from said electron source.

45. An image display apparatus according to claim 43, wherein said spacer has a conductive film on its surface.

46. An image display apparatus comprising:
a display panel comprising an envelope;
a spacer arranged to support the envelope internally;
an electrode electrically connected to said spacer; and
a current detection circuit for detecting a current flowing through said electrode,
wherein supplying a voltage to said display panel is stopped when the current detected by said current detection circuit becomes more than a predetermined value.

47. An image display apparatus according to claim 46, wherein said display panel comprises an electron source, and said electrode is an acceleration electrode for accelerating electrons emitted from said electron source.

48. An image display apparatus according to claim 46, wherein said spacer has a conductive film on its surface.

49. An image display apparatus comprising:
a display panel comprising an envelope;
a spacer arranged to support the envelope internally;
an electrode electrically connected to said spacer; and
a current detection circuit for detecting a current flowing through said electrode,
wherein supplying a voltage to said electrode is stopped when the current detected by said current detection circuit becomes more than a predetermined value.

50. An image display apparatus according to claim 49, wherein said display panel comprises an electron source, and said electrode is an acceleration electrode for accelerating electrons emitted from said electron source.

51. An image display apparatus according to claim 49, wherein said spacer has a conductive film on its surface.

52. An image display apparatus comprising:
a display panel comprising an envelope;
a spacer arranged to support the envelope internally;
an electrode electrically connected to said spacer; and
a current detection circuit for detecting a current flowing through said electrode,
wherein said display panel comprises an electron source, and supplying a voltage to said electron source is stopped when the current detected by said current detection circuit becomes more than a predetermined value.

53. An image display apparatus according to claim 52, wherein said display panel comprises an electron source, and said electrode is an acceleration electrode for accelerating electrons emitted from said electron source.

54. An image display apparatus according to claim 52, wherein said spacer has a conductive film on its surface.

* * * * *

UNITED STATES PATENT AND TRADEMARK OFFICE
CERTIFICATE OF CORRECTION

PATENT NO. : 6,707,437 B2
DATED : March 16, 2004
INVENTOR(S) : Mitsutoshi Kuno

It is certified that error appears in the above-identified patent and that said Letters Patent is hereby corrected as shown below:

Drawings,
Sheet 36, Figure 37, "DETEMINE" should read -- DETERMINE --.
Sheet 38, Figure 39, "DETEMINE" should read -- DETERMINE --.

Column 33,
Line 41, "V+3" should read -- V+3' --.

Column 34,
Line 47, ""MODE 3")" should read -- "MODE 3" --.

Signed and Sealed this

Thirty-first Day of August, 2004

JON W. DUDAS
*Director of the United States Patent and Trademark Office*